United States Patent
Shinkai et al.

(10) Patent No.: US 7,876,647 B2
(45) Date of Patent: Jan. 25, 2011

(54) INFORMATION PROCESSING APPARATUS AND METHOD, PROGRAM AND RECORDING MEDIUM

(75) Inventors: Mitsutoshi Shinkai, Kanagawa (JP); Masaki Hirose, Tokyo (JP); Yoshiaki Shibata, Kanagawa (JP)

(73) Assignee: Sony Corporation, Tokyo (JP)

( * ) Notice: Subject to any disclaimer, the term of this patent is extended or adjusted under 35 U.S.C. 154(b) by 607 days.

(21) Appl. No.: 10/559,527

(22) PCT Filed: Jun. 9, 2004

(86) PCT No.: PCT/JP2004/008398

§ 371 (c)(1),
(2), (4) Date: Dec. 2, 2005

(87) PCT Pub. No.: WO2004/112028

PCT Pub. Date: Dec. 23, 2004

(65) Prior Publication Data

US 2006/0126451 A1    Jun. 15, 2006

(30) Foreign Application Priority Data

Jun. 11, 2003    (JP) .............................. 2003-166361

(51) Int. Cl.
*G11B 21/08* (2006.01)
(52) U.S. Cl. .................................................. 369/30.3
(58) Field of Classification Search .................. 369/30.3
See application file for complete search history.

(56) References Cited

U.S. PATENT DOCUMENTS

| 6,937,553 B1 * | 8/2005 | Mitui et al. ..................... 369/84 |
| 2002/0097645 A1 * | 7/2002 | Mikawa ..................... 369/47.1 |
| 2002/0154898 A1 * | 10/2002 | Hisatomi et al. .............. 386/95 |

FOREIGN PATENT DOCUMENTS

| EP | 0 962 866 A1 | 12/1999 |
| JP | 57-033411 | 2/1982 |
| JP | 06-161670 | 6/1994 |

(Continued)

OTHER PUBLICATIONS

International Search Report mailed Sep. 14, 2005.

*Primary Examiner*—Wayne R Young
*Assistant Examiner*—Aneeta Yodichkas
(74) *Attorney, Agent, or Firm*—Rader, Fishman & Grauer PLLC

(57) ABSTRACT

The present invention relates to an information processing apparatus and method, a program, and a recording medium that facilitate, for example, identification of information recorded on an recording medium. In a disc formatting process 211, a disc-metadata-file creating unit 181 creates a disc-metadata file including various types of label information, using a PROAV-ID copying unit 192 and a representative-image setting unit 194. Furthermore, in a disc-metadata updating process 212, a disc-metadata-file managing unit 182 updates the disc-metadata file, for example, using the representative-image setting unit 194. A disc-metadata-file recording controller 183 executes a process of comparing PROAV IDs using a PROAV-ID comparing unit 193, and records the disc-metadata file on a disc 132 when the PROAV IDs match. The present invention can be applied to an editing apparatus.

11 Claims, 42 Drawing Sheets

FOREIGN PATENT DOCUMENTS

| | | |
|---|---|---|
| JP | 11-328930 | 11/1999 |
| JP | 2002-027382 | 1/2002 |
| JP | 2002-216458 | 8/2002 |
| JP | 2003-059236 | 2/2003 |
| WO | WO99/31590 | 6/1999 |
| WO | WO03/015098 | 2/2003 |

* cited by examiner

FIG. 5

| 06 | 0A | 2B | 34 | xxxxxx | xxxxxx | xxxxxx | xxxxxx | xxxxxx | xxxxxx | 0xxxxxx | xxxxxx | xxxxxx | xxxxxx | xxxxxx | xxxxxx | xxxxxx | xxxxxx | xxxxxx |

```
1  <?xml version="1.0" encoding="UTF-8"?>
2  <indexFile xmlns="urn:schemas-professionalDisc:index"
3   proav_Id="0123456789ABCDEF0123456789ABCDEF">
4  <clipTable path="/PROAV/CLPR/"/>
5  <!-- Normal Clip -->
6  <clip id="C0001" umid="0D121300000000000010444444484EEEE00E0188E130B"
7   file="C0001C01.SMI" fps="59.94i" dur="12001" ch="4" aspectRatio="4:3">
8   <video umid="0D121300000000000010444444484EEEE00E0188E130B"
9    file="C0001V01.MXF" type="DV25_411" header="65536"/>
10  <audio umid="0D121300000000000010444444484EEEE00E0188E130B"
11   file="C0001A01.MXF" type="LPCM16" header="65536" trackDst="CH1"/>
12  <audio umid="0D121300000000000010444444484EEEE00E0188E130B"
13   file="C0001A02.MXF" type="LPCM16" header="65536" trackDst="CH2"/>
14  <audio umid="0D121300000000000010444444484EEEE00E0188E130B"
15   file="C0001A03.MXF" type="LPCM16" header="65536" trackDst="CH3"/>
16  <audio umid="0D121300000000000010444444484EEEE00E0188E130B"
17   file="C0001A04.MXF" type="LPCM16" header="65536" trackDst="CH4"/>
18  <subStream umid="0D121300000000000010444444484EEEE00E0188E130B"
19   file="C0001S01.MXF" type="PD-SubStream" header="65536"/>
20  <meta file="C0001M01.XML" type="PD-Meta"/>
21  <meta file="C0001M02.TXT" type="key:0123456789ABCDEF"/>
22  <rtmeta file="C0001R01.BIM" type="std2k" header="65536"/>
23  </clip>
24  <!-- Partial Deleted Clip -->
25  <clip id="C0002" umid="0D121300000000000010444444484EEEE00E0188E130B"
26   file="C0002C01.SMI" fps="59.94i" dur="4000" ch="4" aspectRatio="4:3">
27   <video umid="0D121300000000000010444444484EEEE00E0188E130B"
28    file="C0002V01.MXF" type="IMX50" header="80000"/>
29   <audio umid="0D121300000000000010444444484EEEE00E0188E130B"
```

FIG. 17

```
1      file="C0002A01.MXF" type="LPCM16" header="100000" trackDst="CH1"/>
2      <audio umid="0D1213000000000000000010444444484EEEEE00E0188E130B"
3      file="C0002A02.MXF" type="LPCM16" header="100000" trackDst="CH2"/>
4      <audio umid="0D1213000000000000000010444444484EEEEE00E0188E130B"
5      file="C0002A03.MXF" type="LPCM16" header="100000" trackDst="CH3"/>
6      <audio umid="0D1213000000000000000010444444484EEEEE00E0188E130B"
7      file="C0002A04.MXF" type="LPCM16" header="100000" trackDst="CH4"/>
8      <subStream umid="0D1213000000000000000010444444484EEEEE00E0188E130B"
9      file="C0002S01.MXF" type="PD-SubStream" header="90000"
10        clipBegin="8"/>
11     <meta file="C0002M01.XML" type="PD-Meta"/>
12     <rtmeta file="C0002R01.BIM" type="std2k" header="70000"/>
13     </clip>
14     <!-- Refered Clip -->
15     <clip id="C0003" umid="0D1213000000000000000010444444484EEEEE00E0188E130B"
16     file="C0003C01.SMI" fps="59.94i" dur="100000" ch="4" aspectRatio="4:3"
17     referer="E0001 E0002 E0003">
18     <video umid="0D1213000000000000000010444444484EEEEE00E0188E130B"
19     file="C0003V01.MXF" type="IMX50" header="65536"/>
20     <audio umid="0D1213000000000000000010444444484EEEEE00E0188E130B"
21     file="C0003A01.MXF" type="LPCM16" header="65536" trackDst="CH1"/>
22     <audio umid="0D1213000000000000000010444444484EEEEE00E0188E130B"
23     file="C0003A02.MXF" type="LPCM16" header="65536" trackDst="CH2"/>
24     <audio umid="0D1213000000000000000010444444484EEEEE00E0188E130B"
25     file="C0003A03.MXF" type="LPCM16" header="65536" trackDst="CH3"/>
26     <audio umid="0D1213000000000000000010444444484EEEEE00E0188E130B"
27     file="C0003A04.MXF" type="LPCM16" header="65536" trackDst="CH4"/>
28     <subStream umid="0D1213000000000000000010444444484EEEEE00E0188E130B"
29     file="C0003S01.MXF" type="PD-SubStream" header="65536"/>
```

FIG. 18

```
1  <meta file="C0003M01.XML" type="PD-Meta"/>
2  <rtmeta file="C0003R01.BIM" type="std2k" header="65536"/>
3  </clip>
4  <!-- Long GOP -->
5  <clip id="C0004" umid="0D1213000000000000010444444484EEEE00E0188E130B"
6  file="C0004C01.SMI" fps="59.94i" dur="12001" ch="4" aspectRatio="16:9"
7  referer="E0004"/>
8  <video umid="0D1213000000000000010444444484EEEE00E0188E130B"
9  file="C0004V01.MXF" type="MPEG2HD25_1440_MP@HL" header="65536"/>
10 <audio umid="0D1213000000000000010444444484EEEE00E0188E130B"
11 file="C0004A01.MXF" type="LPCM16" header="65536" trackDst="CH1"/>
12 <audio umid="0D1213000000000000010444444484EEEE00E0188E130B"
13 file="C0004A02.MXF" type="LPCM16" header="65536" trackDst="CH2"/>
14 <audio umid="0D1213000000000000010444444484EEEE00E0188E130B"
15 file="C0004A03.MXF" type="LPCM16" header="65536" trackDst="CH3"/>
16 <audio umid="0D1213000000000000010444444484EEEE00E0188E130B"
17 file="C0004A04.MXF" type="LPCM16" header="65536" trackDst="CH4"/>
18 <subStream umid="0D1213000000000000010444444484EEEE00E0188E130B"
19 file="C0004S01.MXF" type="PD-SubStream" header="65536"/>
20 <meta file="C0004M01.XML" type="PD-Meta"/>
21 <meta file="C0004I01.XML" type="PD-PP"/>
22 <rtmeta file="C0004R01.BIM" type="std2k" header="65536"/>
23 </clip>
24 </clipTable>
25 <editlistTable path="/PROAV/EDTR/"/>
26 <editlist id="E0001" umid="0D1213000000000000010444444484EEEE00E0188E130B"
27 file="E0001E01.SMI" dur="500" fps="59.94i" ch="4" aspectRatio="4:3">
28 <meta file="E0001M01.XML" type="PD-Meta"/>
```

FIG. 19

```
1   </editlist>
2   <editlist id="E0002" umid="0D12130000000000000010444444484EEEE00E0188E130B"
3       file="E0002E01.SMI" dur="500" fps="59.94i" ch="4" aspectRatio="4:3">
4       <meta file="E0002M01.XML" type="PD-Meta"/>
5   </editlist>
6   <editlist id="E0003" umid="0D12130000000000000010444444484EEEE00E0188E130B"
7       file="E0003E01.SMI" dur="500" fps="59.94i" ch="4" aspectRatio="4:3">
8       <meta file="E0003M01.XML" type="PD-Meta"/>
9   </editlist>
10  <editlist id="E0004" umid="0D12130000000000000010444444484EEEE00E0188E130B"
11      file="E0003E01.SMI" dur="500" fps="59.94i" ch="4" aspectRatio="16:9">
12      <meta file="E0003M01.XML" type="PD-Meta"/>
13      <meta file="E0003I01.XML" type="PD-PP"/>
14  </editlist>
15  </editlistTable>
16  </indexFile>
```

FIG. 21

| NUMBER | ELEMENT NAME | ELEMENT TYPE | VALUE FORMAT OR ENUMERATED VALUES | EXAMPLE OF VALUE | OCCUR-RENCE | MEANING | INPUT METHOD |
|---|---|---|---|---|---|---|---|
| 1 | mainTitle | nr | | | 0- | MAIN TITLE | INPUT BY USER |
| 2 | subTitle | nr | | | 0- | SUBTITLE | INPUT BY USER |
| 3 | otherTitle | nr | | | 0- | OTHER TITLE | INPUT BY USER |
| 4 | CreationDate | lib:dateTimeType | | | 0- | CREATION DATE OF Index File | AUTOMATICALLY RECORDED BY SET WHEN Index File IS CREATED. |
| 5 | userDate | lib:dateTimeType | | | 0- | DATE AND TIME USER WISHES TO ENTER | INPUT BY USER |
| 6 | userDefinedID | 7bit ASCII NOT MORE THAN 63 CHARACTERS | | | 0-1 | USER-DEFINED MANAGEMENT ID | INPUT BY USER |
| 7 | description | UTF-8 NOT MORE THAN 1023 byt | | | 0-1 | FREE TEXT | INPUT BY USERF |
| 8 | typ | 7bit ASCII 12 CHARACTERS | CXXXX-YYYYYY XXXX; CLIP NUMBER YYYYYY; FRAME NUMBER | C0001-1 | 0-1 | REPRESENTATIVE FRAME OF DISC. SPECIFIED BY CLIP AND FRAME NUMBERS. INITIAL VALUE IS C0001-1. | INITIAL VALUE IS AUTOMATICALLY RECORDED BY SET WHEN Index File IS CREATED. |
| 9 | PROAV ID | 7bit ASCII 16 CHARACTERS | | | 1 | SAME AS PROAV ID OF Index File | AUTOMATICALLY RECORDED BY SET WHEN Index File IS CREATED. |

FIG. 28

```
1  <?xml version="1.0" encoding="UTF-8"?>
2  <smil xmlns="urn:schemas-professionalDisc:edl:clipInfo">
3  <umid="0D1213000000000000104444484EEEE00E0188E130B">
4    <head>
5      <metadata type="Meta">
6        <!-- nonrealtime meta -->
7        <NRMeta xmlns="urn:schemas:proDisc:nrt">
8          <ref src="C0001M01.XML"/>
9        </NRMeta>
10     </metadata>
11   </head>
12   <body>
13     <par>
14       <switch>
15         <!-- main stream -->
16         <par systemComponent="IMX50">
17           <video
18 src="urn:smpte:umid:060A2B3401010105010D1213000000123456789ABCDEF0123456789ABCDEF"
19 type="IMX50"/>
20           <audio
21 src="urn:smpte:umid:060A2B3401010105010D1213000000123456789ABCDEF0123456789ABCDEF0"
22 type="LPCM16" trackDst="CH1"/>
23           <audio
24 src="urn:smpte:umid:060A2B3401010105010D1213000000223456789ABCDEF0123456789ABCDEF01"
25 type="LPCM16" trackDst="CH2"/>
26           <audio
27 src="urn:smpte:umid:060A2B3401010105010D1213000000323456789ABCDEF0123456789ABCDEF012"
28 type="LPCM16" trackDst="CH3"/>
29           <audio
30 src="urn:smpte:umid:060A2B3401010105010D1213000000423456789ABCDEF0123456789ABCDEF0123"
```

FIG. 29

```
1    type="LPCM16" trackDst="CH4"/>
2      <audio
3    src="urn:smpte:umid:060A2B34010101050101OD1213000000056789ABCDEF01234"
4    type="LPCM16" trackDst="CH5"/>
5      <audio
6    src="urn:smpte:umid:060A2B34010101050101OD1213000000006789ABCDEF012345"
7    type="LPCM16" trackDst="CH6"/>
8      <audio
9    src="urn:smpte:umid:060A2B34010101050101OD1213000000000789ABCDEF0123456"
10   type="LPCM16" trackDst="CH7"/>
11     <audio
12   src="urn:smpte:umid:060A2B34010101050101OD1213000000000089ABCDEF01234567"
13   type="LPCM16" trackDst="CH8"/>
14     </par>
15     <!-- sub stream -->
16     <ref
17   src="urn:smpte:umid:060A2B34010101050101OD1213000000000009ABCDEF012345678"
18   type="SubStream" systemComponent="SubStream"/>
19    </switch>
20    <!-- realtime meta -->
21    <metastream src="C0001R01.BIM" type="required2k"/>
22   </par>
23  </body>
24 </smil>
```

FIG. 31

```
1  <?xml version="1.0" encoding="UTF-8"?>
2  <smil xmlns="urn:schemas-professionalDisc:edl:editList">
3  <umid="0D1213000000000000010444444484EEEE00E0188E130B">
4    <head>
5      <metadata type="Meta">
6      <!-- nonrealtime meta -->
7      <NRMeta xmlns="urn:schemas:professionalDisc:nrt">
8        <ref src="E0002M01.XML"/>
9      </NRMeta>
10     </metadata>
11   </head>
12   <body>
13     <par>
14       <!-- Clip1 -->
15       <ref
16  src="urn:smpte:umid:060A2B3401010105010D1213000000FEDCBA9876543210"
17  type="ediDoc" begin="smpte-30=00:00:00" clipBegin="smpte-
18  30=00:10:00"/>
19       <!-- Clip2 -->
20       <ref
21  src="urn:smpte:umid:060A2B3401010105010D1213000000EDCBA9876543210F"
22  type="ediDoc" begin="smpte-30=00:10:00" clipBegin="smpte-
23  30=00:03:30:00"/>
24     </par>
25   </body>
26  </smil>
```

INFORMATION PROCESSING APPARATUS AND METHOD, PROGRAM AND RECORDING MEDIUM

TECHNICAL FIELD

The present invention relates to information processing apparatuses and methods, programs, and recording media. More specifically, the present invention relates to an information processing apparatus and method, a program, and a recording medium that allow, for example, information recorded on an recording medium to be more readily identified.

BACKGROUND ART

It has hitherto been the case to record material data, such as image data and audio data obtained by imaging and recording, on tape devices such as videotapes. Recently, however, digitization of information is in progress in accordance with improvement in information processing techniques, and optical discs such as DVDs (Digital Versatile Discs) are coming to be used as recording media.

On an optical disc as such a recording medium, material data is managed in the form of files on the basis of a file system such as the UDF (Universal Disk Format). Thus, for example, a playback apparatus that plays back material data searches for the material data that is to be played back from the optical disc mounted on a drive, using the name of a path from the root directory (hereinafter referred to as an absolute path) and the file name of the file of the material data, and reads and plays back the material data.

However, for example, in the case of an editing apparatus for editing material data, in some cases, material data recorded on the optical disc is read by the editing apparatus and is recorded on a hard disc or the like included in the editing apparatus, or material data stored in the hard disc is written to the optical disc. Thus, the directory structure for managing the material data is not necessarily limited to one type, so that it is difficult to locate the directory in which the material data exists by specifying material data using an absolute path name or a file name. This could raise the problem of complexity in the method of searching for material data.

As opposed to the above case, according to another method, material data is specified using a UMID (Unique Material IDentifier). The UMID is a standard identifier defined by the SMPTE (Society of Motion Picture and Television Engineers), and it is an identifier for globally unique identification of AV (Audio Visual) material or the like. That is, by using the UMID, material data can be identified regardless of the management location (directory) thereof, so that it is possible to specify target material data regardless of the directory, by managing association between the UMID and the directory where the material data is managed.

Now, the UMID will be described.

FIG. 1 is a diagram showing an example data structure of the UMID. As shown in FIG. 1, a 64-byte extended UMID (Extended UMID) 10 is composed of a basic UMID (Basic UMID) 11 composed of 32-byte basic information, and a 32-byte source pack 12 constituting user's signature information. The basic UMID 11 is composed of a 12-byte universal label 21, a 1-byte length value (L) 22, a 3-byte instance number 23, and a 16-byte material number. The source pack 12 is composed of an 8-byte time/date 25, a 12-byte geographic coordinates 26, a 4-byte country 27, a 4-byte organization 28, and a 4-byte user 29.

The universal label 21 includes information indicating that the ID is an SMID defined by the SMPTE, which allows globally unique identification of data. Furthermore, the universal label 21 includes information indicating a type of material data specified by the UMID or a method of creating the material number 24. The length value (L) 22 is 1-byte information defining the length of the remaining part of the UMID, and the value thereof is set to 13H in hexadecimal representation in the case of the basic UMID, and 33H in hexadecimal representation in the case of the extended UMID. The instance number 23 is information for identifying instances of a plurality of material data with the same material number 24 (of the same clip), and it is information providing a link between each instance in the clip and externally associated metadata. The material number 24 is an ID number that is used for identification of each clip. Among instances within a clip, the material number is the same. The material number 24 will be described later with reference to FIG. 2.

The time/date 25 of the source pack 12 is composed of date information specified by a Julian date, time information, information regarding a frame, and so forth. The geographic coordinates 26 are information representing position information at the time of generation of the material data, for example, by GPS information such as an altitude, a latitude, and a longitude. The country 27 is information regarding the nationality of the creator of the material data. The organization 28 is information regarding the name of an organization to which the creator of the material data belongs. The user ID is the name of the creator of the material data, represented by alphanumeric characters.

FIG. 2 shows an example structure of the material number 24. As shown in FIG. 2, the 16-byte material number 24 is composed of an 8-byte time snap 31, a 2-byte random number 32, and a 6-byte network-node number 33.

As shown in FIG. 3, the time snap 31 is composed of 4-byte (32-bit) time information 41 representing an integer value corresponding to a temporal position of the recording time of the material data in a day (i.e., a value in the case where 24 hours is represented by 32 bits), and Julian-date information 42 representing the recording data of the material data by the number of dates counted from Nov. 17, 1858. The random number 32 is information that is used to prevent collision of the material number with other clips, for example, when setting of time information in an apparatus that creates material data is not accurate. The network-node number 33 is information for identifying an apparatus used to record the material data, and is represented using a MAC address, which is a unique number assigned to every NIC (Network Interface Card). For example, in the case of the Ethernet(R), the former 24 bits represent an address specific to each vendor, managed by the IEEE, and the latter 24 bits represent a number specific to each NIC, assigned by each vendor.

The structure of the material number 24 may be different from the structure described above. For example, a material number composed of a time snap, version information, a UUID identification number, a random number, and a network-node number, used in AAF (Advanced Authoring Format) or UUID (Universally Unique Identifier), may be used, as shown in FIG. 4. Alternatively, a material number including an SMPTE user label may be used, as shown in FIG. 5. Information representing which of these structures is used is indicated in the universal label 21.

A clip is a unit representing a single material-data creating process such as imaging process or a recording process, and it indicates a time between the start and end of the single material-data creating process (e.g., in the case of an imaging process, the time between the start and end of imaging), or an amount of data of various types of data obtained by the material-data creating process. Furthermore, the clip sometimes also refers to the set of various types of data itself. The clip herein refers to the set of various types of data obtained by a single material-data creating process.

As described above, the UMID is composed of a combination of a large number of pieces of information, and the use of the UMID allows globally unique identification of material data under any environment. For example, an editing apparatus manages UMIDs of pieces of material data and the path names of directories in which the pieces of material data are managed in association with each other, so that it is possible to search for a piece of material data associated with a specified UMID.

However, when a plurality of optical discs having recorded material thereon as described above exists, it has not been possible for the user to readily recognize which material data is recorded on which optical disc among the optical discs.

For example, when the user uses a playback apparatus to search for and play back target material data from a plurality of optical discs using a UMID, the user has to repeatedly mount the optical discs one by one on a drive of the playback apparatus, search for the target material data, for example, by using the UMID, and dismount the disc from the drive and mount a next optical disc when the material data is not found, and so forth, until the target material data is found. This could involve laborious operations.

DISCLOSURE OF INVENTION

The present invention has been made in view of the situation described above, and it serves to improve convenience of a recording medium, for example, to facilitate identification of information recorded on a recording medium.

An information processing apparatus according to the present invention comprises copying means for copying an identifier for identifying a format that is managed by a first file for managing information recorded on a recording medium, the identifier being included in the first file; creating means for creating a second file including the identifier copied by the copying means and label information describing content of data; and recording means for recording the second file created by the creating means in the format on the recording medium, as a file that is different from the first file.

The label information may include information regarding a representative frame image representing all the frame images of image data included in the recording medium.

The information processing apparatus may further comprise setting means for setting the label information, so that the creating means creates the second file including the identifier copied by the copying means and the label information set by the setting means.

The setting means may selectively set the representative frame image from representative frame images of respective clips recorded on the recording medium.

The setting means may set a beginning frame image of a beginning clip as the representative frame image when no instruction for setting the representative frame image is given.

The information processing apparatus may further comprise comparing means for comparing an identifier included in the second file with an identifier included in the first file recorded on the recording medium, so that the recording means records the second file in the format on the recording medium only when it is determined as a result of comparison by the comparing means that the identifier included in the second file coincides with the identifier included in the first file.

The information processing apparatus may further comprise reading means for reading the second file from the recording medium; and updating means for updating the label information included in the second file read by the reading means; so that the comparing means compares an identifier included in the second file whose label information has been updated by the updating means with an identifier included in the first file recorded on the recording means, and so that the recording means records the second file in the format on the recording medium only when it is determined as a result of comparison by the comparing means that the identifier included in the second file coincides with the identifier included in the first file.

The recording medium may be an optical disc.

The recording medium may be a semiconductor memory.

An information processing method according to the present invention comprises a copying step of copying an identifier for identifying a format that is managed by a first file for managing information recorded on a recording medium, the identifier being included in the first file; a creating step of creating a second file including the identifier copied by processing in the copying step and label information describing content of data; and a recording controlling step of exercising control so that the second file created by processing in the creating step is recorded in the format on the recording medium, as a file that is different from the first file.

A program according to the present invention allows a computer to execute a copying step of copying an identifier for identifying a format that is managed by a first file for managing information recorded on a recording medium, the identifier being included in the first file; a creating step of creating a second file including the identifier copied by processing the copying step and label information describing content of data; and a recording controlling step of exercising control so that the second file created by processing in the creating step is recorded in the format on the recording medium, as a file that is different from the first file.

In a recording medium according to the present invention, a first file including an identifier for identifying a format on the recording medium, the first file serving to manage data in the format, and a second file including an identifier tht is the same as the identifier, the second file further including label information describing content of data in the format, are recorded in the format as mutually different files.

According to the information processing apparatus and method, program, and recording medium of the present invention, an identifier for identifying a format that is manged by a first file for managing information recorded on a recording medium, the identifier being included in the first file, is copied, a second file including the identifier copied and label information describing content of data is created, and the second file created is recorded in the format on the recording medium, as a file that is different from the first file.

BRIEF DESCRIPTION OF THE DRAWINGS

FIG. 5 is a diagram showing yet another detailed example structure of the material number shown in FIG. 1.

FIG. 16 is a diagram showing an example of XML description of an index file.

FIG. 17 is a diagram subsequent to FIG. 16, showing an example of XML description of an index file.

FIG. 18 is a diagram subsequent to FIG. 17, showing an example of XML description of an index file.

FIG. 19 is a diagram subsequent to FIG. 18, showing an example of XML description of an index file.

FIG. 21 is a table showing a list of elements that can constitute a disc-metadata file.

FIG. 28 is a diagram showing an example of XML description of a clip-information file.

FIG. 29 is a diagram subsequent to FIG. 28, showing an example of XML description of a clip-information file.

FIG. 31 is a diagram showing an example of XML description of an edit-list file.

BEST MODE FOR CARRYING OUT THE INVENTION

Now, embodiments of the present invention will be described with reference to the drawings.

Figure 6:
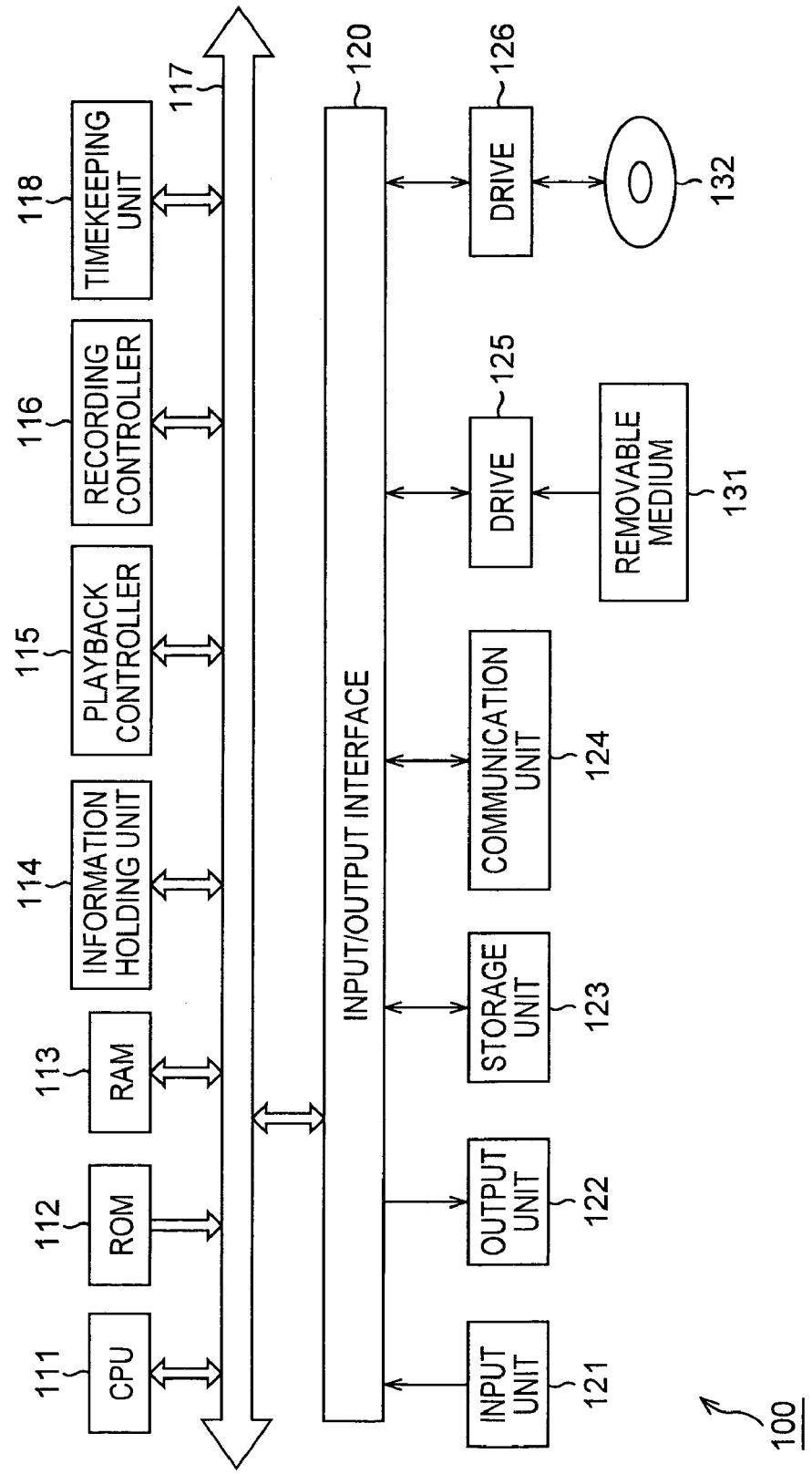
FIG. 6 is a block diagram showing an example construction of an editing apparatus 100 according to the present invention.

FIG. 6 is a block diagram showing an example construction of an editing apparatus according to the present invention.

Referring to FIG. 6, a CPU (Central Processing Unit) 111 of an editing apparatus 100 executes various types of processes according to programs stored in a ROM (Read Only Memory) 112. A RAM (Random Access Memory) 113 stores data, programs, and so forth as needed for the execution of various types of processes by the CPU 111.

An information holding unit 114 is a storage unit for temporarily storing information, and is implemented by a semiconductor memory or the like. The information holding unit 114 holds information such as information regarding material data recorded on a disc 132 described later, read from the disc 132, and it provides information held therein or obtains new information under the control of a playback controller 115, a recording controller 116, or the like.

The playback controller 115 controls a drive 126 via a bus 117 and an input/output interface 120 to execute processing for controlling reading of various types of information from the disc 132 mounted on the drive 126. For example, the playback controller 115 exercises control to read information regarding data recorded on the disc 132 and to supply the information to the information holding unit 114. The recording controller 116 executes processing for controls the drive 126 via the bus 117 and the input/output interface 120 to execute processing for controlling writing of various types of information to the disc 132 mounted on the drive 126. For example, the recording controller 116 exercises control to record data held by the information holding unit 114 on the disc 132.

The CPU 111, the ROM 112, the RAM 113, the information holding unit 114, the playback controller 115, and the recording controller 116 are connected to each other via the bus 117. Also, a timekeeping unit 118 is connected to the bus 117. The timekeeping unit 118 calculates a current time on the basis of an output of a real-time clock that is implemented, for example, by an internal crystal resonator, and in response to a request from the CPU 111, the playback controller 115, the recording controller 116, or the like, it supplies information representing the current time to the source of the request.

Furthermore, the input/output interface 120 is connected to the bus 117. The input/output interface 120 is connected to an input unit 121 including a keyboard and a mouse, and it outputs signals input to the input unit 121 to the CPU 111. Also, the input/output interface 120 is connected to an output unit 122 implemented by a display, a speaker, and so forth.

Furthermore, the input/output interface 120 is connected to a storage unit 123 implemented by a magnetic drive such as a hard disc or by an EEPROM (Electronically Erasable and Programmable Read Only Memory), and to a communication unit 124 for carrying out data communications with other apparatuses via an IEEE (Institute of Electrical and Electronic Engineers) 1394 network or the like. On the drive 125, programs, data needed for the execution of programs, and so forth, read from a removable medium 131 implemented by a recording medium such as a magnetic disc, an optical disc, a magneto-optical disc, or a semiconductor memory, are recorded.

The drive 126 reads material data such as image data or audio data from the disc 132 mounted on the drive 126, or records material data on the disc 132 mounted on the drive 126.

The disc 132 is, for example, an optical disc on which a large volume of data (e.g., 27 gigabytes) can be recorded using a blue-violet laser with a numerical aperture (NA) of 0.85 and a wavelength of 405 nm at a recording density with a minimum mark length of 0.14 μm and a track pitch of 0.32 μm. The disc 132 may be other types of recording medium, for example, various types of optical discs such as DVD-RAM (Digital Versatile Disc-Random Access Memory), DVD-R (DVD-Recordable), DVD-RW (RVD-ReWritable), DVD+R (DVD+Recordable), DVD+RW (DVD+ReWritable), CD-R (Compact Disc-Recordable), or CD-RW (CD-ReWritable).

Figure 7:
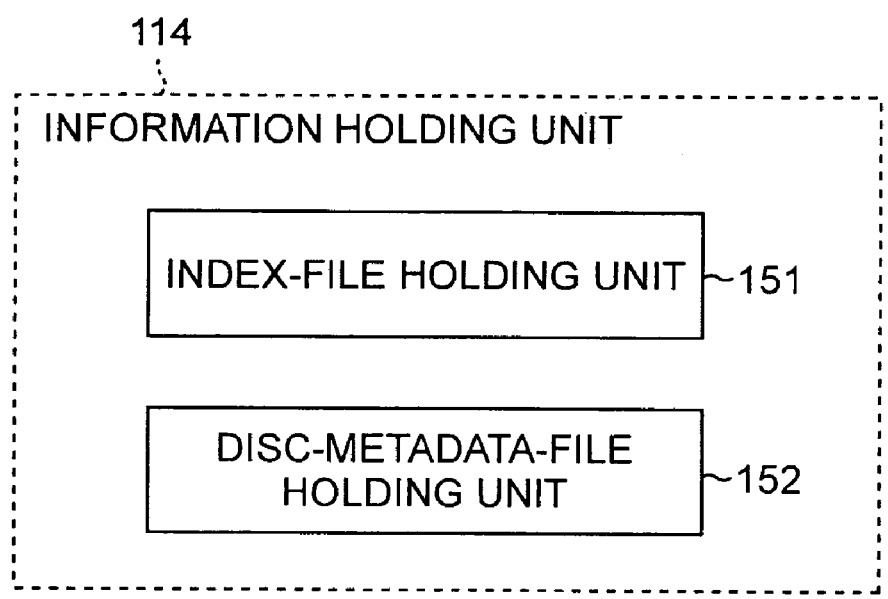
FIG. 7 is a block diagram showing a detailed example construction of an information holding unit shown in FIG. 1.

FIG. 7 is a block diagram showing a detailed example construction of the information holding unit 114 shown in FIG. 6. Referring to FIG. 7, the information holding unit 114 includes an index-file holding unit 151 for holding an index file that is used for unitary management of information recorded on the disc 132, and a disc-metadata-file holding unit 152 for holding a disc-metadata file including label information describing the content of the disc 132. The information holding unit 14 also holds, for example, various types of data to be recorded on the disc 132 or material data read from the disc 132, as well as the index file and the disc-metadata file described above.

Figure 8:
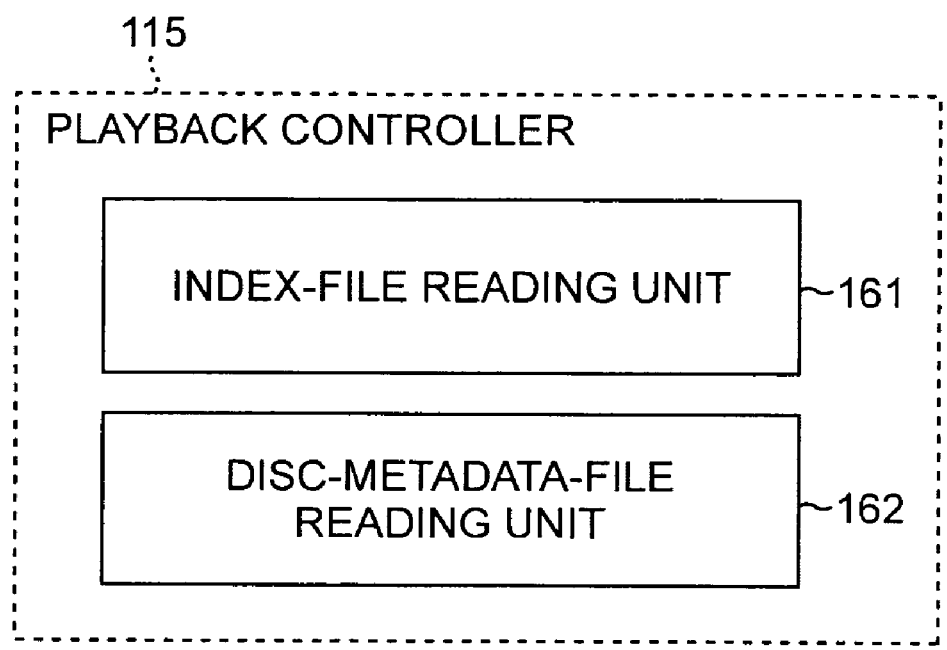
FIG. 8 is a block diagram showing a detailed example construction of a playback controller shown in FIG. 1.

FIG. 8 is a block diagram showing a detailed example construction of the playback controller 115 shown in FIG. 6. Referring to FIG. 8, the playback controller 115 includes an index-file reading unit 161 that executes processing for reading an index file and storing the index file in the index-file holding unit 151 shown in FIG. 7, and a disc-metadata-file reading unit 162 that executes processing for reading a disc-metadata file from the disc 132 mounted on the drive 126 and storing the disc-metadata file in the disc-metadata-file holding unit 152 shown in FIG. 7. The playback controller 115 also reads and plays back files other than the index file and the disc-metadata file from the disc 132, for example, files of material data such as image data or audio data or files of metadata.

Figure 9:
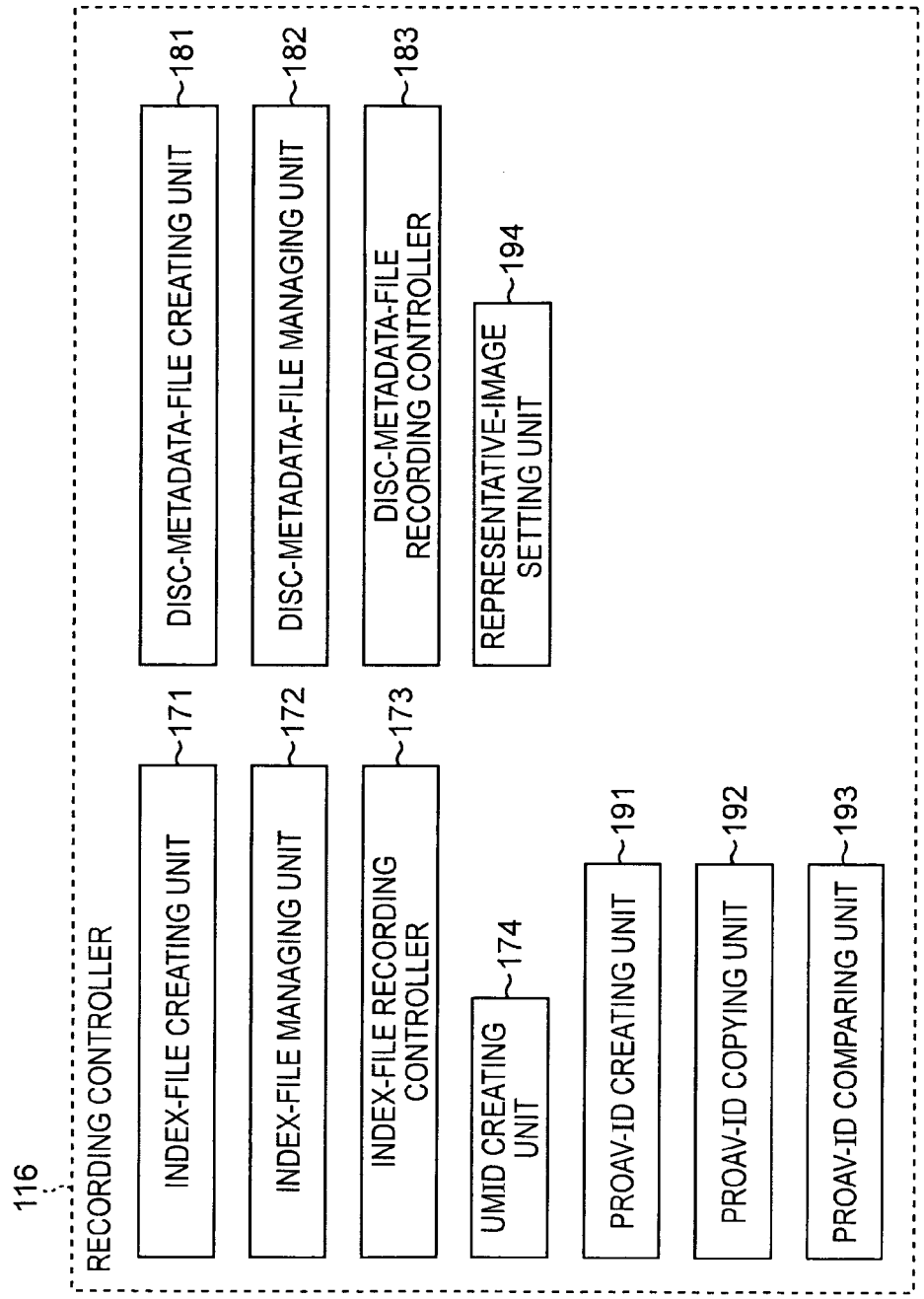
FIG. 9 is a block diagram showing a detailed example construction of a recording controller shown in FIG. 1.

FIG. 9 is a block diagram showing a detailed example construction of the recording controller 116 shown in FIG. 6. Referring to FIG. 9, the recording controller 116 includes an index-file creating unit 171 that executes processing for creating an index file, an index-file managing unit 172 for managing an index file held in the index-file holding unit 151, an index-file recording controller 173 for recording the index file held in the index-file holding unit 151 on the disc 132 mounted on the drive 126, a UMID creating unit 174 for creating a UMID, a disc-metadata-file creating unit 181 that executes processing for creating a disc-metadata file, a disc-metadata-file managing unit 182 for managing a disc-metadata file held in the disc-metadata-file holding unit 152, a disc-metadata-file recording controller 183 for recording the disc-metadata file held in the disc-metadata-file holding unit 152 on the disc 132 mounted on the drive 126, a PROAV-ID creating unit 191 for creating an ID for identifying the disc 132 (PROAV ID), a PROAV-ID copying unit 192 for copying a PROAV ID included in an index file, a PROAV-ID comparing unit 193 for comparing the PROAV ID included in the index file and a PROAV ID included in a disc-metadata file, and a representative-image setting unit 194 for setting a frame image representative of all the frame images of material data recorded on the disc 132 (representative image).

The recording controller 116 executes processing for controlling the drive 126 to record material data such as image data or audio data on the disc 132 mounted on the drive 126, and executes processing for causing the index-file creating unit 171 to create an index file, the index-file managing unit 172 to manage the index file held in the index-file holding unit 151, or the index-file recording controller 173 to record the index file held in the index-file holding unit 151 on the disc 132 via the drive 126.

The UMID creating unit 174 of the recording controller 116 creates a UMID for a clip or an edit list when the clip or the edit list is created.

Furthermore, the recording controller 116 executes processing for causing the disc-metadata-file creating unit 181 to create a disc-metadata file, the disc-metadata-file managing unit 182 to manage a disc-metadata file held in the disc-metadata-file holding unit 152, and for recording the disc-metadata file held in the disc-metadata-file holding unit 152 on the disc 132 via the drive 126.

The PROAV-ID creating unit 191 of the recording controller 116 creates a PROAV ID, which is information included in an index file and which serves as an ID for the entire data recorded on the disc 132, when the index file is created by the index-file creating unit 171.

As will be described later, a single PROAV directory is created on the disc 132. Under the PROAV directory, various types of files are located and managed. The PROAV ID is used as an ID for identifying a set of files (hereinafter referred to as a format) that is managed under a directory structure created by a single formatting process. Usually, the formatting process described later is executed on the entire storage area of the disc 132, and only the single format (the directory structure of and under the PROAV directory, which will be described later) exists on the disc 132. However, as will be described later, the editing apparatus 100 can remove a format existing on the disc 132 and create a new format on the disc 132 by executing a formatting process. The PROAV ID is an ID for identifying a format that is created on the disc 132, and it is not an ID of the disc 132 as hardware. Thus, when a new format is created by executing a formatting process as described above, a new PROAV ID is created and assigned to the format. That is, the PROAV ID for the single disc 132 is not fixed.

The PROAV-ID creating unit 191 creates a PROAV ID, which is an ID for such a format. The PROAV ID is recorded on an index file, and is used, for example, for searching of a clip or an edit list. Furthermore, as will be described later, the PROAV ID is also recorded on a disc-metadata file, and it is used when the disc-metadata file is updated, for checking whether the disc-metadata file is associated with data recorded on the disc 132.

The PROAV-ID copying unit 192 creates a PROAV ID by copying a PROAV ID in an index file when a disc-metadata file is created by the disc-metadata-file creating unit 181. When a disc-metadata file is recorded by the disc-metadata-file recording controller 183, the PROAV-ID comparing unit 193 compares a PROAV ID of the disc-metadata file to be recorded and a PROAV ID of an index file recorded on the disc 32.

The representative-image setting unit 194 sets a representative image of material data (image data) recorded on the disc 132, according to a user's instruction or the like.

Figure 10:
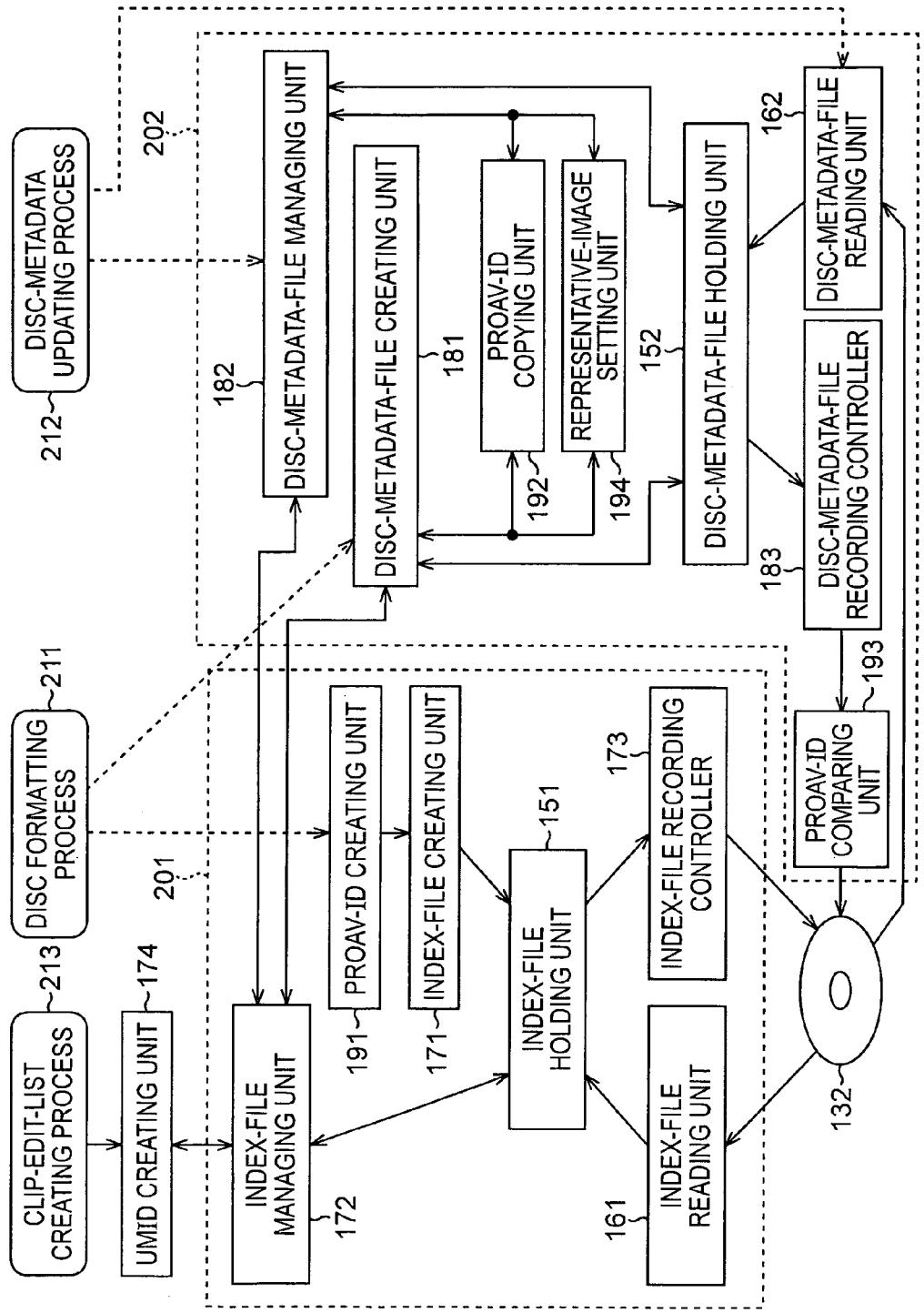
FIG. 10 is a functional block diagram showing relationship among processes executed by components shown in FIGS. 7 to 9.

The relationship among the functions of the components described with reference to FIGS. 7 to 9 will be described with reference to a functional block diagram shown in FIG. 10.

An index processing unit 201 for executing processing regarding an index file includes the index-file holding unit 151, the index-file reading unit 161, the index-file creating unit 171, the index-file managing unit 172, the index-file recording controller 173, and the PROAV-ID creating unit 191.

For example, when a disc formatting process 211 is executed to start a formatting process for the disc 132, the PROAV-ID creating unit 191 creates a PROAV ID, and the index-file creating unit 171 creates an index file, which is management information of files recorded on the disc 132, using the PROAV ID. The index file created is supplied to the index-file recording controller 173 via the index-file holding unit 151, and is recorded on the disc 132 mounted on the drive 126.

When the disc 132 having recorded thereon image data, audio data, or the like is mounted on the drive 126, the index-file reading unit 161 reads an index file from the disc 132 and stores the index file in the index-file holding unit 151.

When a clip/edit-list updating process 213 is executed so that a clip composed of image data, audio data, or the like, or an edit list, which is editing information of a clip, is created and recorded on the disc 132, the UMID creating unit 174 creates a UMID associated with the clip or edit list created, and the index-file managing unit 172 updates the index file held in the index-file holding unit 151 by adding information regarding the clip or edit list to be recorded.

When the index file has been updated as described above, the index-file recording controller 173 reads the index file from the index-file holding unit 151 and records the index file on the disc 132.

A disc-metadata processing unit 202 for executing processing regarding disc metadata includes the disc-metadata-file holding unit 152, the disc-metadata-file reading unit 162, the disc-metadata-file creating unit 181, the disc-metadata-file managing unit 182, the disc-metadata-file recording controller 183, the PROAV-ID copying unit 192, the PROAV-ID comparing unit 193, and the representative-image setting unit 194.

For example, when a disc formatting process 211 is executed to start a formatting process of the disc 132, using the PROAV-ID copying unit 192 and the representative-image setting unit 194, the disc-metadata-file creating unit 181 creates various types of label information, creates a disc-metadata file, and stores the disc-metadata file in the disc-metadata-file holding unit 152.

That is, the PROAV-ID copying unit 192 copies a PROAV ID of an index file held in the index-file holding unit 151, and sets the PROAV ID as a PROAV ID to be recorded in the disc-metadata file. Furthermore, the representative-image setting unit 194 sets a beginning frame image of a beginning clip of material data recorded on the disc 132 as a representative image of the disc 132. The disc-metadata-file creating unit 181 creates a disc-metadata file using various types of label information including these pieces of setting information, and stores the disc-metadata file in the disc-metadata-file holding unit 152.

The disc-metadata-file recording controller 183 records the disc-metadata file held in the disc-metadata-file holding unit 152 on the disc 132 mounted on the drive 126.

When a disc-metadata updating process 212 is executed, the disc-metadata-file reading unit 162 reads a disc-metadata file from the disc 132 mounted on the drive 126, and supplies the disc-metadata file to the disc-metadata-file holding unit 152 so that it is held therein. The disc-metadata-file managing unit 182 updates the disc-metadata file held in the disc-metadata-file holding unit 152, for example, using the representative-image setting unit 194. The disc-metadata-file recording controller 183 uses the PROAV-ID comparing unit 193 to compare the PROAV ID of the disc-metadata file updated and the PROAV ID of the index file recorded on the disc 132. When these PROAV IDs match, the disc-metadata-file recording controller 183 determines that the content of the disc-metadata file to be recorded is information associated with data recorded on the disc 132, and records the disc-metadata file on the disc 132.

As described above, in accordance with operation instructions, components relevant to the respective instructions cooperate to execute the operations instructed.

By recording label information that serves as a label of content recorded on the disc 132 as a disc-metadata file on the disc 132, the user of the editing apparatus 100 (including a playback apparatus, a recording apparatus, a management apparatus, an information processing apparatus, a recording and playback apparatus, or the like) for using data recorded on the disc 132 can more readily identify information recorded on the disc 132, by referring to the label information recorded on the disc 132.

Furthermore, when the disc-metadata file read from the disc 132 is updated and then recorded on the disc 132, by comparing the PROAV ID included in the disc-metadata file and the PROAV ID of the index file to check whether the disc-metadata file to be recorded is associated with material data recorded on the disc 132 before recording disc metadata, the editing apparatus 100 can record label information more accurately on the disc 132. Thus, more accurate label information can be provided to the user of the material data recorded on the disc 132.

Next, specific flows of the processes described above will be described.

When the execution of a formatting process for the disc 132 mounted on the drive 126 is instructed, for example, by a user's operation of the input unit 121, the components of the editing apparatus 100 shown in FIG. 6 start a disc formatting process.

The disc formatting process will be described with reference to a flowchart shown in FIG. 11.

First, in step S11, the recording controller 116 executes a UDF (Universal Disk Format) formatting process on the disc 132 mounted on the drive 126 to execute a logical formatting process based on the UDF. Then, proceeding to step S12, the recording controller 116 creates a PROAV directory under a root directory in the disc 132 on the basis of the UDF and records the PROAV directory on the disc 132. In step S13, the recording controller 116 creates a clip root directory for containing files of material data such as image data or audio data and files of information regarding the material data under the PROAV directory and records the clip root directory on the disc 132. In step S14, under the PROAV directory, the recording controller 116 creates an edit-list root directory for containing editing results (editing information) yielded by non-destructive editing of a clip, which is a set of files of material data or the like stored under the clip root directory, and records the edit-list root directory on the disc 132.

In step S15, the index-file creating unit 171 of the recording controller 116 executes an index-file creating process to create an index file using the XML (extensible Markup Language). After executing the index-file creating process, the index-file creating unit 171 proceeds to step S16. The index-file creating process will be described later in detail with reference to a flowchart shown in FIG. 12.

In step S16, the disc-metadata-file creating unit 181 executes a disc-metadata-file creating process to create a disc-metadata file, and the disc formatting process is exited. The index-file creating process will be described later in detail with reference to a flowchart shown in FIG. 20.

As described above, during disc formatting, the components of the editing apparatus 1 create an index file for managing information of each file, and a disc-metadata file composed of label information of the disc 132.

Next, the index-file creating process executed in step S15 shown in FIG. 11 and described above will be described in detail with reference to a flowchart shown in FIG. 12.

First, in step S31, the index-file creating unit 171 controls the PROAV-ID creating unit 191 to execute a PROAV-ID creating process for creating a PROAV ID included in an index file. The PROAV-ID creating process will be described later in detail with reference to a flowchart shown in FIG. 13.

After creating the PROAV ID, in step S32, the index-file creating unit 171 creates information other than the PROAV ID, such as a clip table or an edit table, and supplies the information to the index-file holding unit 151 so that it is held therein. After the processing in step S32 is finished, the index-file creating unit 171 exits the index-file creating process, and the process returns to step S16 shown in FIG. 11.

Next, the PROAV-ID creating process executed in step S31 shown in FIG. 12 will be described in detail with reference to a flowchart shown in FIG. 13.

First, in step S51, the PROAV-ID creating unit 191 of the recording controller 116 requests the timekeeping unit 118 for current-time information via the bus 117 to obtain the current-time information, and generates a 7-byte time snap. More specifically, the PROAV-ID creating unit 191 represents 24 hours by 3 bytes (24 hours is equally divided into 16,777,216 units), converts the current-time information obtained from the timekeeping unit 118 into the 3-byte representation (with immediately preceding 0 o'clock o minutes 0 seconds 00 AM represented by a value "0", the time elapsed from that time to the current time is divided by a time obtained by equally dividing 24 hours into 16,777,216 units), and adds the elapsed-time information to 4-byte date information based on the Julian date to generate a time snap.

Then, in step S52, the PROAV-ID creating unit 191 of the recording controller 116 requests the communication unit 124 for an IEEE-1394-network node unique ID via the bus 117 and the input/output interface 120 to obtain the node unique ID. The communication unit 124 can form a network with other devices via IEEE 1394, which is a high-speed serial interface, and communicate with other devices. The communication unit 124, which is hardware having an IEEE-1394 communication function, has assigned thereto in advance an 8-byte node unique ID for an IEEE-1394 network. The PROAV-ID creating unit 191 requests the communication unit for 124 the node unique ID to obtain the node unique ID.

After obtaining the node unique ID, proceeding to step S53, the PROAV-ID creating unit 191 determines a 6-bit random number using the time snap. Then, the PROAV-ID creating unit 191 adds a 2-bit predetermined fixed value to the time snap, the node unique ID, and the random number, obtained by processing in steps S51 to S53, and creates a PROAV ID by combining these items.

Figure 14:
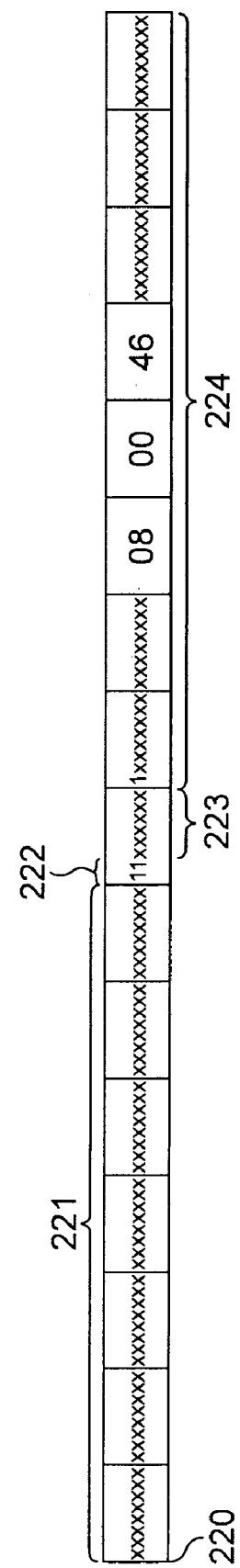
FIG. 14 is a block diagram showing an example structure of a PROAV ID.

FIG. 14 is a schematic diagram showing an example structure of the PROAV ID. In FIG. 14, a PROAV ID 220 is shown as a bit sequence of 8-bit (1-byte) segments, and each bit represented by "X" has a value of "0" or "1". The values of the fourth to sixth bytes from the right are represented by hexadecimal numbers.

Referring to FIG. 14, the PROAV ID 220 is composed of, from the left, a 7-bit time snap 221, a 2-bit fixed value 221, a 6-bit random number 223, and a 64-bit (8-byte) IEEE-1394 node unique ID.

Figure 3:
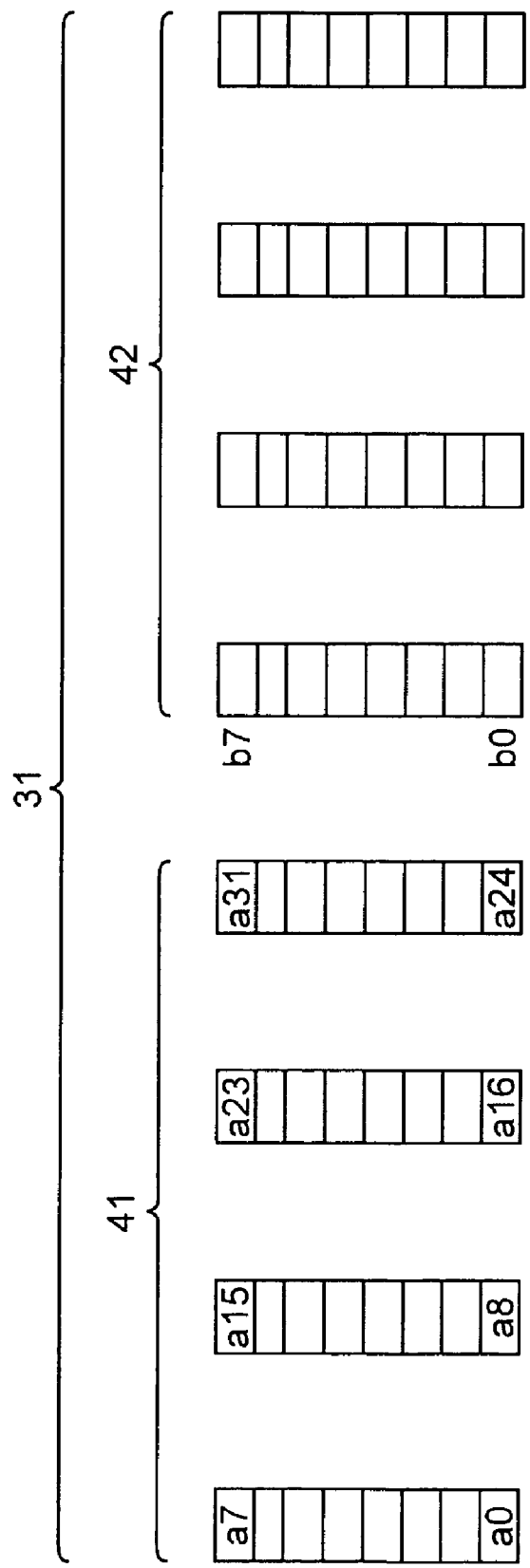
FIG. 3 is a diagram showing a detailed example structure of a time snap shown in FIG. 2.
Figure 4:
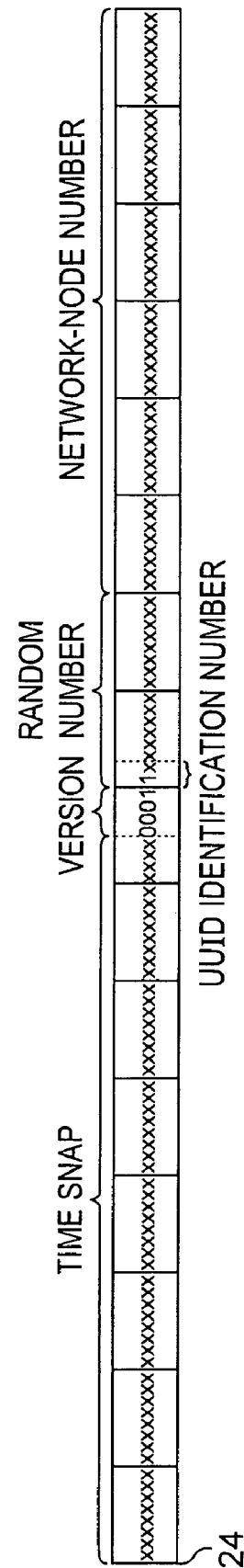
FIG. 4 is a diagram showing another detailed example structure of the material number shown in FIG. 1.

In the time snap 221, the left three bytes (24 bits) are time information, and the remaining 4 bytes (32 bits) are date information based on the Julius date (Julius-date information). That is, the time snap 221 is the time snap 31 shown in FIG. 3 with the lowest 8 bits of the time information 41 omitted.

The fixed value 221 is composed of 2 bits having a predetermined value of "11". This value is a value for distinction from other IDs such as material numbers of AAF, UUID, UMID, or the like. The random number 223 is composed of a 6-bit value calculated using a time snap. The random number is used to avoid a situation where a plurality of IDs with the same creation time (the same IDs) is generated and respectively assigned to different formats, for example, when the time setting of the apparatus is incorrect.

Figure 1:
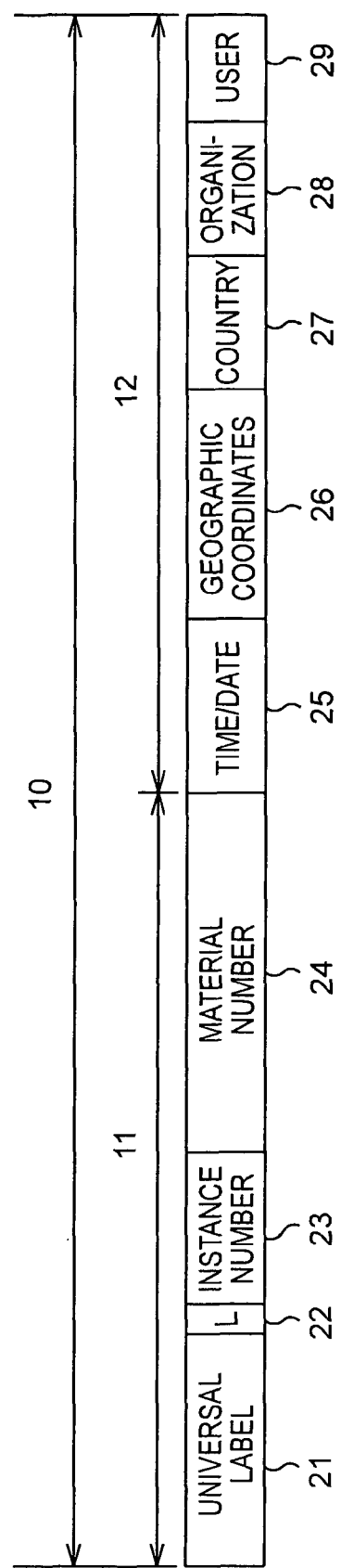
FIG. 1 is a diagram showing an example structure of an extended UMID.
Figure 2:
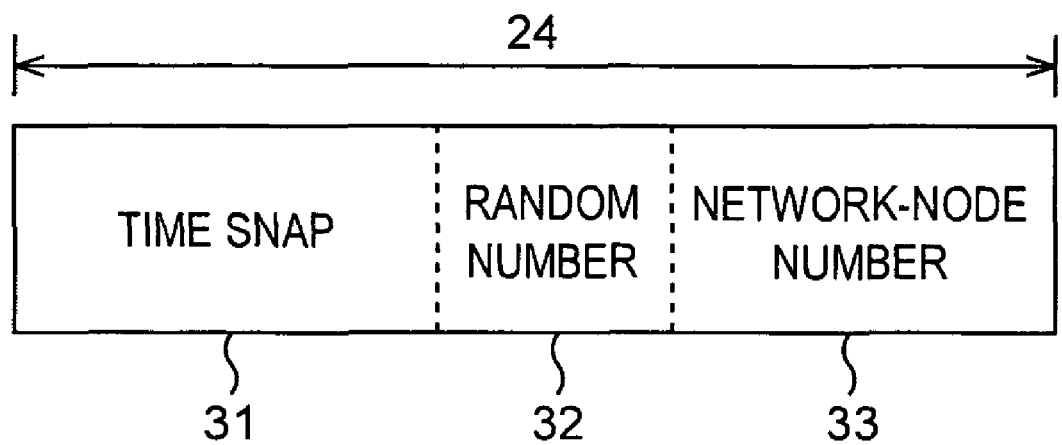
FIG. 2 is a diagram showing a detailed example structure of a material number shown in FIG. 1.

The IEEE-1394 node unique ID 224 is a unique 64-bit identifier assigned in advance to an IEEE-1394 interface (hardware) that serves as a node in an IEEE-1394 network. In the case of the editing apparatus 100 shown in FIG. 6, it is assigned to an IEEE-1394 interface included in the communication unit 124. The high-order 24 bits of the IEEE-1394 node unique ID is an address unique to a manufacturer or a vendor of the interface. In the IEEE-1394 node unique ID 224 shown in FIG. 14, in order that the structure of the PROAV ID 220 be the same as the structure of the material number 24 in the UMID shown in FIG. 2, adjustment is executed so that the position of the low-order 2 bytes (16 bits) is two bytes from the left end of the IEEE-1394 node unique ID (the ninth and tenth bytes from the left in the entire PROAV ID 220). Thus, in the IEEE-1394 node unique ID 224 shown in FIG. 14, the fourth to sixth bytes from the left (24 bits represented by hexadecimal numbers "08", "00", and "46" in the figure) serve as the high-order 24 bits of the IEEE-1394 node unique ID.

Figure 15:
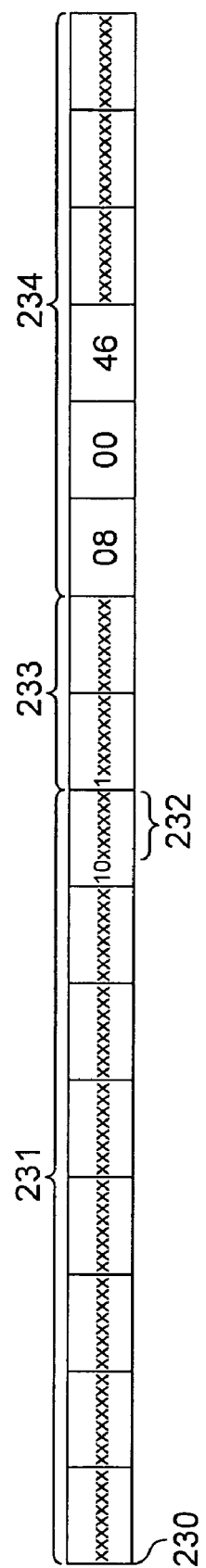
FIG. 15 is a diagram showing a more detailed example structure of the material number of the UMID.

FIG. 15 shows a detailed example construction of a material number in an UMID of the SMPTE. Referring to FIG. 15, a material number 230 is composed of a time snap 231, a 2-byte random number 233, and a network-node number 234. The rightmost 1 byte of the time snap 231 is composed of, from the left, a 2-bit setting value having a value of "10" and a 6-bit time-zone code (TZ code) 232.

Of the 2-bit setting value, the left one bit (the bit with a value of "1") indicates that the date information in the time snap 231 is time information based on the Julian date. In the case of a material number of a UMID of the SMPTE, the right one bit has a value of "0". The time-zone code (TZ code) 232 is a code representing a region for determining the time snap, and the time snap is created in accordance with the standard time in the region.

The network-node number 234 is a MAC address of Ethernet(R), and the high-order 24 bits thereof (the 24 bits represented by the hexadecimal values of "08", "00", and "46" in FIG. 15) is a number unique to the manufacturer or vendor of the NIC.

As described above, the position of the high-order 24 bits of the IEEE-1394 node unique ID in the PROAV ID 220 shown in FIG. 14 and the high-order 24 bits of the network-node number 234 in the material number 230 shown in FIG. 15 are both values representing a manufacturer or a vendor of the interface, and are disposed at the same position. Thus, the editing apparatus 100 can process the PROAV ID 220 similarly to the case of the material number of the UMID, and the editing apparatus 100 can distinguish the ID from other IDs by referring to only a part of the ID (i.e., the high-order 24 bits of the IEEE-1394 node unique ID of the PROAV ID 220) to check whether the value is a number unique to the manufacturer (vendor), and also to broadly classify the PROAV ID 220 on the basis of the value (i.e., the name of the manufacturer (vendor)). Thus, for example, in a clip searching process, a disc-metadata-file authentication process, or the like, the load of the process can be reduced.

Although the number unique to the manufacturer or vendor is located at the same position in the PROAV ID 220 and the material number 230 as described above, the value of the fixed value 222 in the PROAV ID 220 shown in FIG. 14 is "11". On the other hand, the value of the setting value in the material number 230 shown in FIG. 15, located at the same position as the fixed number 222, is "10". Thus, the editing apparatus 100 can readily distinguish the PROAV ID 220 from IDs in which the number unique to the manufacturer or vendor is located at the same position, such as the material number 230. Thus, for example, in a clip searching process, a disc-metadata-file authentication process, or the like, the load of the process can be reduced.

Figure 12:
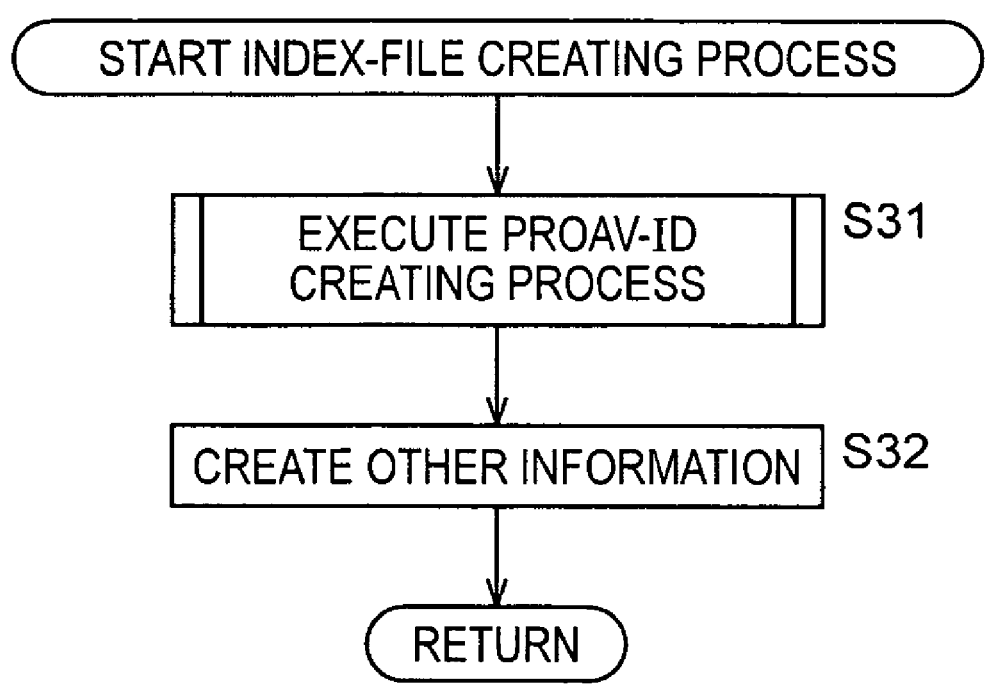
FIG. 12 is a flowchart for explaining an index-file creating process.
Figure 13:
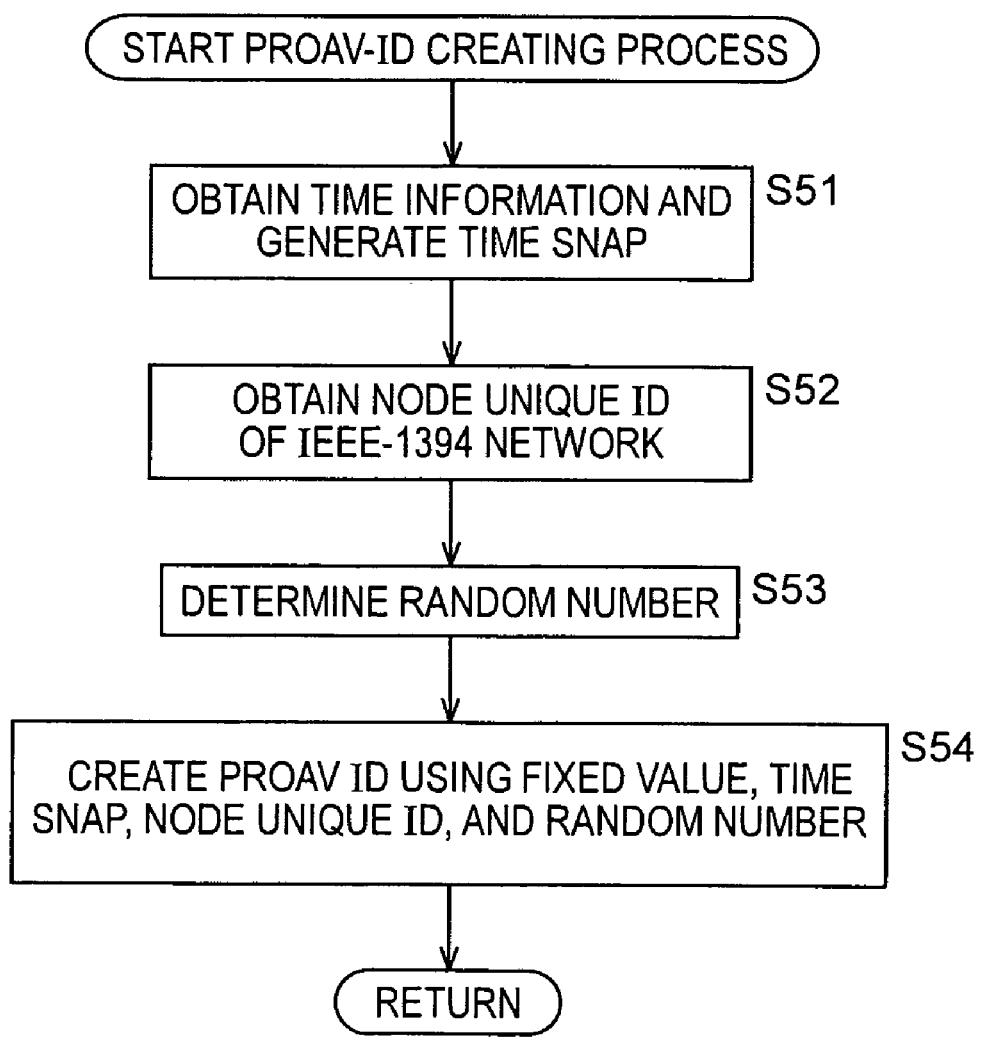
FIG. 13 is a flowchart for explaining a PROAV-ID creating process.

After creating the PROAV ID as described above, the PROAV-ID creating unit 191 exits the PROAV-ID creating process, and the process returns to step S32 shown in FIG. 12.

Next, the index file created as described above will be described.

FIGS. 16 to 19 shows specific examples of description of the index file. In FIGS. 16 to 19, numerals at the beginnings of the lines are attached for convenience of description, and are not parts of XML description.

As described above, the index file is a file for unitarily managing information of files recorded in the disc 132. More specifically, information of files of and under the ProAV directory created in step S12 shown in FIG. 11 (the entire format) is managed. The information of files is described between a start tag on the 2nd row in FIG. 16 and an end tag on the 16th row in FIG. 19, and is broadly divided into information regarding the entire format, information regarding clips, and information regarding edit lists.

The information regarding the entire format is written from the 1st row to the 3rd row in FIG. 16. On the 1st row in FIG. 16, it is indicated that the description is based on the XML version "1.0" and that the character encoding scheme is "UTF-8". On the 2nd and 3rd rows, a start tag indicating the start of description of the index file is shown, and a namespace identifier used is described on the 2nd row.

The description on the 3rd line, 'ProAV Id="0123456789ABCDEF0123456789ABCDEF"', indicates that the value of the PROAV ID, which is an ID assigned to this format (the PROAV directory and under the PROAV directory) is "0123456789ABCDEF0123456789ABCDEF". In this example, each digit is represented by a hexadecimal number, so that a 16-byte PROAV ID is represented by 32 characters. The PROAV ID is written in the index file as described above.

As will be described later, clips stored under the clip root directory are described in the form of a clip table between a start tag on the 4th row in FIG. 16 and an end tag on the 24th row in FIG. 24. As shown in FIGS. 16 to 18, in this case, four clips are stored under the clip root directory. A first clip is written from the 6th row in FIG. 16 to the 23rd row in FIG. 16, a second clip is written from the 25th row in FIG. 16 to the 13th row in FIG. 17, a third clip is written from the 15th row in FIG. 17 to the 3rd row in FIG. 18, and the fourth clip is written from the 5th row in FIG. 18 to the 23rd row in FIG. 18.

For example, information regarding the first clip is shown between a start tag from "<clip" on the 6th row to ">" on the 7th row in FIG. 16 and an end tag "</clip>" on the 23rd row in FIG. 16, and information regarding the first clip and the like is shown as attributes in the start tag on the 6th and 7th rows in FIG. 16.

More specifically, id attribute indicated by 'id="C0001"' is a description representing an intra-disk ID, which is an identifier for identifying each clip within the disc 132. In this example, it is indicated that an intra-disc ID "C0001" is assigned to the first clip. In the case of this example, as the intra-disc ID, an ID that is the same as the name of the clip directory is assigned.

A umid attribute represented by 'umid="0D1213000000000001044444484EEEE00E0188E130B"' is a description of a UMID, which is an identifier that is unique to a clip and that allows globally unique identification of each clip, and it is indicated that "0D1213000000000001044444484EEEE00E0188E130B", which is a part of a basic UMID composed of 32 bytes, is assigned to the third clip. In this example, of the 32 bytes of the basic UMID, 22 bytes are shown, with 10 bytes in the 12-byte universal label omitted. Each of the digits is represented by a hexadecimal number, so that the 22-byte UMID is represented by 44 characters. Obviously, the UMID used may be a 64-byte extended UMID.

A file attribute indicated by 'file="C0001C01.SMI"' on the 7th row is a description of the file name of a clip information file, which is management information for managing a clip. In the case of FIG. 16, it is indicated that the file name of the clip information file of the first clip is "C0001C01.SMI". An fps attribute indicated by 'fps="59.94i"' on the 7th row is a description of the resolution of image data with respect to a temporal-axis direction (i.e., the frame frequency of image data). The unit is "field/sec", and information indicating distinction between an interlaced scanning signal and a progressive scanning signal is included as additional information. In the case of FIG. 16, it is indicated that the image data of the first clip is an interlaced signal with a field frequency of 59.94 Hz (e.g., NTSC (National Television Standards Committee) color signal).

A dur attribute indicated by 'dur="100000"' on the 7th row is a description of an effective length of the clip image data with respect to the temporal direction. The unit is the number of frames. All the frames of image data are not always played back or edited. For example, in some cases, some frames are excluded from processing on the basis of marks such as IN points and OUT points so that the other frames are effective for playback or editing. The length of such a segment that is not removed from data but is not processed is not included herein, and only the length of effective segments in all the frames of the image data is indicated. In the case of FIG. 16, it is indicated that the length of effective segments of the image data of the first clip is 100000 frames.

A ch attribute indicated by 'ch="4"' on the 7th row is a description of the number of channels of audio data included in the clip. That is, in case of FIG. 16, it is indicated that the first clip includes four channels of audio data.

An aspectRatio attribute indicated by 'aspectRatio="4:3"' on the 7th row is a description of an aspect ratio representing the ratio of the horizontal length to the vertical length of a playback image of the image data included in the clip. In the case of FIG. 16, it is indicated that the aspect ratio of a playback image of the image data included in the first clip is 4 to 3.

Following the information regarding the entire first clip described above, on the 8th and 9th rows in FIG. 16, information regarding the image data of the first clip is described, and on the 10th to 17th rows in FIG. 16, information regarding the audio data of the four channels is described on a channel-by-channel basis.

On the 18th and 19th rows in FIG. 16, information regarding a substream, which is material data composed of low-resolution image data and audio data corresponding to the image data and audio data described above, is described. On the 20th and 21st rows in FIG. 16, information regarding clip metadata, which is metadata attached to a clip, is described. On the 22nd row in FIG. 16, information regarding frame metadata, which is attached on a frame basis to the image data of the clip, is described.

Furthermore, for the second to fourth clips, similarly to the case of the first clip described above, information regarding each of the clips, and information regarding files constituting each of the clips are described.

As described above, in the index file, information regarding clips recorded on the disc 132, and information regarding files constituting each of the clips are arranged in a table and are recorded in the form of a clip table.

The edit lists stored under the edit-list root directory are described in the form of an edit-list table between a start tag on the 25th row in FIG. 18 and an end tag on the 15th row in FIG. 19. As shown in FIGS. 16 to 19, in this case, four edit lists are stored under the edit-list root directory. A first edit list is described from the 26th row in FIG. 18 to the 1st row in FIG. 19. A second edit list is described from the 2nd row in FIG. 19 to the 5th row in FIG. 19. A third edit list is described from the 6th row in FIG. 19 to the 9th row in FIG. 19. A fourth edit list is described from the 10th row in FIG. 19 to the 14th row in FIG. 19.

As described above, in the index file, information regarding edit lists recorded on the disc 132 are arranged in a table and is recorded in the form of an edit-list table.

Figure 11:
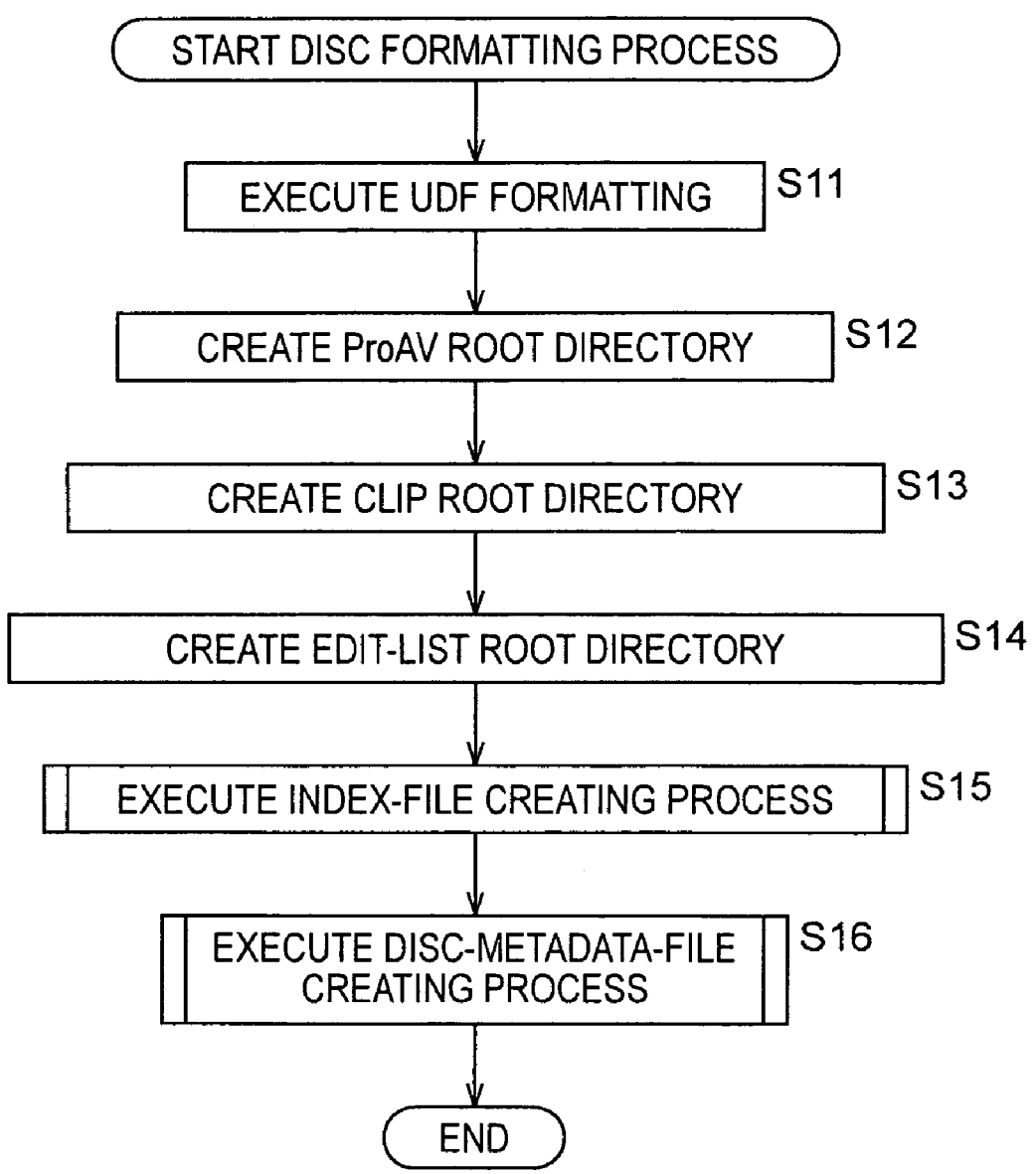
FIG. 11 is a flowchart for explaining a disc formatting process.

By executing processing in step S15 shown in FIG. 11, the index file described in XML, shown in FIGS. 16 to 19, is generated and is recorded on the disc 132. At the time when the processing in step S15 shown in FIG. 11 is executed, clips or edit lists are not recorded on the disc 132, so that the information regarding clips and edits lists, shown in FIGS. 16 to 19, does not exist. The editing apparatus 100 shown in FIG. 6 can obtain information regarding clips and edit lists recorded on the disc 132 by reading the index file from the disc 132 after recording clips and edit lists on the disc 132.

As described above, by describing a PROAV ID in the index file, the editing apparatus 100 on which the disc 132 is mounted can exercise management on the basis of each disc (each format) of material data. Thus, even when searching for a clip from a plurality of discs, the editing apparatus 100 can readily identify a target clip. Furthermore, when updating a disc-metadata file including label information or the like, the editing apparatus 100 can readily recognize a disc associated with the disc-metadata file, and can provide more accurate label information to the user.

Although the values of UMIDs assigned to the respective files are the same in FIGS. 16 to 19, actually, UMIDs having different values are assigned, respectively. Furthermore, although examples of UMIDs representing respective pieces of data are described, for example, on the 6th, 8th, 10th, 12th, 14th, 16th, 18th, 25th, 27th, and 29th rows in FIG. 16, the 2nd, 4th, 6th, 8th, 15th, 18th, 20th, 22nd, 24th, 26th, and 28th rows in FIG. 17, the 5th, 8th, 10th, 12th, 14th, 16th, 18th, and 26th rows in FIG. 18, and the 2nd, 6th, and 10th rows in FIG. 19 in FIGS. 16 to 19, these only indicate description positions or the like of UMIDs, and these are virtual UMIDs with meaningless values. Actually, valid UMIDs created according to a method defined by the SMPTE are described in place of the virtual UMIDs described above.

Similarly, although an example description of the PROAV ID is given on the 3rd row in FIG. 16, this only represents description position or the like of the PROAV ID, and is a virtual PROAV ID with a meaningless value. Actually, a valid PROAV ID created according to the method described earlier is described in place of the virtual PROAV ID described above.

Figure 20:
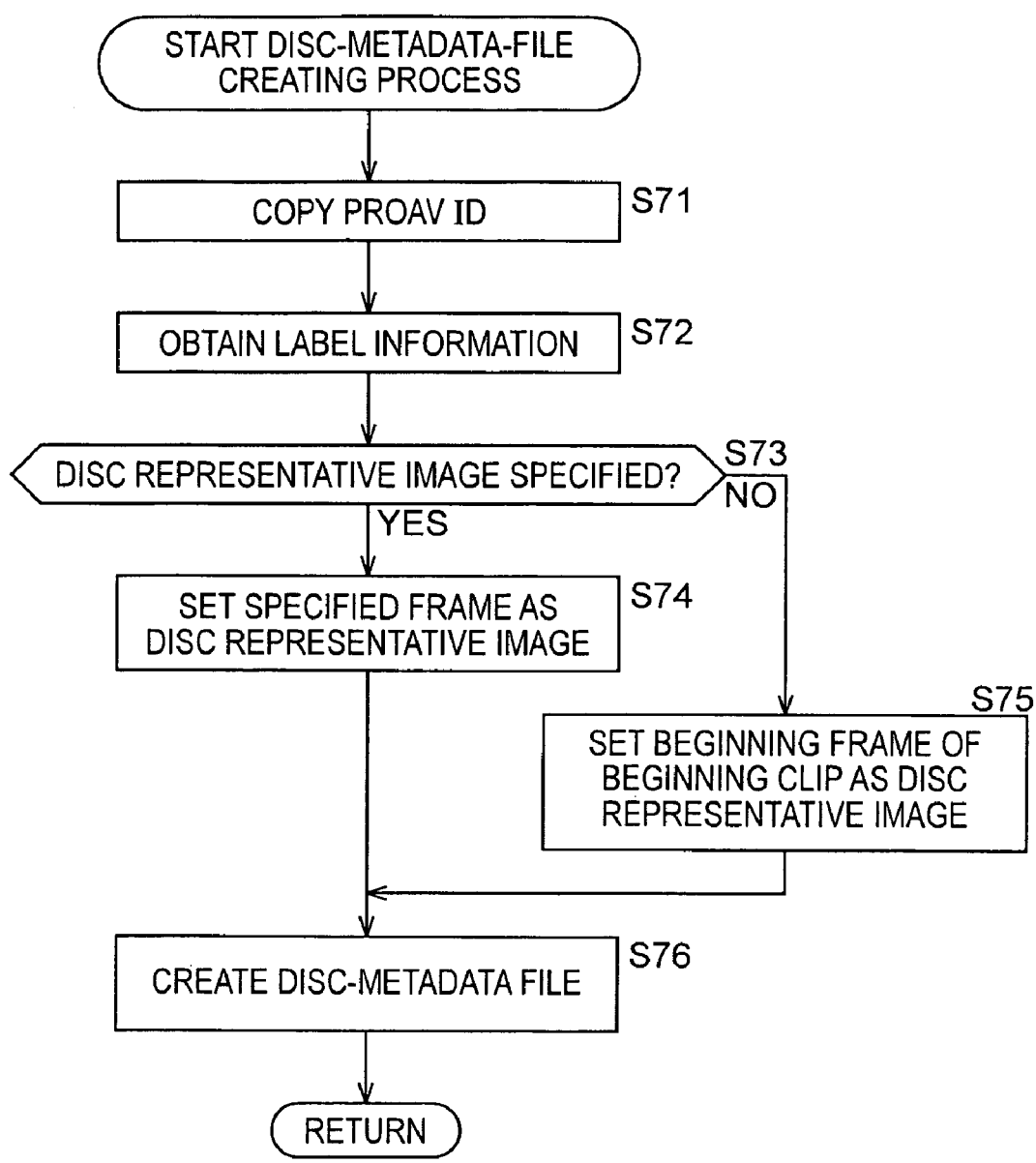
FIG. 20 is a flowchart for explaining a disc-metadata-file creating process.

Next, the disc-metadata file creating process executed in step S16 shown in FIG. 11 will be described with reference to a flowchart shown in FIG. 20.

First, in step S71, the PROAV-ID copying unit 192, under the control of the disc-metadata-file creating unit 181, copies the PROAV ID of the index file held in the index-file holding unit 151 (the PROAV ID written on the 3rd row in FIG. 16), and proceeds to step S72.

In step S72, the disc-metadata-file creating unit 181 obtains label information such as a title, which is, for example, input by a user's operation of the input unit 121 and held in the information holding unit 114, and proceeds to step S73.

In step S73, the representative-image setting unit 194, under the control of the disc-metadata-file creating unit 181, checks whether a representative image of clips recorded on the disc 132 is specified, for example, by the user. For example, when information representing user's specification of a representative image exists in the information holding unit 114 and it is determined that a disc representative image is specified, proceeding to step S74, the representative-image setting unit 194 sets a specified frame as a disc representative image on the basis of the specification information. After setting the representative image, the representative-image setting unit 194 proceeds to step S76.

When it is determined in step S73 that a representative image is not specified, proceeding to step S75, the representative-image setting unit 194 sets the beginning frame of the beginning clip among clips recorded on the disc 132 as a disc representative image.

The beginning clip refers to a clip that is to be played back first according to instructions in the XML description of the index file shown in FIGS. 16 to 19 (the first clip in the case of the example shown in FIGS. 16 to 19), and the beginning frame refers to a frame that is to be played back first according to, for example, the XML description of the index file.

After setting the representative image, the representative-image setting unit 194 proceeds to step S76.

In step S76, the disc-metadata-file creating unit 181 creates a disc-metadata file using the pieces of information obtained as described above, and stores the disc-metadata file in the disc-metadata-file holding unit 152. The PROAV-ID creating unit 191 controls the disc-metadata-file recording controller 183 to record the disc-metadata file held in the disc-metadata-file holding unit 152 on the disc 132, exits the disc-metadata-file creating process, and exits the disc formatting process shown in FIG. 11.

Although not shown, the disc-metadata file is composed of an XML description, similarly to the index file. Elements written in the disc-metadata file are shown in a table 241 in FIG. 21.

The table 241 describes element names, element types, value formats or enumerated values, examples of values, occurrences, meanings, and input methods. In the "element name" column, names of elements that can be written in the disc-metadata file are shown, and "mainTitle", "subtitle", "otherTitle", "CreationDate", "userDate", "userDefinedID", "descriiption", "typ", and "PROAV ID" are shown from the top side. In the "element type" column, types of data of elements are shown. "nr" indicates that an element is composed of an arbitrary character string. "lib:dataTimeType" indicates that an element is composed of date information and time information. "7 bitASCII" indicates that an element is composed of ASCII characters (US-ASCII), which can be represented by 7 bits. The number of characters represents a maximum number of characters of an element. "UTF-8" indicates that an element is composed of characters whose encoding scheme is "UTF-8".

In the "value formats or numerated values" column, predetermined formats of elements having specific data formats are shown. In the "examples of values" column, examples thereof are shown. In the "occurrences" column, the number of characters that an element can occur in a single disc-metadata file is shown. "0-" indicates that the element can appear from zero times to any number of times. "0-1" indicates that the element can appear either zero times or once. "1" indicates that the element must occur once, and not twice or more. In the "meaning" column, meanings of respective elements are shown. In the "input method", input methods of the elements are shown.

The elements shown in the table 241 described above will be described more specifically.

On the row with the "number" of "1", description of a main title element (mainTitle) is shown. The element type of the main title element is arbitrary character string (nr), and the main title element may be in English or other languages. This element is an element describing a main title, i.e., a title for the entire clips recorded on the disc 132. That is, the main title element is character information for allowing the user to readily recognize data recorded on the disc 132, and in order that the main title can be displayed in an environment where it is not possible to display fonts other than English, it is desired that description in English is also given. This element may be present or absent, and the number of occurrences of this element is arbitrary. The content of the main title element is defined by user's input.

On the row with the "number" of "2", description of a subtitle element (subtitle) is shown. The element type of the subtitle element is arbitrary character string (nr), and may be the subtitle element may be in English or other languages. This element is intended to be an auxiliary element of the main title element described above, and content that supplements the main title is described. That is, the subtitle element is also character information that allows the user to readily recognize data recorded on the disc 132, and in order that the main title can be displayed in an environment where it is not possible to display fonts other than English, it is desired that description in English is also given. This element may be present or absent, and the number of occurrences of this element is arbitrary. The content of the subtitle element is defined by user's input.

On the row with the "number" of "3", description of an other title element (otherTitle) is shown. The element type of the other title element is arbitrary character string (nr), and the other title element may be in English or other languages. This element is used when a further title is to be given in addition to the main title element and the subtitle element described above. That is, the other title element is also character information for allowing the user to readily recognize data recorded on the disc 132, and in order that the main title can be displayed in an environment where it is not possible to display fonts other than English, it is desired that description in English is also given. This element may be present or absent, and the number of occurrences of this element is arbitrary. The content of the other title element is defined by user's input.

On the row with the "number" of "4", description of a creation date and time element (CreationDate) is shown. The element type of the creation date and time element is date information and time information (lib:dateTimeType), and the creation date and time element is composed of date and time information obtained from the timekeeping unit 118. This element indicates a creation date and time of the format of the disc 132, i.e., the creation date and time of the index file, and when the setting is such that the creation date element is written, at the time of creation of the index file, the date and time information at that time is automatically written. This element may be present or absent, and the number of occurrences of this element is arbitrary.

On the row with the "number" of "5", description of user date and time element (userDate) is shown. The element type of the creation date and time element is date information and time information (lib:dateTimeType), and the creation date and time element is composed of date and time information input by the user. This element is used when the user wishes to record a date and time other than the creation date and time for the purpose of management. This element may be present or absent, and the number of occurrences of this element is arbitrary. The content of the user date and time element is defined by user's input.

On the row with the "number" of "6", description of a user defined ID element (userDefinedID) is shown. The user defined ID element is composed of a character string of not more than 63 7 bit ASCII characters, and is composed of a user defined ID that is defined, for example, when the user has a proprietary management scheme. This element may be present or absent, and the maximum number of occurrences of this element is one. The content of the user defined ID element is defined by user's input.

On the row with the "number" of "7", description of a free description element (description) is shown. The free description element is composed of a UTF-8 encoded character string that does not exceed 1023 bytes, and is composed of free text characters input by the user. This element may be present or absent, and the maximum number of occurrences of this element is one.

On the row with the "number" of "8", description of a representative image element (typ) is shown. The representative image element is composed of a 7-bit ASCII character string not exceeding 12 characters. The representative image element allows, for example, the user to intuitively grasp the content of clips recorded on the disc 132 on the basis of image information as well as text information such as a title, and a representative frame image of clips recorded on the disc 132 is set. The representative image element is composed of a clip number and a frame number, such as "CXXXX-YYYYYY". That is, for example, the representative image element is "C0001-1". As described earlier, as the value of the representative image element, when a frame image is specified by the user, the frame image is selected and set, and when no frame image is specified by the user, the beginning frame image (frame image with a frame number of 1) of the beginning clip recorded on the disc 132 is set. This element may be present or absent, and the maximum number of occurrences of this element is one.

On the row with the "number" of "9", description of a PROAV ID element (PROAV ID) is shown. The PROAV ID element is composed of a 7-bit ASCCI character string not exceeding 16 characters, and is composed of a copy of the PROAV ID written in the index file. The content of the PROAV ID element is determined and written by referring to the index file when the disc-metadata file is created. This element must be written once. The PROAV ID element must not occur twice or more.

Figure 22:
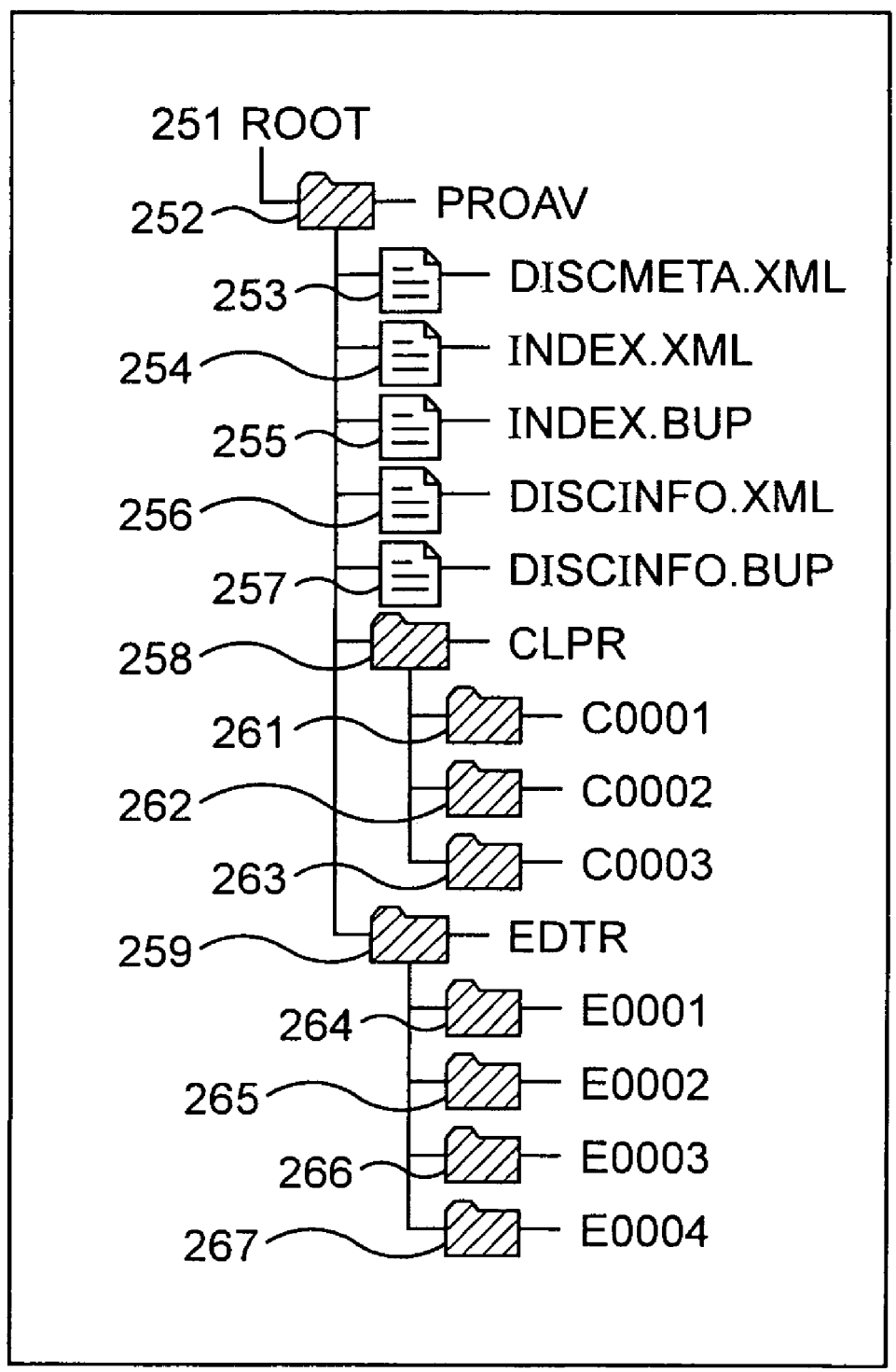
FIG. 22 is a diagram showing an example directory structure in a disc shown in FIG. 6.
Figure 23:
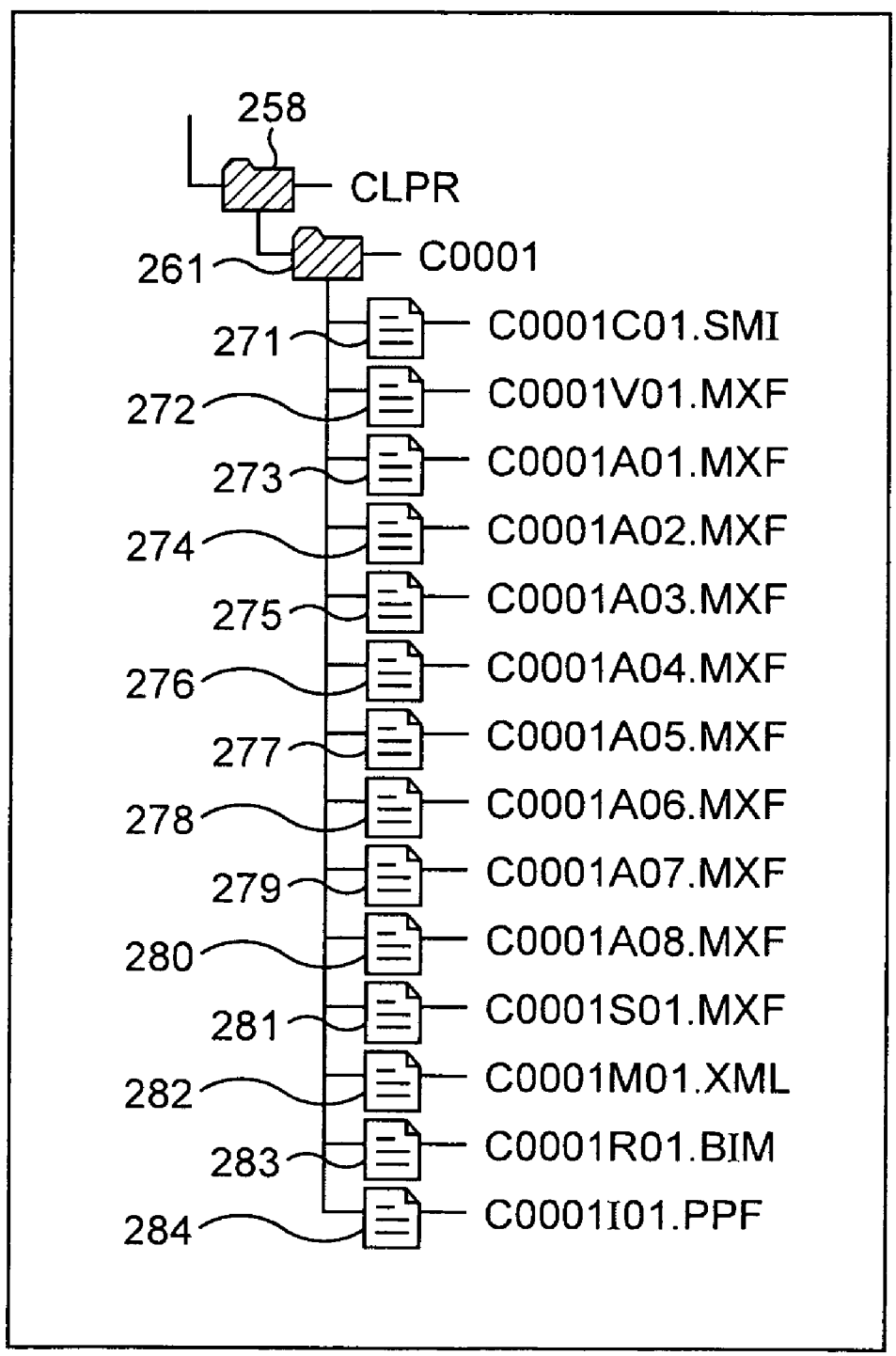
FIG. 23 is a diagram showing a more detailed example structure of the directory structure shown in FIG. 22.
Figure 24:
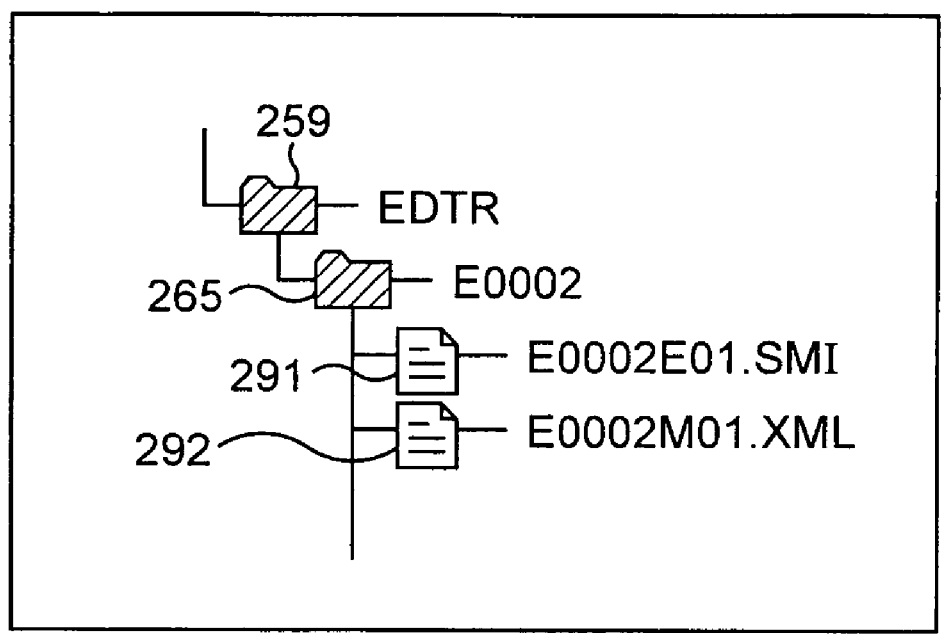
FIG. 24 is a diagram showing a more detailed example structure of the directory structure shown in FIG. 22.

The index file and the disc-metadata file created as described above are managed on the disc 132 by a directory structure shown in FIGS. 22 to 24.

Data recorded on the disc 132 is managed by a file system such as the UDF. The file system is not limited to UDF, and any file system can be used as long as it is supported by the editing apparatus 1, such as the ISO 9660 (International Organization for Standardization 9600). When a magnetic disc such as a hard disc is used instead of the disc 32, FAT (File Allocation Tables), NTFS (New Technology File System), HFS (Hierarchical File System), or UFS (Unix(R) File System), or the like may be used as the file system. Alternatively, a special-purpose file system may be used.

Referring to FIG. 22, in a root directory (ROOT) 251, a PROAV directory 252 is provided, having subdirectories where information regarding material data such as image data and audio data, edit lists representing results of editing of 'these material data, and so forth are contained.

In the PROAV directory 252, a disc-metadata file (DISC-META.XML) 253 including titles and comments for all the material data recorded on the disc 132, a path of image data corresponding to the representative image, which is a frame that serves as a representative of all the image data recorded on the disc 132, and so forth, an index file (INDEX.XML) 254 including management information or the like for managing all the clips and edit lists recorded on the disc 132, and an index file (INDEX.BUP) 255 are provided. The index file 255 is a copy of the index file 254, and reliability is improved by preparing two files.

Furthermore, in the PROAV directory 252, a disc-information file (DISCINFO.XML) 256 and a disc-information file (DISCINFO.BUP) 257 including metadata for the entire data recorded on the disc 132, such as playback history, are provided. The disc-information file 257 is a copy of the disc information file 256, and reliability is improved by preparing two files.

In the PROAV directory 252, in addition to the files described above, a clip root directory (CLPR) 258 having subdirectories containing clip data, and an edit-list root directory (EDTR) 259 having subdirectories including edit-list data are provided.

In the clip root directory 258, data of clips recorded on the disc 132 is managed in different directories for the respective clips. For example, in the case of FIG. 22, data of three clips are managed separately in three directories, namely, a clip directory (C0001) 261, a clip directory (C0002) 262, and a clip directory (C0003) 263. That is, pieces of data of the clip recorded first on the disc 132 are managed as files under the clip directory 261, pieces of data of a clip recorded secondly on the disc 132 are managed as files under the clip directory 262, and pieces of data of a clip recorded thirdly on the disc 132 are managed as files under the clip directory 263.

In the edit-list root directory 259, edit lists recorded on the disc 132 are managed in different directories for respective editing processes. For example, in the case of FIG. 22, edit lists are managed separately in four directories, namely, an edit-list directory (E0001) 264, an edit-list directory (E0002) 265, an edit-list directory (E0003) 266, and an edit-list directory (E0004) 267. That is, edit lists representing results of the first editing of clips recorded on the disc 132 are managed as files under the edit-list directory 264, edit lists representing results of the second editing are managed as files under the edit-list directory 265, edit lists representing results of the third editing are managed as files under the edit-list directory 266, and edit lists representing results of the fourth editing are managed as files under the edit-list directory 267.

Under the clip directory 261 provided in the clip root directory 258 described above, pieces of data of the clip recorded first on the disc 132 are provided and managed as files as shown in FIG. 23.

In the case of FIG. 22, in the clip directory 261, a clip-information file (C0001C01.SMI) 271 for managing this clip, an image-data file (C0001V01.MXF) 272 including image data of this clip, eight audio data files (C0001A01.MXF to C0001A08.MXF) 273 to 280 including audio data of respective channels of this clip, a low-resolution-data file (C0001S01.MXF) 281 including substream data of this clip, a clip-metadata file (C0001M01.XML) 282 including clip metadata, which is metadata not requiring real-time property, a frame-metadata file (C0001R01.BIM) 283 including frame metadata, which is metadata requiring real-time property, a picture-pointer file (C0001I01.PPF) describing a frame structure of the image-data file 272 (e.g., information regarding a compression format on a picture-by-picture basis for MPEG or the like, or information representing an offset address from the beginning of the file), and so forth are provided.

In the case of FIG. 23, image data, low-resolution data, and frame metadata, which require real-time property at the time of playback, are each managed as a single file so that reading time will not increase.

Audio data also requires real-time property. In order to support multiple audio channels such as 7.1 channels, 8 channels are provided, which are managed as different files, respectively. That is, although it has been described that audio data are managed as eight files, without limitation thereto, the number of files associated with audio data may be 7 or less or 9 or greater.

Similarly, depending on cases, image data, low-resolution data, and frame metadata may each be managed as two or more files.

Furthermore, referring to FIG. 23, clip metadata not requiring real-time property is managed as different files from frame metadata requiring real-time property. This is so arranged that unnecessary metadata will not be read during normal playback of image data or the like. Accordingly, processing time or the load needed for a playback process can be reduced.

Although the clip metadata file 282 is written in XML for the purpose of versatility, the frame metadata file 283 is in the BIM (BInary format for MPEG-7 data) format, which is obtained by compiling an XML file, so that processing time or the load needed for a playback process can be reduced.

An example file structure of the clip directory 261 shown in FIG. 23 can be applied to all the clip directories associated with the respective clips recorded on the disc 132. That is, the example file structure shown in FIG. 23 can be applied to other clip directories 262 and 263 shown in FIG. 22, so that descriptions thereof will be omitted.

Although files contained in a clip directory associated with a single clip have been described, the file structure is not limited to the example described above, and the file structure is arbitrary.

Next, an example file structure under the edit-list root directory 259 shown in FIG. 22 will be described. In subdirectories of an edit-list directory 265 provided in the edit-list root directory 259 described above, data of edit lists representing information regarding results of the second editing on pieces of data of the clips recorded on the disc 132 are provided and managed as files shown in FIG. 24.

In the case of FIG. 24, in the edit-list directory 265, an edit-list file (E0002E01.SMI) 291 for managing the result of editing (edit list), and an edit-list clip-metadata file (E0002M01.XML) 292 including clip metadata associated with the edited material data (parts extracted as edited data among material data of all the clips used for editing) or clip metadata newly generated on the basis of the clip metadata are provided.

The edit-list clip-metadata file 292 includes information extracted from clip metadata of clips used for editing on the basis of the editing results (clip metadata files existing in subdirectories of the clip root directory 258). For example, when editing is performed, metadata of parts corresponding to the edited material data is extracted from clip metadata of clips used for editing, and new clip metadata with the edited material data as a single clip is reconstructed using the metadata. Furthermore, new information is added to the new clip metadata as needed, and the result is managed as an edit-list clip-metadata file. The edit-list clip-metadata file is generated on each occasion of editing.

The edit-list clip-metadata file 292 is written in XML for the purpose of versatility.

The example file structure of the edit-list directory 265 can be applied to all edit lists (results of editing). That is, the example file structure shown in FIG. 24 can be applied to other edit-list directories 264, 266, and 267 shown in FIG. 22, so that descriptions thereof will be omitted.

Although files contained in an edit-list directory associated with a single editing operation have been described above, the file structure is not limited to the example described above, and the file structure is arbitrary.

As described above, the disc metafiles and the index file are located immediately under the PROAV directory, and are managed separately from clips or edit lists.

Figure 25:
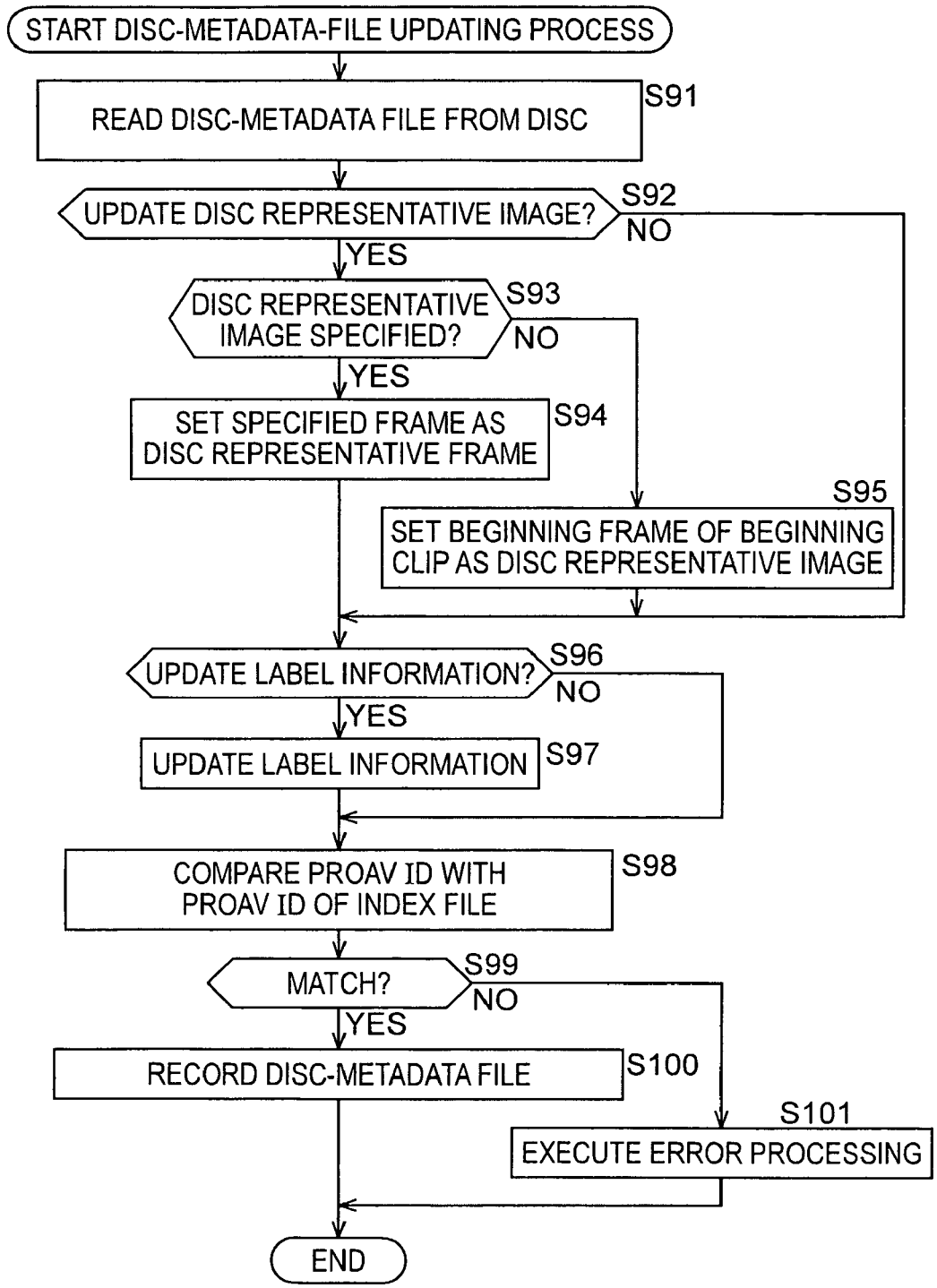
FIG. 25 is a flowchart for explaining a disc-metadata-file updating process.

Next, a disc-metadata-file updating process that is executed when the disc-metadata file recorded and managed on the disc 132 as described above is updated will be described with reference to a flowchart shown in FIG. 25.

When the disc-metadata-file updating process is started, first, in step S91, the disc-metadata-file reading unit 162 controls the drive 126 to read the disc-metadata file from the disc 132 mounted on the drive 126, and stores the disc-metadata file in the disc-metadata-file holding unit 152.

When the disc-metadata file is held by the disc-metadata-file holding unit 152, in step S92, the representative-image setting unit 194, under the control of the disc-metadata-file managing unit 182, determines whether to update the disc representative image. When it is determined that the disc representative image is to be updated on the basis of, for example, a user's instruction, proceeding to step S93, the representative-image setting unit 194 determines whether the disc representative image is specified. When the disc representative image is specified by the user in advance and the specification information is held in the information holding unit 114 or the like, so that it is determined that the disc representative image is specified, proceeding to step S94, the representative-image setting unit 194 sets the specified frame as the representative image of the disc 132 (representative image of all the clips recorded on the disc 132), and proceeds to step S96.

On the other hand, when specification information or the like of the disc representative image does not exist, so that it is determined in step S93 that the disc representative image is not specified, proceeding to step S95, the representative-image setting unit 194 sets the beginning frame of the beginning clip recorded on the disc 132 as the representative image of the disc 132 (representative image of all the clips recorded on the disc 132), and proceeds to step S96.

When it is determined in step S92 that the disc representative image is not to be updated on the basis of, for example, a user's instruction, the representative-image setting unit 194 skips processing in steps S93 to S95 and proceeds to step S96.

In step S96, the representative-image setting unit 194 determines whether to update other label information included in the disc-metadata file. More specifically, of the elements described with reference to the table 241 shown in FIG. 21, the representative-image setting unit 194 determines whether to update elements that can be input by the user (e.g., main title element, subtitle element, other title element, user-specified date element, user-defined ID element, free description element, and so forth) on the basis of, for example, a user's instruction.

When it is determined that the label information is to be updated, proceeding to step S97, the representative-image setting unit 194 updates elements specified for updating in the label information, and proceeds to step S98. When it is determined in step S96 that the label information is not to be updated, the representative-image setting unit 194 skips the processing in step S97 and proceeds to step S98.

When the updating of the elements included in the disc-metadata file is finished, in step S98, the PROAV-ID comparing unit 193, under the control of the disc-metadata-file recording controller 183, compares the value of the PROAV ID element (i.e., the PROAV ID of the disc-metadata file) with the PROAV ID of the index file. Then, in step S99, the PROAV-ID comparing unit 193 checks whether these two PROAV IDs match on the basis of the result of comparison in step S98.

When these two PROAV IDs match so that it is determined that the information of the disc-metadata file is associated with clips and edit lists recorded on the disc 132, the PROAV-ID comparing unit 193 supplies the result of checking to the disc-metadata-file recording controller 183. Proceeding to step S100, on the basis of the result of checking, the disc-metadata-file recording controller 183 obtains the updated disc-metadata file from the disc-metadata-file holding unit 152, and records the updated disc-metadata file by overwriting the disc-metadata file on the disc 132 via the drive 126. After recording the disc-metadata file on the disc 132, the disc-metadata-file recording controller 183 exits the disc-metadata-file updating process.

When the two PROAV IDs do not match so that it is determined in step S99 that the information of the disc-metadata file is not associated with clips and edit lists recorded on the disc 132, the PROAV-ID comparing unit 193 supplies the result of checking to the disc-metadata-file recording controller 183. Proceeding to step S101, on the basis of the result of checking, the disc-metadata-file recording controller 183 executes error processing, and for example, displays an error message on a display or the like via the output unit 122, and exits the disc-metadata-file updating process.

As described above, when the disc-metadata file is recorded on the disc 132, the PROAV-ID comparing unit 193 of the editing apparatus 100 compares the value of the PROAV ID of the disc-metadata file and the value of the PROAV ID of the index file. Thus, the editing apparatus 100 can record the disc-metadata file more accurately on the disc 132.

For example, if a formatting process is executed on the disc 132 during the disc-metadata-file updating process, the content of the disc 132 is updated. In such a case, by comparing PROAV IDs, inconsistency between the content of the disc-metadata file and the content of other clips and edit lists can be prevented.

Figure 26:
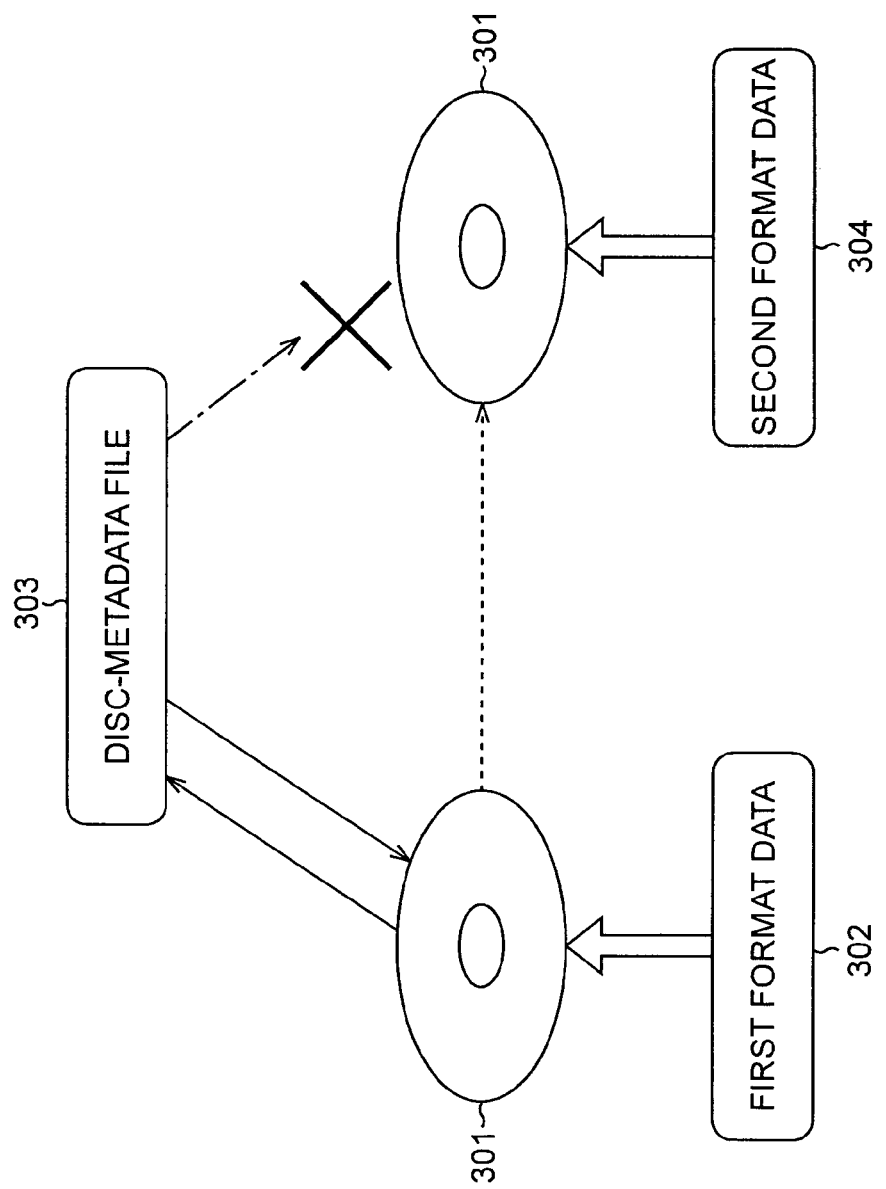
FIG. 26 is a diagram for explaining an example of the manner of the disc-metadata-file updating process.

FIG. 26 shows a specific example of this case. Referring to FIG. 26, first-format data 302 is recorded on a disc 301 in an initial state (the disc 301 on the left side as viewed in the figure). When a disc-metadata file 303 is updated from the disc 301 in this state and an updated disc-metadata file is again recorded on the disc 301 in the same state after the updating process, it is determined by comparison of PROAV IDs that the updated disc-metadata file is associated with the first-format data 302. Thus, the updated disc-metadata file 303 can be recorded on the disc 301.

On the other hand, when the disc-metadata file 303 is read from the disc 301 in the initial state (the disc 301 on the left side as viewed in the figure) and a formatting process is executed on the disc 301 while an updating process is being executed so that second-format data 304 is recorded on the disc 301 (the disc 301 on the right side as viewed in the figure), if the disc-metadata file 303 is recorded again on the same disc 301 after the updating process, PROAV IDs are compared and it is determined that the updated disc-metadata file 303 is not associated with the second-format data 304. Thus, it is not possible to record the disc-metadata file 303 on the disc 301 (the disc 301 on the right side as viewed in the figure).

As described above, the PROAV ID allows identification on the basis of each format, not on the basis of each disc 132 as hardware. Thus, the editing apparatus 100 can record the disc-metadata file more accurately on the disc 132. Furthermore, by recording the PROAV ID on the disc 132 so that it is included in the index file and the disc-metadata file, the PROAV ID can be used in other apparatuses.

As described earlier, the PROAV ID is used for specifying a format or confirming disc metadata, and the purpose or method of use thereof basically differs from that of a UMID, which is used for specifying a clip or an edit list. The method of using an UMID will be described below.

A UMID, which is used for specifying a clip or an edit list, is written in an index file for managing a clip or an edit list, a clip-information file for each clip, or an edit-list file for each edit list, as shown in FIGS. 16 to 19. First, a UMID that is written in a clip-information file will be described.

Figure 27:
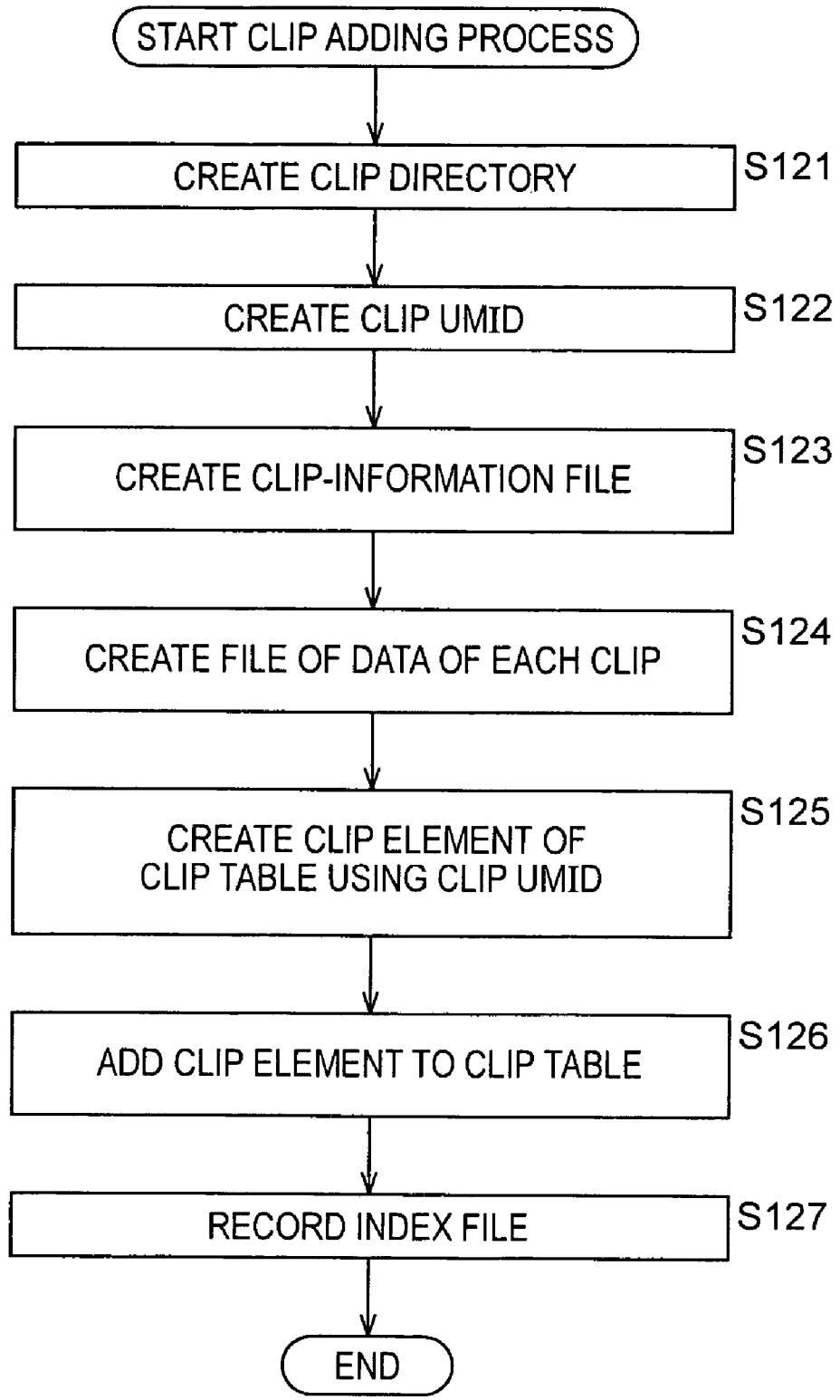
FIG. 27 is a flowchart for explaining a clip adding process.

A clip-information file is created when a clip is recorded on the disc 132. A clip adding process that is executed when a clip is added to the disc 132 will be described with reference to a flowchart shown in FIG. 27. Furthermore, description will be given as needed with reference to FIGS. 28 and 29.

When addition of a new clip to the disc 132 is instructed, for example, by the user, in step S121, the recording controller 116 of the editing apparatus 100 creates a new clip directory under the clip root directory of the disc 132. At that time, the clip directory name is chosen so that it is different from existing clip directory names.

Then, in step S122, the UMID creating unit 174 of the recording controller 116 creates a UMID for each clip and each piece of material data included in the clip. The UMID creating unit 174 supplies the UMID created to the information holding unit 114 so that it is held therein. When a UMID is assigned in advance to a clip to be added, the UMID creating unit 174 obtains the UMID and supplies the UMID to the information holding unit 114 so that it is held therein.

When the processing in step S122 is finished, proceeding to step S123, the recording controller 116 creates a clip-information file under the clip directory created by the processing in step S121.

FIGS. 28 and 29 are diagrams showing specific examples of description of a clip-information file written in XML. In FIGS. 28 and 29, numerals at the beginnings of the lines are attached for convenience of description, and are not parts of the XML description.

As described earlier, the clip-information file is a file for managing information regarding other files existing in the same clip directory as the clip information file, and a method of playing back these files is described.

As shown in FIGS. 28 and 29, the XML description of a clip information file is broadly composed of information regarding the clip information file, a header section enclosed by header tags (<head></head>), and a body section enclosed by body tags (<body></body>).

On the 1st to 3rd rows in FIG. 28, information regarding the clip information file is written. On the 1st row, it is indicated that the description is based on the XML version "1.0" and that the character encoding scheme is "UTF-8". On the 2nd row, the namespace identifier used is written.

'umid="0D121300000000000010444444484EEEE00E 0188E130B"' on the 3rd row in FIG. 28 indicates that the value of the UMID assigned to the clip information file is "0D121300000000000010444444484EEEE00E0188E130B". In this example, of the 32-byte basic UMID, 22 bytes are shown, with 10 bytes in the 12-byte universal label omitted. Each digit is represented by a hexadecimal number, so that the 22-byte UMID is represented by 44 characters. Obviously, the UMID used may be a 64-byte extended UMID.

In the case of FIGS. 28 and 29, the header section is described from the 4th row in FIG. 28 to the 11th row in FIG. 28, and the body section is described from the 12th row in FIG. 28 to the 23rd row in FIG. 29.

In the header section, information regarding clip metadata files existing in the same clip directory is described. In the body section, information regarding files other than the clip metadata files, existing in the same clip directory, is described together with a playback method.

For example, on the 7th to 9th rows in FIG. 28, information regarding clip metadata files is described.

Furthermore, on the 17th to 19th rows in FIG. 28, information of an image data file is described. On the 20th to 22nd rows in FIG. 28, information of an audio data file for the channel 1 is described. On the 23rd to 25th rows in FIG. 28, information of an audio data file for the channel 2 is described. On the 26th to 28th rows in FIG. 28, information of an audio data file for the channel 3 is described. On the 29th row in FIG. 28 to the 1st row in FIG. 29, information of an audio data file for the channel 4 is described. On the 2nd to 4th rows in FIG. 29, information of an audio data file for the channel 5 is described. On the 5th to 7th rows in FIG. 29, information of an audio data file for the channel 6 is described. On the 8th to 10th rows in FIG. 29, information of an audio data file for the channel 7 is described. On the 11th to 13th rows in FIG. 29, information of an audio data file for the channel 8 is described.

On the 16th to 18th rows in FIG. 29, information of a low-resolution data file constituting a substream is described. On the 21st row in FIG. 29, information of a frame metadata file is described.

The files of these image data, audio data, and low-resolution data are each identified using a UMID. More specifically, "umid: 060A2B3401010105010D12130000000123456789AB CDEF01234567 89ABCDEF" is written on the 18th row in FIG. 28, and image data is specified using the UMID. On the 21st row, "umid: 060A2B3401010105010D12130000000123456789AB CDEF0123456 789ABCDEF0" is written, and audio data for the channel 1 is specified using the UMID. As for audio data associated with the channel 2, on the 24th row, "umid: 060A2B340101010501010D121300000023456789ABC DEF01234567 89ABCDEF01" is written, and audio data for the channel 2 is specified using the UMID. Furthermore, as for audio data associated with the channel 2, on the 27th row, "umid: 060A2B340101010501010D12130000003456789ABCD EF012345678 9ABCDEF012" is written, and audio data for the channel 3 is specified using the UMID.

As for audio data associated with the channel 4, on the 30th row in FIG. 28, "umid: 060A2B340101010501010D1213000000456789ABCDE F0123456789 ABCDEF0123" is written, and audio data for the channel 4 is specified using the UMID. As for audio data associated with the channel 5, on the 3rd row in FIG. 29, "umid: 060A2B340101010501010D121300000056789ABCDEF 0123456789A BCDEF01234" is written, and audio data for the channel 5 is specified using the UMID. As for audio data associated with the channel 6, on the 6th row in FIG. 29, "umid: 060A2B340101010501010D12130000006789ABCDEF 0123456789AB CDEF012345" is written, and audio data for the channel 6 is specified using the UMID.

As for audio data associated with the channel 7, on the 9th row in FIG. 29, "umid: 060A2B340101010501010D1213000000789ABCDEF 0123456789ABC DEF0123456" is written, and audio data for the channel 7 is specified using the UMID. As for audio data associated with the channel 8, on the 12th row, "umid: 060A2B340101010501010D121300000089ABCDEF01 23456789ABCD EF01234567" is written, and audio data for the channel 8 is specified using the UMID.

As for low-resolution data constituting a substream, on the 17th row, "umid: 060A2B340101010501010D12130000009ABCDEF0123 456789ABCDE F012345678" is written, and low-resolution data is specified using the UMID.

As described above, in the XML description of the clip-information file, information regarding other files existing in the same clip directory is described. The clip-information file can be accessed by specifying a file of image data, audio data, or the like using a 32-byte (64-character) basic UMID.

As described with reference to FIGS. 16 to 19, UMIDs described in the-clip information file are also described in the index file. Thus, for example, when the editing apparatus 100 (user) specifies this clip using the UMID to play back the clip, the editing apparatus 100 may refer to the clip table in the index file, read and refer to a clip-information file associated with the UMID, and read and play back pieces of material data on the basis of description of the clip-information file. Alternatively, the editing apparatus 100 may read and play back pieces of material data on the basis of description of specified clip elements in the clip table of the index file.

By describing UMIDs in the clip-information file, when recording this clip on a device external to the disc 132, the editing apparatus 100 can use the UMID assigned to the clip (or material data) only by recording this clip (files under the clip directory).

Although examples of UMIDs representing pieces of data are written in FIGS. 28 and 29 as described above, these only represent description positions or the like of UMIDs, and these are virtual UMIDs with meaningless values. Actually, valid UMIDs created according to a method defined by the SMPTE are written in place of the virtual UMIDs described above.

Referring back to FIG. 27, in step S124, the recording controller 116 creates a file for each piece of material data constituting the clip, under the clip directory created by the processing in step S121. For example, when the clip to be added is composed of image data, audio data, and clip metadata, the recording controller 116 records the image data, audio data, and clip metadata as mutually different files.

After finishing the processing in step S124, the recording controller 116 proceeds to step S125. In step S125, the index-file managing unit 172 of the recording controller 116 creates clip information (hereinafter referred to as a clip element) associated with the added clip, which is to be added to the clip table of the index file, using the UMID of the clip held in the information holding unit 114.

After creating the clip element, proceeding to step S126, the index-file managing unit 172 adds the clip element associated with the added clip to the clip table of the index file held in the index-file holding unit 151.

Then, in step S127, the index-file recording controller 173 records the updated index file by overwriting the existing index file on the disc 132 (updates the index file). After updating the index file on the disc 132, the index-file recording controller 173 exits the clip adding process.

As described above, UMIDs assigned to clip-information files and files of pieces of material data are created, for example, when clips are added, and are recorded in the clip-information files and the index file. As described earlier, these UMIDs are used when reading and playing back or searching for clip-information files or pieces of material data associated with the UMIDs.

Figure 30:
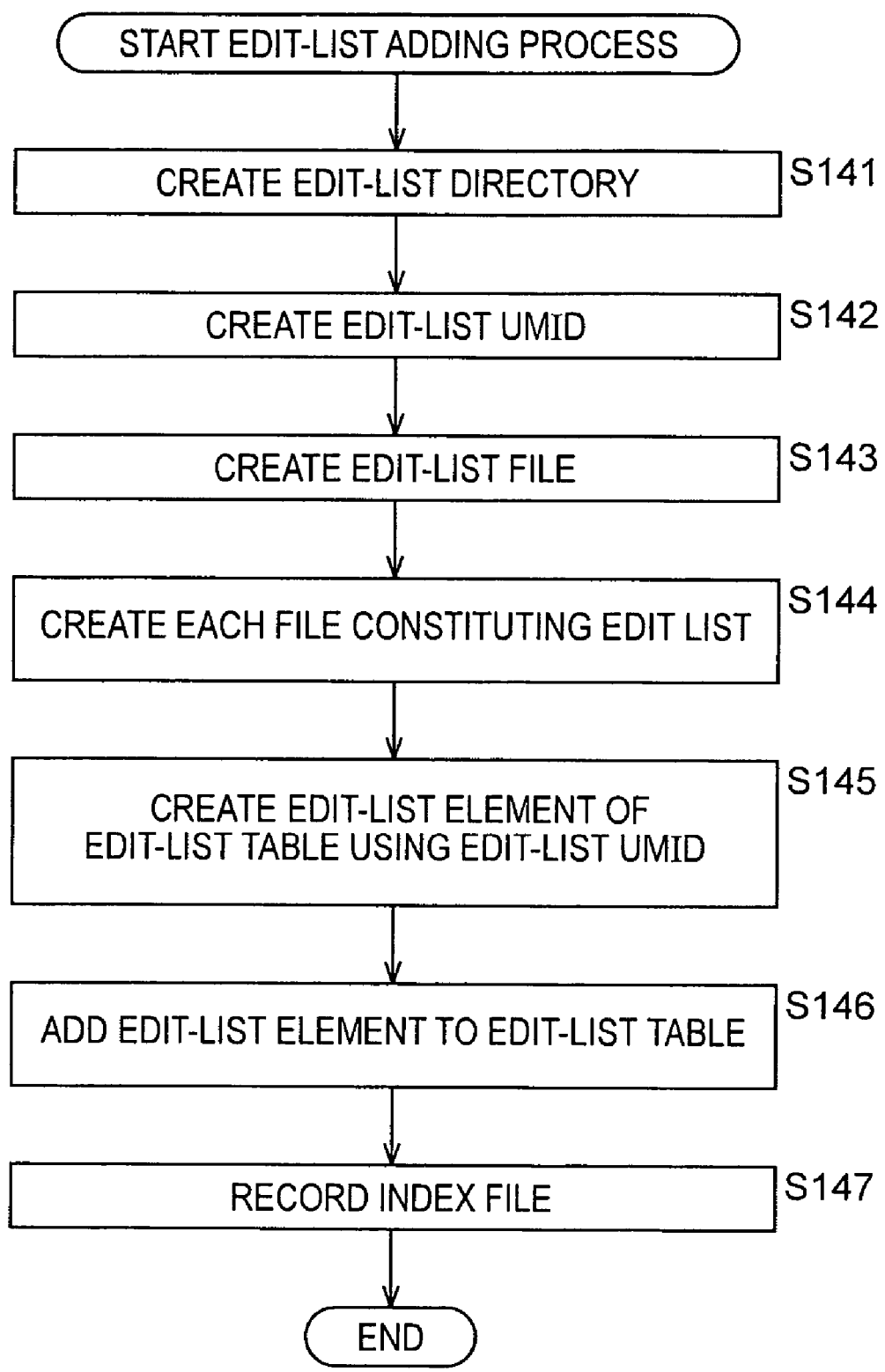
FIG. 30 is a flowchart for explaining an edit-list adding process.

Next, UMIDs written in an edit-list file will be described. An edit-list file is created when an edit list is recorded on the disc 132. An edit-list adding process that is executed when an edit list is added to the disc 132 will be described with reference to a flowchart shown in FIG. 30. Furthermore, description will be given as needed with reference to FIG. 31.

For example, when non-destructive editing is performed so that a clip recorded on the disc 132 is edited without updating original material data while creating an edit list representing editing information, and then addition of a new edit list to the disc 32 is instructed, for example, by the user, in step S141, the recording controller 116 of the editing apparatus 100 creates a new edit-list directory under the root directory of the disc 132. At that time, the name of the edit-list directory is chosen so that it differs from the names of existing edit-list directories.

Then, in step S142, the UMID creating unit 174 of the recording controller 116 creates a UMID for the edit-list file. The UMID creating unit 174 supplies the UMID created to the information holding unit 114 so that it is held therein. When a UMID is assigned in advance to the edit list (edit-list file) to be added, the UMID creating unit 174 obtains the UMID and supplies the UMID to the information holding unit 114 so that it is held therein.

After the processing in step S142 is finished, proceeding to step S143, the recording controller 116 creates an edit-list file under the edit-list directory created by the processing in step S141.

FIG. 31 is a diagram showing a specific example of description of the edit-list file in XML. In FIG. 31, numerals at the beginnings of the lines are attached for convenience of description, and are not parts of the XML description.

The edit-list file includes editing information regarding non-destructive editing of clips, and a playback method for the results of editing is also described.

As shown in FIG. 31, the XML description of the edit-list file is composed broadly of information regarding the edit list, a header section enclosed by header tags (<head></head>), and a body section enclosed by body tags (<body></body>).

On the 1st to 3rd rows in FIG. 31, information regarding the edit-list file is described. On the 1st row, it is indicated that the description is based on the XML version "1.0", and that the character encoding scheme is "UTF-8". On the 2nd row, the namespace identifier used is written.

'umid="0D1213000000000001044444484EEEE00E0188E130B"', written on the 3rd row in FIG. 31, indicates that the value of the UMID assigned to the edit-list file is "0D1213000000000001044444484EEEE00E0188E130B". In this example, of the 32-byte basic UMID, 22 bytes are shown, with 10 bytes in the 12-byte universal label omitted. Each of the digits is represented by a hexadecimal number, so that the 22-byte UMID is represented by 44 characters. The UMID used may be a 64-byte extended UMID.

In the case of FIG. 31, the header section is written from the 4th to 11th rows, and the body section is written from the 12th to 25th rows.

In the header section, information that is not relevant to the temporal behavior of the description of editing is included, and for example, information regarding metadata is described. A metadata element written between a start tag "<metadata type="Meta">" on the 5th row and an end tag </metadata> on the 10th row is used as a root element of meta information. 'type="Meta"' written on the 5th row is a type attribute specifying a media type of the content of metadata. The type attribute can be specified by an arbitrary character string. '<NRMeta xmlns="urn:schemas:professionalDisc:nrt">' written on the 7th row is a description specifying a namespace identifier for identifying elements and attributes. A ref element '<ref src="E0002M01.XML"/>' written on the 8th row indicates that the file name of the edit-list metadata file that is referred to is "E0002M01.XML".

In the body section, information that is relevant to the temporal behavior of the description of editing is described. In the case of FIG. 31, a par element written between a start tag "<par>" on the 13th row and an end tag "</par>" on the 24th row is a time container that defines a simple time group for simultaneous playback of a plurality of elements. In the case of FIG. 31, it is indicated that a first clip (Clip 1) and a second clip (Clip 2) are to be played back simultaneously. In the case of FIG. 31, however, as will be described later, playback start times of the two clips mutually differ, and actually the two clips are played back continuously.

Referring to FIG. 31, in the ref element on the 15th to 18th rows, a file that is referred to, a condition for playing back the file that is referred to, and so forth are described. 'src="urn:smpte:umid:060A2B340101010501010D1213000000FEDCBA9876543210FEDCBA9876543210"' written on the 16th row indicates that the value of the UMID assigned to the file that is referred to is "060A2B340101010501010D1213000000FEDCBA9876543210FEDCBA98765 43210".

'type="edlDoc"' written on the 17th row indicates that the type attribute of the file that is referred to is "edlDoc". 'begin="smpte-30=00:00:00:00"' also written on the 17th row indicates a time at which the first clip is started, i.e., the position of the start of the material on the FTC (File Time Code) of the edit list, and the unit is the number of frames. "smpte-30" is a description indicating that the time code used is a 30-frames-per-second SMPTE time code defined by the SMPTE. 'clipBegin="smpte-30=00:00:00:00"' on the 17th row indicates a position where the playback of the first clip is to be started, i.e., the start point of cutout of the material on the FTC of the first clip, and the unit is the number of frames. Similarly, 'clipEnd="smpte-30:00:10:00:00"' written on the 17th and 18th rows in FIG. 31 indicates a position where the playback of the first clip is to be stopped, i.e., the end point of cutout of the material on the FTC of the first clip.

As described above, the playback of the first clip is started at the time "00:00:00:00" from the position of the frame number "00:00:00:00", and the playback is continued up to the position of the frame number "00:10:00:00".

On the 21st to 23rd rows, the second clip is described similarly to the case of the first clip. In the case of FIG. 31, the playback of the second clip is started at the time "00:10:00:00" from the position of the frame number "00:02:00:00", and the playback is continued up to the position of the frame number "00:03:30:00".

The par element specifies that the first clip and the second clip be played back simultaneously as described above. Thus, as a result, at the time "00:00:00:00", the first clip is played back from the position of the frame number "00:00:00:00" to the frame number "00:10:00:00". Then, when the time "00:10:00:00" comes, the second clip is played back from the position of the frame number "00:02:00:00" to the position of the frame number "00:03:30:00". As described above, the edit list shown in FIG. 31 indicates that editing is performed so that the first clip and the second clip will be played back continuously.

As described above, in the XML description of the edit-list file, editing information regarding non-destructive editing of clips is described. The edit-list file can be accessed by specifying a file of image data, audio data, or the like using a 32-byte (64-character) basic UMID.

Although examples of UMIDs representing pieces of data are written, for example, on the 3rd, 16th, and 21st rows, these only represent description positions or the like of the UMIDs, and these are virtual UMIDs with meaningless values. Actually, valid UMIDs created on the basis of a method defined by the SMPTE are written in place of the virtual UMIDs described above.

For example, when the editing apparatus 100 (user) specifies and plays back the edit list using the UMID, the editing apparatus 100 refers to the edit-list table of the index file, reads and refers to an edit-list file associated with the UMID, refers to clip-information files of respective clips on the basis of the description of the edit-list file, and reads and plays back pieces of material data according to the clip-information files.

By describing UMIDs in the edit-list file, when recording the edit list on a device external to the disc 132, the editing apparatus 100 can use the UMID assigned to the edit-list file simply by recording the edit-list file.

Referring back to FIG. 30, in step S144, the recording controller 116 creates files constituting the edit list other than the edit-list file, such as an edit-list clip-metadata file, under the edit-list directory created by the processing in step S141.

After finishing the processing in step S144, the recording controller 116 proceeds to step S145. In step S145, the index-file managing unit 172 of the recording controller 116 creates information of an edit list (edit-list element) that is to be added to the edit-list table of the index file held in the index-file holding Unit 151, using the UMID of the edit list held in the information holding unit 114. Then, proceeding to step S146, the index-file managing unit 172 of the recording controller 116 adds the edit list element associated with the added edit list to the edit-list table of the index file held in the index-file holding unit 151. After adding the edit-list element, the index-file managing unit 172 proceeds to step S147.

In step S147, the index-file recording controller 173 records the updated index file held in the index-file holding unit 151 by overwriting the existing index file on the disc 132 (updates the index file). After updating the index file on the disc 132, the index-file recording controller 173 exits the edit-list adding process.

As described above, the UMID assigned to the edit-list file is created, for example, when an edit list is added, and is recorded in the edit-list file and the index file. As described earlier, the UMID is used when reading and playing back or searching for an edit-list file associated with the UMID.

As described above, the UMID is used for reading (playing back) a clip or an edit list associated with the UMID. Furthermore, for the purpose of unitary management of clips and edit lists recorded in the disc 132, UMIDs are managed in the index file, and are also described and managed in clip-information files and edit-list files so that the UMIDs can be used even when clips and edit lists are recorded on a device external to the disc 132.

In contrast, the PROAV ID is an ID for identifying the disc 132 (format) and is described in the index file, and it is not possible to read (play back) a clip or an edit list using the PROAV ID alone. Furthermore, the PROAV ID is described in a disc-metadata file including label information of data recorded on the disc 132, and is also used for checking whether a disc-metadata file is associated with data recorded on the disc 132 on which the disc-metadata file is to be recorded, for example, after updating the disc-metadata file.

Next, a process of searching for a clip using the PROAV ID described above will be described. The description herein will be given in the context of a playback apparatus that is different from the editing apparatus 100 and that can use the disc 132 created as described above.

Figure 32:
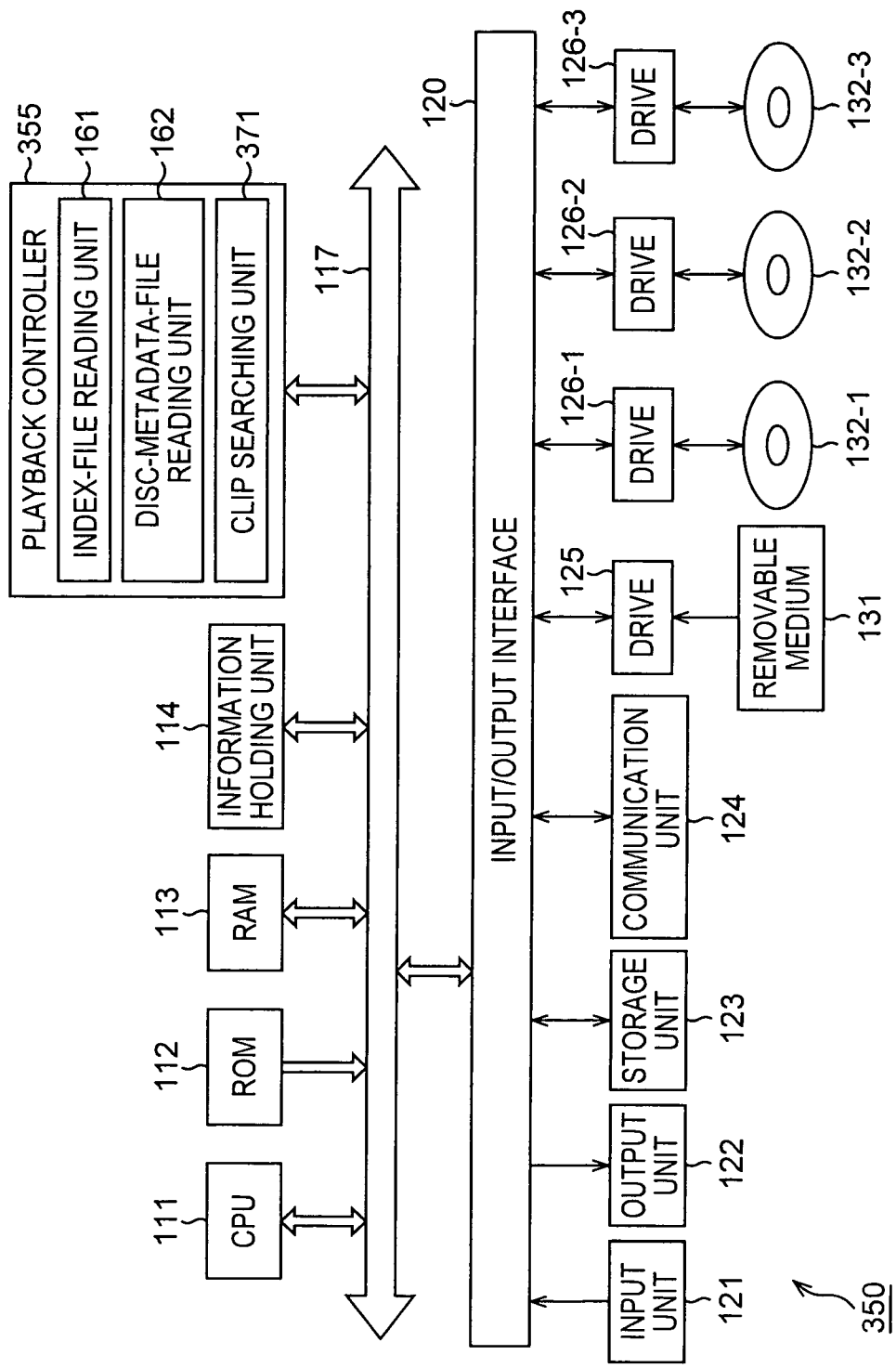
FIG. 32 is a block diagram showing an example construction of a playback apparatus according to the present invention.

FIG. 32 is a diagram showing an example construction of a playback apparatus according to the present invention. In FIG. 32, parts corresponding to those of the editing apparatus 100 shown in FIG. 6 are designated by the same numerals, and descriptions thereof will be omitted as appropriate.

A playback apparatus 350 can use the disc 132 (can read and play back clips and edit list recorded on the disc 132) created as described above (having recorded clips and edit lists thereon), for example, by the editing apparatus 100 shown in FIG. 6.

The input/output interface 120 of the playback apparatus 350 is connected to three drives (drives 126-1 to 126-3) similar to the drive 126 of the editing apparatus 100. Each of the drives 126-1 to 126-3 allows one disc 132 described above to be mounted thereon and dismounted therefrom, and under the control of a playback controller 355 and so forth described later, it reads a clip, an edit list, or the like recorded on the disc 132 mounted thereon and supplies it to the information holding unit 114, the playback controller 355, or the like. In FIG. 32, the drives 126-1 to 126-3 have respectively mounted thereon discs 132-1 to 132-3, one by one, similar to the disc 132.

In the following description, when it is not necessary to describe the discs 132-1 to 132-3 separately, the discs will be referred to as discs 132. Similarly, when it is not necessary to describe the drives 126-1 to 126-3 separately, the drives will be referred to as drives 126.

The bus 117 of the playback apparatus 350 is connected to the playback controller 355 for controlling, for example, a process of playing back a clip or an edit list, as well as the CPU 111 to the information holding unit 114. The playback controller 355 includes the index-file reading unit 161, the disc-metadata-file reading unit 162, and a clip searching unit 371. The index-file reading unit 161 and the disc-metadata-file reading unit 162 respectively read the index file and the disc-metadata file from the disc 132 when the disc 132 (disc 132-1 to disc 132-3) is connected to one of the drives 126-1 to 126-3.

The clip searching unit 371 searches for a clip or an edit list specified by the user from the discs 132-1 to 132-3 respectively mounted on the drives 126-1 to 126-3.

Next, an operation of the playback apparatus 350 will be described. When one of the discs 132-1 to 132-3 is mounted on one of the drives 126-1 to 126-3, the index-file reading unit 161 of the playback controller 355 reads the index file from the disc, and supplies the index file to the index-file holding unit 151 (FIG. 7) of the information holding unit 114 so that it is held therein. Furthermore, the disc-metadata-file reading unit 162 of the playback controller 355 reads the disc-metadata file from the disc, and supplies the disc-metadata file to the disc-metadata-file holding unit 152 (FIG. 7) of the information holding unit 114 so that it is held therein. The disc-metadata file is supplied to the output unit 122 as needed, and is displayed on a display or the like.

For example, the user specifies a clip (UMID) via the input unit 121 to instruct playback thereof, for example, by referring to label information included in the disc metadata displayed on the display. The clip playback instruction input as described above is supplied to the playback controller 355. Upon receiving the clip playback instruction, the playback controller 355, in the clip searching unit 371 thereof, searches for the specified clip (UMID) from the index file of one of the discs 132-1 to 132-3, held in the index-file holding unit 151 of the information holding unit 114, thereby identifying a format (PROAV ID) including the specified clip (UMID). Then, the clip searching unit 371 searches for the clip from the disc 132 having recorded the identified format (PROAV ID) thereon among the discs 132-1 to 132-3. When the clip exists, the playback controller 355 reads the specified clip and plays back the clip on the basis of the result of searching.

By using the PROAV ID for identifying a format as well as the UMID for globally unique identification of the clip in the process of searching for the clip as described above, the playback apparatus 350 can alleviate the load of the clip searching process and readily search for the clip.

Figure 33:
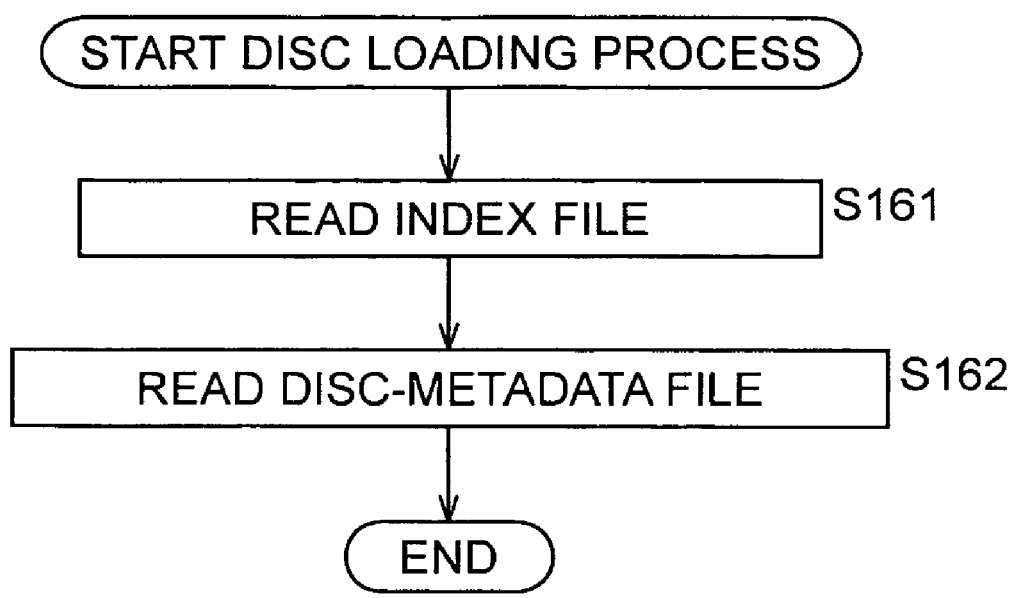
FIG. 33 is a flowchart for explaining a disc loading process.

Next, a disc loading process that is executed when the disc 132 is mounted on the drive 126 of the playback controller 355 described above will be described with reference to a flowchart shown in FIG. 33.

When the disc 132 (one of the discs 132-1 to 132-3) is mounted on the drive 126 (one of the drives 126-1 to 126-3), first, in step S161, the index-file reading unit 161 of the playback controller 355 reads the index file from the disc 132 mounted on the drive 126, and supplies the index file to the index-file holding unit 151 of the information holding unit 114 so that it is held therein. After the index file is held in the index-file holding unit 151, the index-file reading unit 161 proceeds to step S162.

In step S162, similarly to the case of the index file, the disc-metadata-file reading unit 162 reads the disc-metadata file from the disc 132 mounted on the drive 126, and supplies the disc-metadata file to the disc-metadata-file holding unit 152 of the information holding unit 114 so that it is held therein. After the disc-metadata file is held in the disc-metadata-file holding unit 152, the disc-metadata-file reading unit 162 exits the disc loading process.

As described above, in the index-file holding unit 151 of the information holding unit 114, the index file of the disc 132 mounted on one of the drives 126-1 to 126-3 is held. The index-file holding unit 151 can hold a plurality of index files, and the number of index files is arbitrary. However, it is desired that a number of index files at least greater than the number of drives 126 can be held. The index-file holding unit 151 herein can simultaneously hold three or more index files.

Furthermore, the disc-metadata-file holding unit 152 can supply the disc-metadata file held therein to the output unit 122 or the like as needed and display the disc-metadata file on the display. The disc-metadata file may be read at an arbitrary timing, and the processing in step S162 shown in FIG. 33 may be omitted so that the disc-metadata file is not read when the disc 132 is loaded. In that case, for example, the disc-metadata file may be read from the disc 132 according to a user's instruction so that the disc-metadata file is supplied to the output unit 122 and displayed on the display or the like.

In the playback apparatus 350 in which the discs 132-1 to 132-3 are mounted respectively on the drives 126-1 to 126-3, for example, when the user specifies a clip using the UMID or the like and instructs playback of the clip, the instruction is supplied to the playback controller 355. Upon receiving the clip playback instruction, the components of the playback controller 355 execute a clip searching process to search for the specified clip and to read the clip from the disc 132.

The clip searching process will be described with reference to a flowchart shown in FIG. 34.

When the clip searching process is started, in step S181, the clip searching unit 371 of the playback controller 355 searches for the specified UMID from a plurality of index files (hereinafter referred to as a index-file set) held in the index-file holding unit 151, thereby identifying an index file in which the specified UMID is written (format in which the specified clip exists), i.e., the PROAV ID associated with the specified UMID.

After identifying the PROAV ID, proceeding to step S182, the clip searching unit 371 accesses the disc 132 having recorded thereon the format associated with the PROAV ID to search for the clip associated with the specified UMID. That is, in step S182, the clip searching unit 371 compares the PROAV ID identified with the PROAV ID of the index file recorded on each of the discs 132-1 to 132-3 to search for the disc 132 for which these two values match. Then, when the values of the two PROAV IDs (the PROAV ID identified by the processing in step S181 and the PROAV ID of the index file recorded on the disc 132) match, the clip searching unit 371 accesses the disc 132 to search for a clip associated with the specified UMID within the disc 132. When the searching is finished, the clip searching unit 371 proceeds to step S183.

In step S183, the clip searching unit 371 checks whether a clip associated with the specified UMID exists on the disc 132 accessed. When it is determined that a clip associated with the specified UMID exists, the clip searching unit 371 supplies the results of checking to the playback controller 355, and proceeds to step S184. In step S184, the clip searching unit 371 reads the clip associated with the UMID on the basis of the result of checking obtained, and exits the clip searching process.

On the other hand, when it is determined in step S183 that no clip associated with the specified UMID exists, for example, because the clip has been removed after the index file is read from the disc 132, the clip searching unit 371 proceeds to step S185, executes error processing, and exits the clip searching process.

Compared with the process described above, when a clip is directly searched for on the basis of the UMID (when a clip is searched for using only the UMID), the clip searching unit 371 has to access all the discs 132 mounted on the drives 126-1 to 126-3 to search for a clip associated with the specified UMID until the target clip is found.

In contrast, by executing the clip searching process using the PROAV ID as described above, the disc 132 on which the target clip exists is readily identified, and it suffices to search for a clip associated with the specified UMID only within the disc 132. Thus, the playback apparatus 350 can reduce the load of the process compared with the case where a clip is directly searched for on the basis of the UMID. Accordingly, the playback apparatus 350 can more readily identify information recorded on a recording medium.

Although it has been described that the playback apparatus 350 shown in FIG. 32 includes the three drives 126-1 to 126-3, without limitation thereto, the number of drives is arbitrary, and obviously the number may be two or less, or four or greater.

Figure 34:
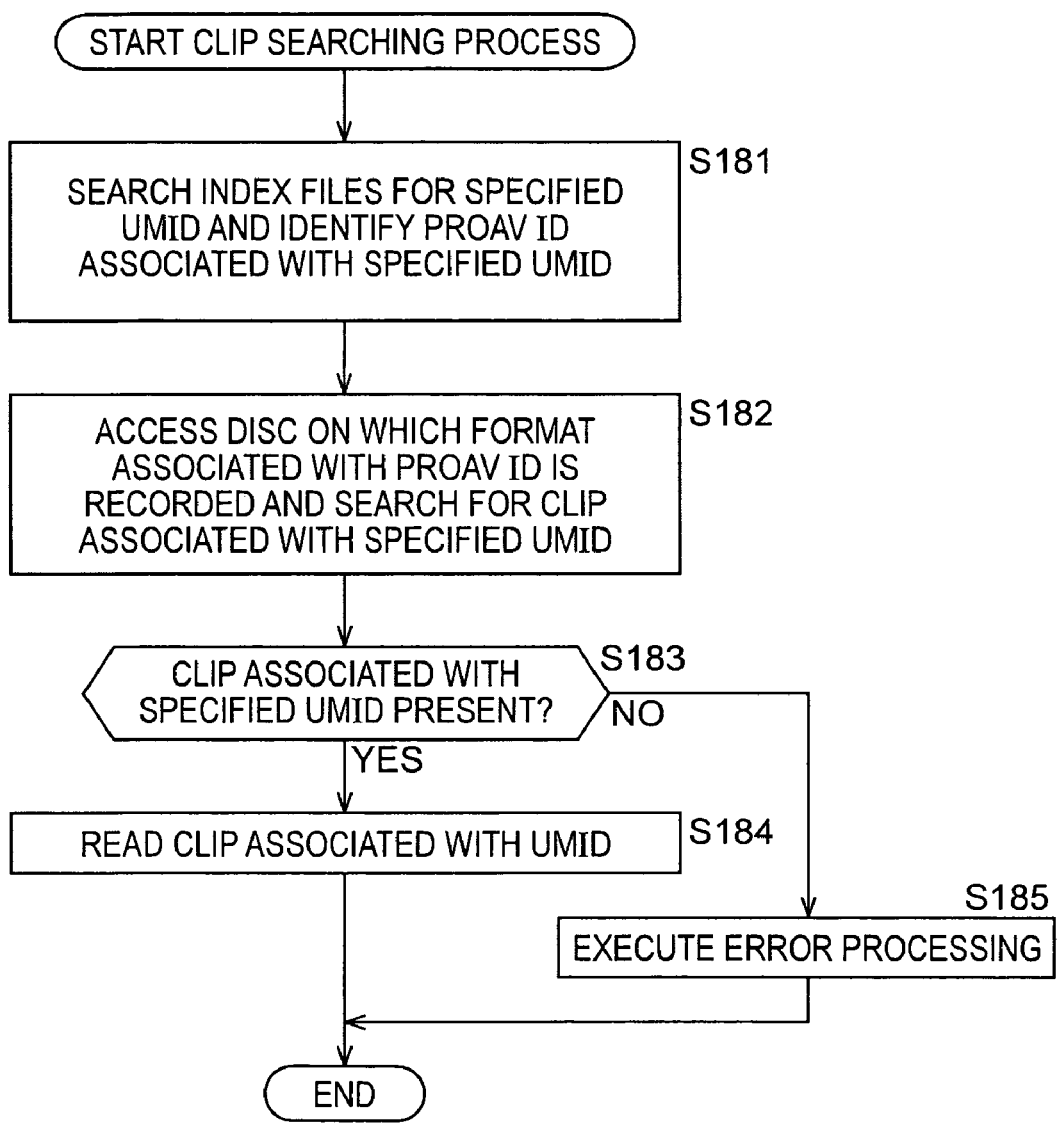
FIG. 34 is a flowchart for explaining a clip searching process.

Also when the playback apparatus 350 searches for an edit list, a process similar to the case of searching for a clip, described with reference to the flowchart shown in FIG. 34, is executed, so that description thereof will be omitted.

Figure 35:
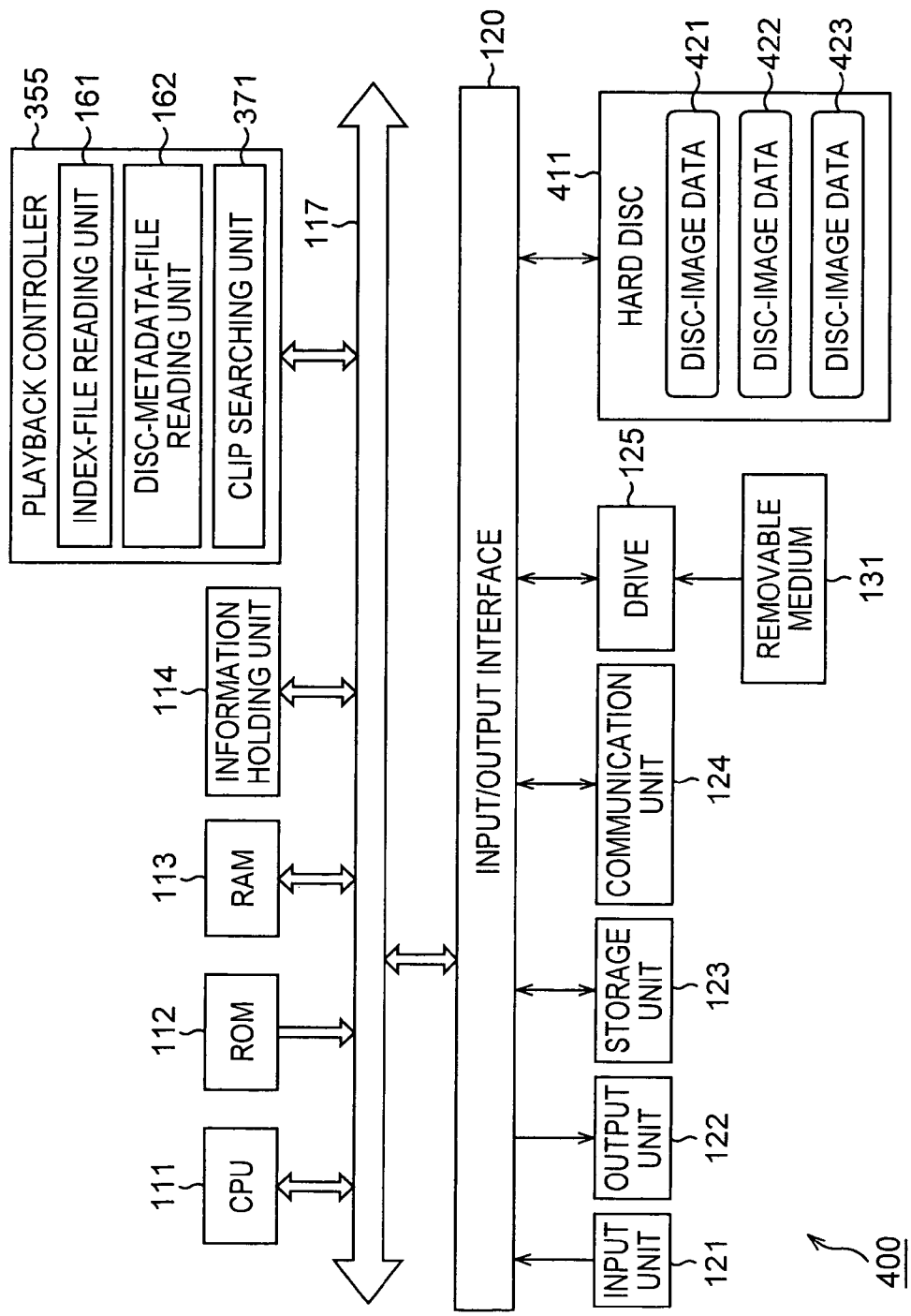
FIG. 35 is a block diagram showing another example construction of a playback apparatus according to the present invention.

Furthermore, although it has been described that the playback apparatus 350 includes a plurality of drives 126 and plays back clips recorded on a plurality of discs 132, without limitation thereto, for example, as shown in FIG. 35, the playback apparatus 350 may include a hard disc having recorded a plurality of pieces of disc-image data thereon and play back clips included in the plurality of pieces of disc-image data.

FIG. 35 is a block diagram showing another example construction of a playback apparatus according to the present invention. In FIG. 35, in FIG. 34, parts corresponding to those of the playback apparatus 350 shown in FIG. 32 are designated by the same numerals, and descriptions thereof will be omitted as appropriate.

A playback apparatus 400 shown in FIG. 35 is constructed basically the same as the playback apparatus 350 shown in FIG. 32, but differs from the playback apparatus 350 in that instead of the drives 126-1 to 126-3 of the playback apparatus 350, a hard disc 411 storing disc-image data 421 to 423 equivalent to data recorded on the discs 132 is connected to the input/output interface 120.

The hard disc 411 has recorded thereon disc-image data 421 to 423 equivalent to data stored on the discs 132, and it operates as a virtual drive 126 by executing interface processing for the disc-image data 421 to 423. That is, the hard disc 411 operates similarly to the drives 126-1 to 126-3 shown in FIG. 32, and executes similar processing. The disc-image data 421 to 423 respectively correspond to data individually stored on the discs 132-1 to 132-3 shown in FIG. 32. That is, the playback apparatus 400 including the hard disc 411 storing the disc-image data 421 to 423, which is virtually the discs 132-1 to 132-3 shown in FIG. 32, operates and executes processing similarly to the playback apparatus 350 shown in FIG. 32.

Also when the playback apparatus 400 described above searches for a clip or an edit list, a process similar to the case where the playback apparatus 350 searches for a clip, described with reference to a flowchart shown in FIG. 34, is executed. That is, by executing a clip searching process using the PROAV ID, the disc-image data 421 to 423 in which the target clip exists is readily identified, and it suffices to search for a clip associated with the specified UMID only within the disc-image data. Thus, the playback apparatus 400 can reduce the load of the process compared with the case where a clip is directly searched for on the basis of the UMID. Accordingly, the playback apparatus 400 can more readily identify information recorded on a recording medium.

Figure 36:
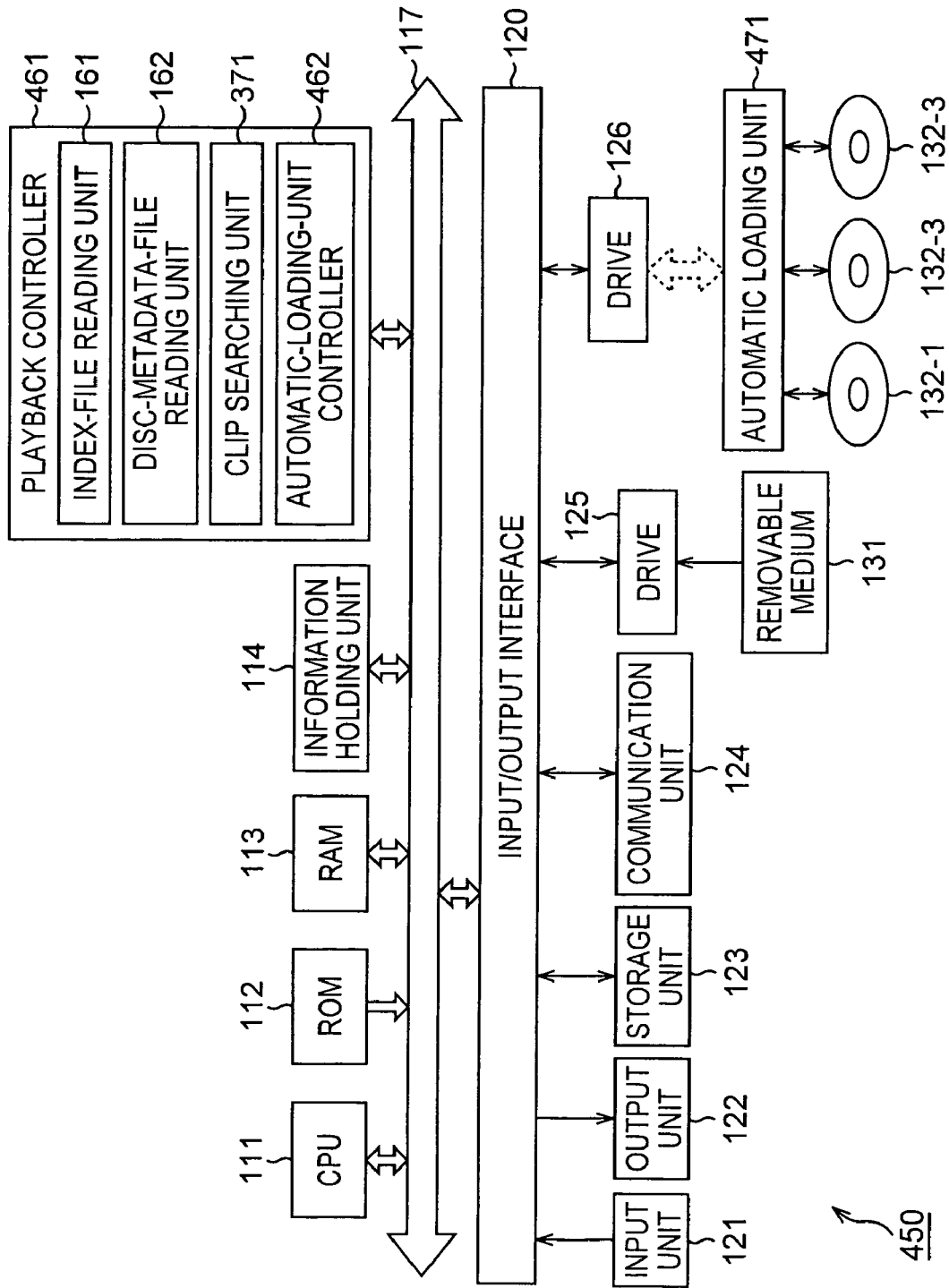
FIG. 36 is a block diagram showing yet another example construction of a playback apparatus according to the present invention.

Furthermore, as shown in FIG. 36, the playback apparatus may include one drive and also include an automatic loading unit for loading on the drive a disc selected from a plurality of discs. In FIG. 36, parts corresponding to those of the playback apparatus 350 shown in FIG. 32 are designated by the same numerals, and descriptions thereof will be omitted as appropriate.

A playback apparatus 450 shown in FIG. 36 is constructed basically the same as the playback apparatus 350 shown in FIG. 32, but it differs from the playback apparatus 350 in that instead of the drives 126-1 to 126-3 of the playback apparatus 350, a single drive 126, and an automatic loading unit 471 for selecting a single disc 132 from three discs 132-1 to 132-3 and automatically loading the disc 132 on the drive 126 are provided, and a playback controller 461 including an automatic-loading-unit controller 462 is connected to the bus 117.

Similarly to the playback apparatus 350 shown in FIG. 32, when a disc (PROAV ID) having recorded a target clip thereon is identified by a searching process executed by the clip searching unit 371, the clip searching unit 371 of the playback controller 461 supplies the PROAV ID to the automatic-loading-unit controller 462. The automatic-loading-unit controller 462 manages PROAV IDs written in respective index files of the three discs 132-1 to 132-3 that are mounted so that they can be loaded on the automatic loading unit 471. The automatic-loading-unit controller 462 controls the automatic loading unit 471 on the basis of the management information so that the disc 132 associated with the identified PROAV ID is mounted on the drive 126. The clip searching unit 371 searches for a clip associated with the specified UMID in the disc 132 loaded on the drive 126.

Next, a clip searching process executed by the playback apparatus 450 will be described with reference to a flowchart shown in FIG. 37.

When the clip searching process is started, in step S201, the clip searching unit 371 of the playback controller 461 searches for the specified UMID from a plurality of index files (hereinafter referred to as an index-file set) held in the index-file holding unit 151, thereby identifying an index file in which the specified UMID (format in which the specified clip exists) i.e., the PROAV ID associated with the specified UMID.

The clip searching unit 371 supplies information of the identified PROAV ID to the automatic-loading-unit controller 462, and proceeds to step S202. In step S202, the automatic-loading-unit controller 462 identifies the disc 132 having recorded thereon the format associated with the PROAV ID obtained on the basis of the management information for managing the discs 132 provided in the automatic loading unit 471, and controls the automatic loading unit 471 to load the disc on the drive 126. That is, in step S202, the automatic-loading-unit controller 462 searches for a PROAV ID matching the PROAV ID obtained from the management information for managing information regarding the PROAV ID, provided in the automatic loading unit 471, and identifies the disc 132 associated with the PROAV ID. Then, the automatic-loading-unit controller 462 controls the automatic loading unit 471 to load the identified disc 132 on the drive 126. When the disc is loaded, the automatic-loading-unit controller 462 proceeds to step S203.

In step S203, the clip searching unit 371 accesses the disc 123 loaded on the drive 126, and searches for a clip associated with the specified UMID within the disc 123.

When the searching is finished, in step S204, the clip searching unit 371 checks whether a clip associated with the specified UMID exists on the disc 132 accessed. When it is determined that a clip associated with the specified UMID exists, the clip searching unit 371 supplies the result of checking to the playback controller 355, and proceeds to step S205. In step S205, the playback controller 355 reads the clip associated with the UMID on the basis of the result of checking obtained, and exits the clip searching process.

On the other hand, when it is determined in step S204 that no clip associated with the specified UMID exists, for example, because the clip has been removed after the index file is read from the disc 132, the clip searching unit 371 proceeds to step S206, executes error processing, and exits the clip searching process.

By executing the clip searching process using the PROAV ID as described above, the disc 132 on which the target clip exists is readily identified, and it suffices to load the disc 132 on the drive 126 and to search for a clip associated with the specified UMID only within the disc 132. Thus, the playback apparatus 450 can reduce the load of the process compared with the case where a clip is directly searched for on the basis of the UMID. Accordingly, the playback apparatus 450 can more readily identify information recorded on a recording medium.

Although it has been described that the automatic loading unit 471 of the playback apparatus 450 shown in FIG. 36 selects one of the three discs 132-1 to 132-3 and loads the disc on the drive 126, without limitation thereto, the number of discs that can be loaded on the drive 126 by the automatic loading unit 471 is arbitrary, and obviously the number may be two or less or four or more.

Figure 37:
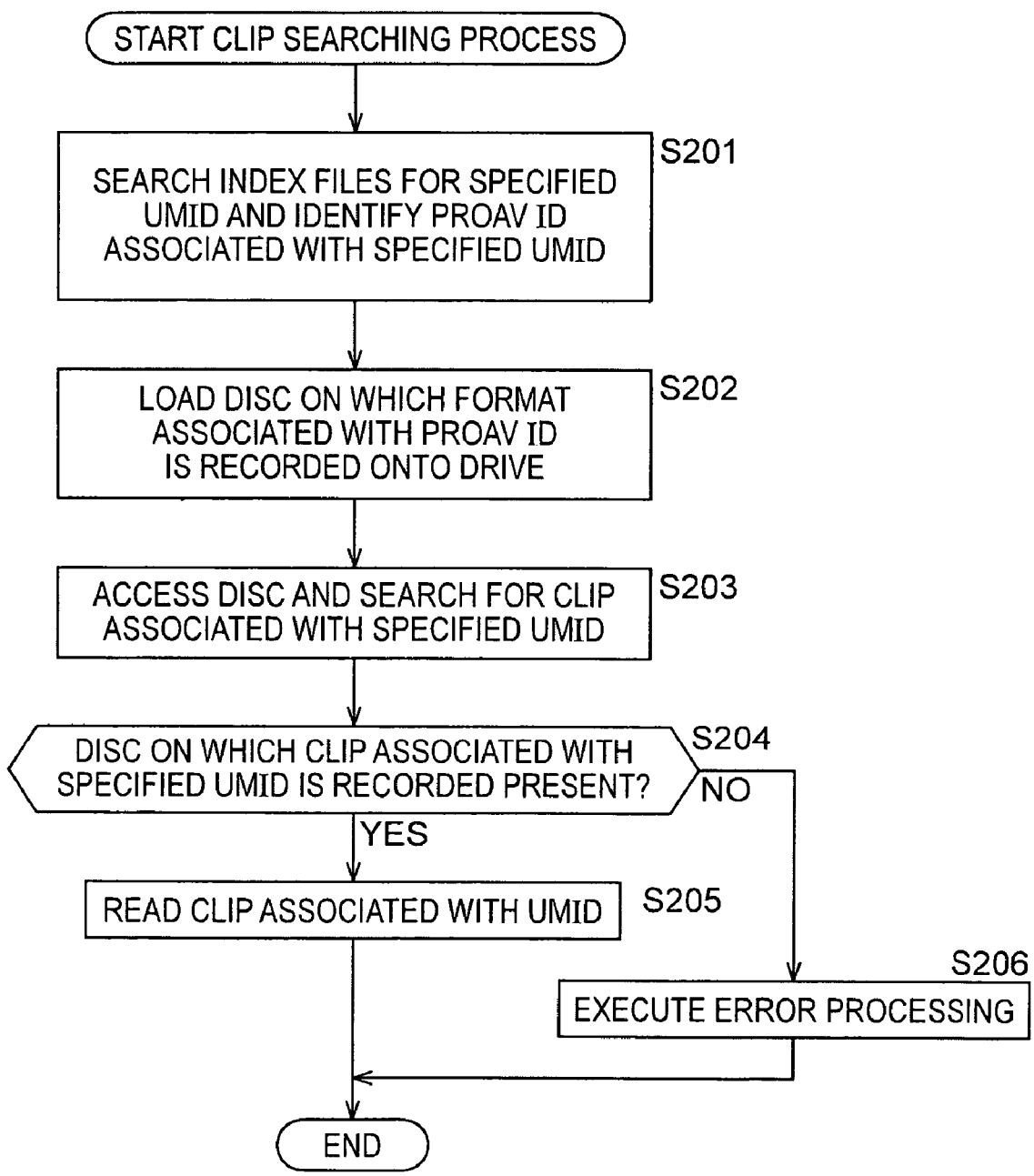
FIG. 37 is a flowchart for explaining a clip searching process.

Also when the playback apparatus 450 searches for an edit list, a process similar to the case of searching for a clip, described with reference to the flowchart shown in FIG. 37, is executed, so that description thereof will be omitted.

Figure 38:
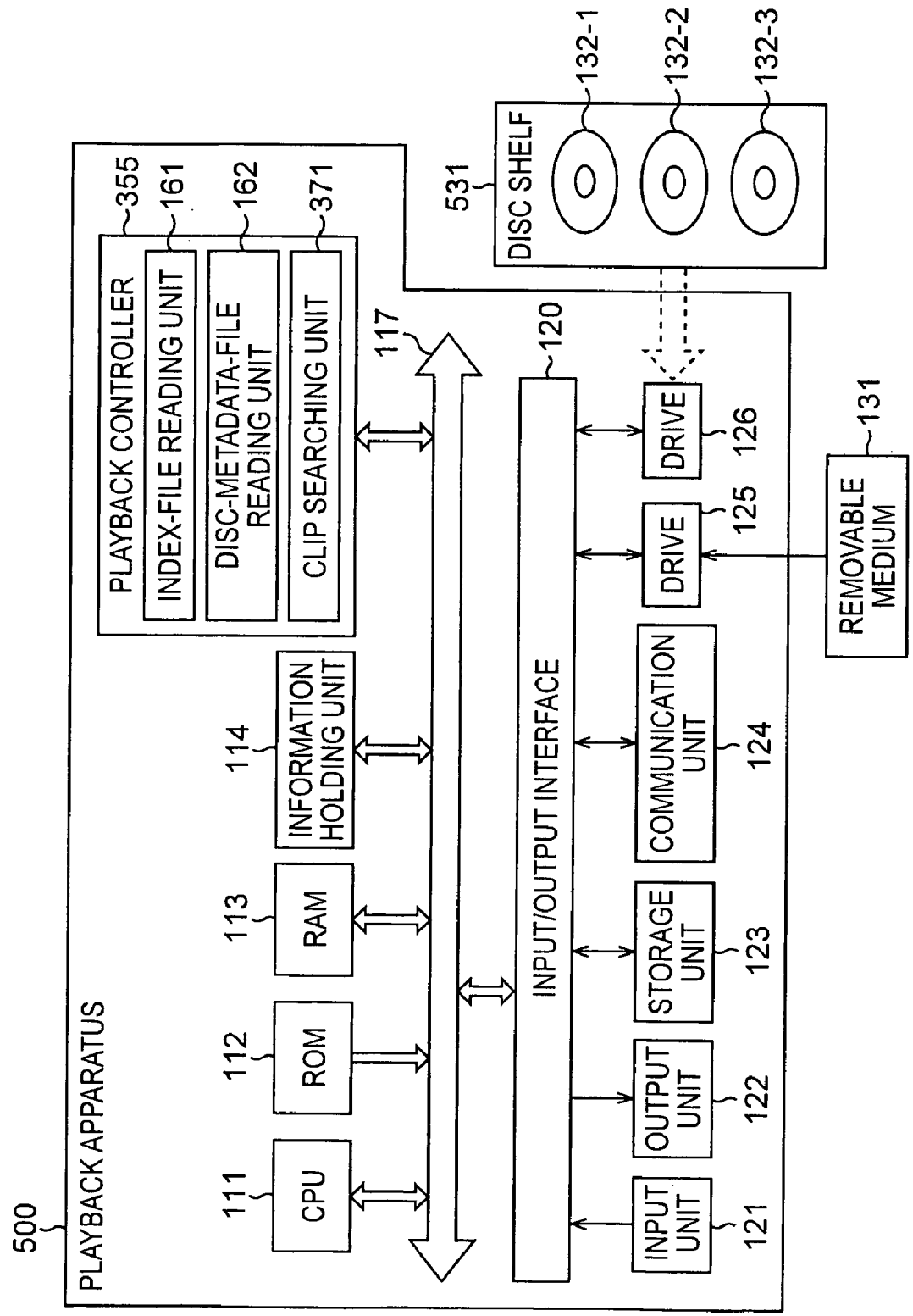
FIG. 38 is a block diagram showing yet another example construction of a playback apparatus according to the present invention.

Without limitation to what has been described above, for example, as shown in FIG. 38, the playback apparatus may include a single drive, manages a plurality of discs contained in a disc shelf provided separately from the playback apparatus, and play back a clip or an edit list recorded on a disc selected from the plurality of discs by the user and mounted on the drive. In FIG. 38, parts corresponding to those of the playback apparatus 350 shown in FIG. 32 are designated by the same numerals, and descriptions thereof will be omitted as appropriate.

A playback apparatus 500 shown in FIG. 38 is constructed basically the same as the playback apparatus 350 shown in FIG. 32, but it differs from the playback apparatus 350 in that a single drive 126 is provided instead of the drives 126-1 to 126-3 of the playback apparatus 350. Furthermore, a disc shelf 531 is provided separately from the playback apparatus 500, and three discs 132-1 to 132-3 are contained in the disc shelf 531. The playback apparatus 500, in the information holding unit 114 thereof, holds and manages information of clips and edit lists recorded on the discs 132-1 to 132-3 contained in the disc shelf 531.

Similarly to the playback apparatus 350 shown in FIG. 32, when a disc (PROAV ID) on which a target clip is recorded is identified by a searching process executed by the clip searching unit 371, the clip searching unit 371 of the playback controller 461 supplies the PROAV ID and a search result including the specified UMID to the output unit 122, and outputs the search result, for example, by displaying it on the display. On the basis of the search result displayed on otherwise provided, the user of the playback apparatus 500 selects one of the discs 132-1 to 132-3 contained in the disc shelf 531 and mounts the disc on the drive 126. When the disc 132 is mounted on the drive 126, the playback controller 355 of the playback apparatus 500 executes a normal clip playback process to read and play back the target clip from the disc 132.

Next, a clip searching process executed by the playback apparatus 500 will be described with reference to a flowchart shown in FIG. 39.

When the clip searching process is started, in step S221, the clip searching unit 371 of the playback controller 355 searches for the specified UMID from a plurality of index files (hereinafter referred to as an index-file set) held in the index-file holding unit 151, thereby identifying an index file in which the specified UMID is written (format in which the specified clip exists), i.e., a PROAV ID associated with the specified UMID.

After identifying the PROAV ID, proceeding to step S222, the clip searching unit 371 supplies the PROAV ID identified and a search result including the specified UMID to the output unit 122. Upon obtaining the search result, the output unit 122 outputs the search result, for example, by displaying it on the display as text information. After outputting the search result, the output unit 122 exits the clip searching process.

By referring to the search result output as described above, the user of the playback apparatus 500 can select a disc 132 having recorded the target clip thereon from the discs 132-1 to 132-3 contained in the disc shelf 531, and mount the disc 132 on the drive 126.

By executing the clip searching process using the PROAV ID as described above, the disc 132 on which the target clip exists can be readily identified. Thus, the playback apparatus 500 can reduce the load of the process compared with the case where a clip is directly searched for on the basis of the UMID. Accordingly, the playback apparatus 500 can more readily identify information recorded on a recording medium.

Although it has been described that the playback apparatus 500 shown in FIG. 38 manages information of the three discs 132-1 to 132-3 contained in the disc shelf 531, without limitation thereto, the number of discs managed by the playback apparatus 500 (the number of discs contained in the disc shelf 531) is arbitrary, and obviously the number may be two or less or four or greater. Furthermore, the playback apparatus 500 may manage information recorded on a plurality of discs 132 contained in a plurality of shelves.

Figure 39:
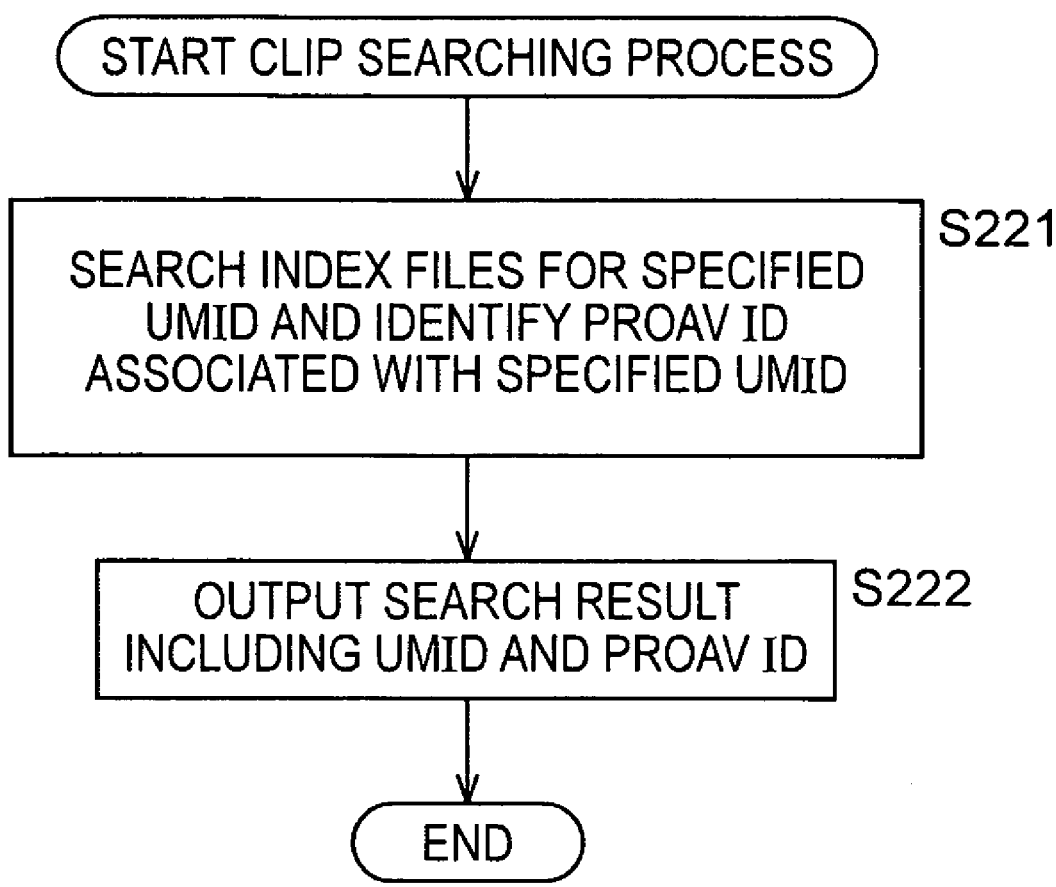
FIG. 39 is a flowchart for explaining a clip searching process.

Also when the playback apparatus 500 searches for an edit list, a process similar to the case of searching for a clip, described with reference to the flowchart shown in FIG. 39, is executed, so that description thereof will be omitted.

Since the editing apparatus 100 shown in FIG. 6 records the PROAV-ID information on the disc 132 so that it is included in the disc-metadata file and the index file, a playback apparatus that plays back clips and edit list can also readily identify the disc 132 on which a target clip exists by executing a clip searching process using the PROAV ID, so that the load of the clip searching process can be reduced compared with the case where a clip is directly searched for on the basis of the UMID.

Although the description has been given above in the context of cases where a clip or an edit list is searched for using a UMID and a PROAV ID, without limitation thereto, for example, searching may be based on a PROAV ID in combination with frame-image information such as a file name or a representative image. Also in this case, a process similar to the process described above is executed.

By recording a disc-metadata file including a PROAV ID or information regarding a disc representative image on a disc as a recording medium of clips and edit lists, the editing apparatus 100 shown in FIG. 6 can more readily identify information recorded on a recording medium. Also, playback apparatuses other than the editing apparatus 100 can more readily identify information recorded on a recording medium using the disc-metadata file.

Figure 40:
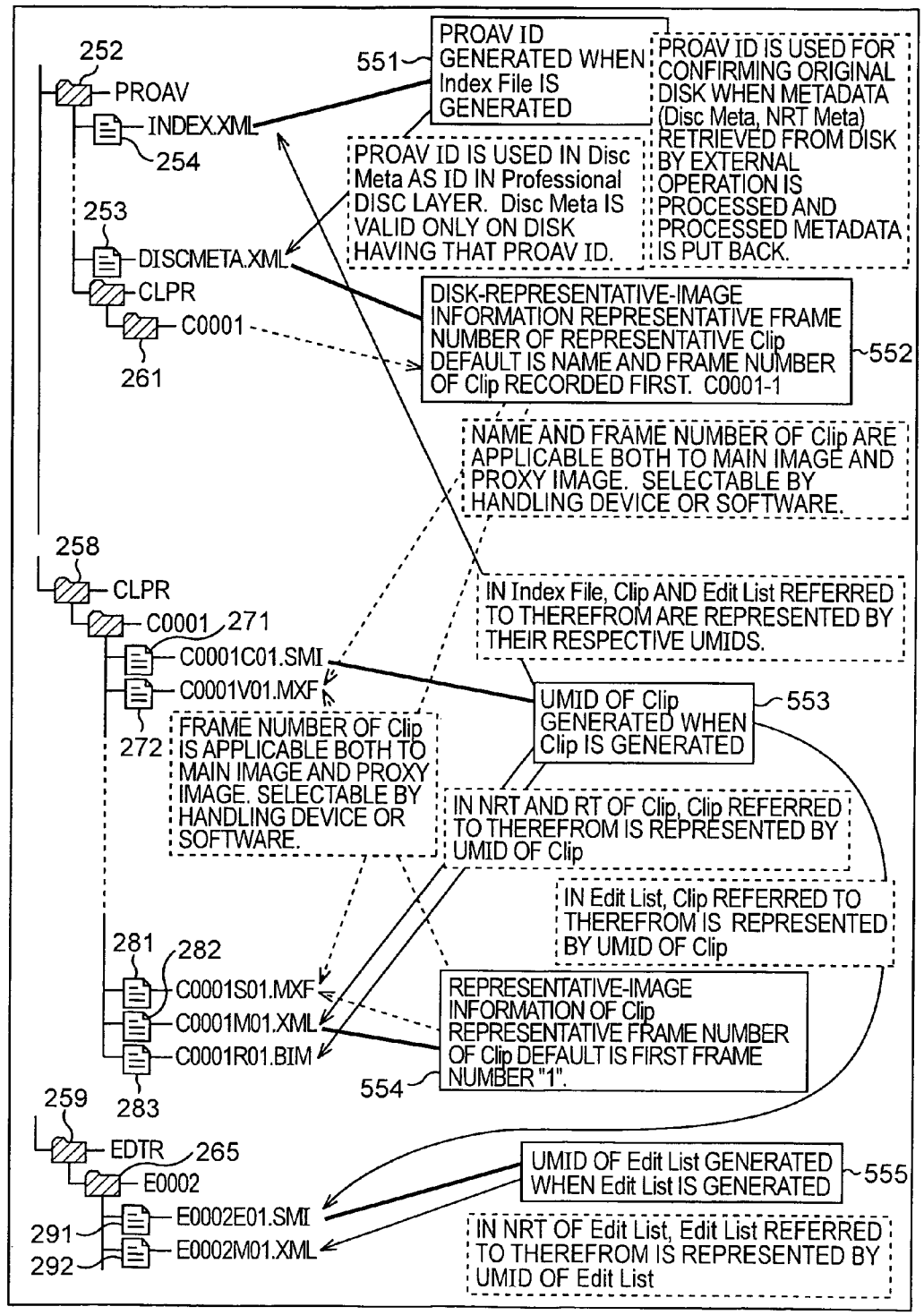
FIG. 40 is a diagram for explaining information recorded in a disc, a method of using the information, and so forth.

Files in which the pieces of information described above are managed, and a method of using the same, will be described with reference to a specific example shown in FIG. 40.

Clips and edit lists recorded on the disc 132, or information regarding the clips and edit lists, are managed under a directory structure shown in FIG. 40, as described with reference to FIGS. 22 to 24.

A PROAV ID 551, which is an ID for identifying a format recorded on the disc 132, is generated when an index file (INDEX.XML) 254 managed under a PROAV directory 252 is generated, and is stored in the index file (Index File) 254. Furthermore, the PROAV ID 551 is copied and the copy is stored in a disc-metadata file (DISCMETA.XML) 253.

The PROAV ID 551 is used when the disc-metadata file 253 inside the disc 132 is retrieved from the outside of the disc 132, is then processed, and is then returned to the disc 132 (overwrite recording), to check whether the disc 132 is actually the original disc (the format has not changed). Furthermore, the PROAV ID 551 is used as an ID in the professional disc (Professional Disc) layer in the disc-metadata file (Disc Meta) 253. That is, the disc-metadata file 253 has meaningful information and the information becomes effective only on a disc having the PROAV ID (a disc for which the PROAV ID of the disc-metadata file 253 matches the PROAV ID of the index file 254).

Although the description has been given above in the context of a case where a PROAV ID is used in the disc-metadata file 253, without limitation thereto, for example, a PROAV ID may be used in metadata (NRT Meta) such as clip metadata or edit-list clip metadata, in a method similar to the case of the disc-metadata file 253. In that case, a process similar to the case of the disc-metadata file described above is executed.

Setting information 552 of a disc representative image (disc-representative-image information), which is representative of all the frame images recorded on the disc 132, is composed of a representative clip specified, for example, by the user, and information specifying a representative-frame number. When specification by the user or the like is absent (in the case of default setting), a clip recorded first on the disc 132 is selected as the representative clip, and a beginning frame number (i.e., "1") is set as the representative frame number (C0001-1).

When the disc representative image is set, for example, by the user, the disc representative image is selectively set from clip representative images described later. Furthermore, the representative clip and the representative-frame number set as the disc representative image may be associated either with an image data file (C0001V01.MXF) that is main image data or a low-resolution data file (C0001S01.MXF) 281 that is proxy image (substream) data. These pieces of data can be selected, for example, by a handling device or software.

As opposed to the information regarding the entire format, in each clip, i.e., in a clip-information file (C0001C01.SMI) 271, a UMID 553 of the clip (Clip) is generated and stored when the clip-information file 271 is generated.

The UMID 553 is also stored and managed in the index file 254. Furthermore, the UMID 553 of the clip is also stored in a clip-metadata file (C0001M01.XML) 282 and a frame-metadata file (C0001R01.BIM) for the same clip. In the clip-metadata file (NRT of Clip) 282 and the frame-metadata file (RT of Clip) 283, a clip that is referred to is represented by the UMID 553 of the clip.

Furthermore, the UMID 553 of the clip is also stored in an edit list (Edit List) regarding editing of the clip, i.e., in an edit-list file (E0002E01.SMI) 291. In the edit-list file 291, a clip that is referred to therefrom is represented by the UMID of the clip.

In the clip-metadata file 282 of each clip, clip-representative-image information (representative-image information of Clip) 554, which is information regarding a representative image of the clip, is stored. The clip-representative-image information 554 is composed of a representative-frame number of the clip specified, for example, by the user. When specification by the user or the like is absent (in the case of default setting), the beginning frame number (i.e., "1") is set as the representative frame number (C0001-1). Furthermore, the representative-frame number set as the clip representative image may be associated with either an image data file 272 that is main image data or a low-resolution data file. These pieces of image data can be selected, for example, by a handling device or software.

For the clip described above, also in an edit list, i.e., in an edit-list file 291, an edit-list UMID (UMID of Edit List) 555 is generated and stored when the edit-list file 291 is generated. The edit-list UMID 555 is also stored in an edit-list clip metadata (E0002M01.XML) 292. In the edit-list clip metadata (NRT o Edit List) 292, an edit list (Edit List) that is referred to therefrom is represented by the edit-list UMID 555.

As described above, the pieces of information are respectively used in different manners for different purposes. Thus, the pieces of information described above are used for achieving different goals.

Figure 41:
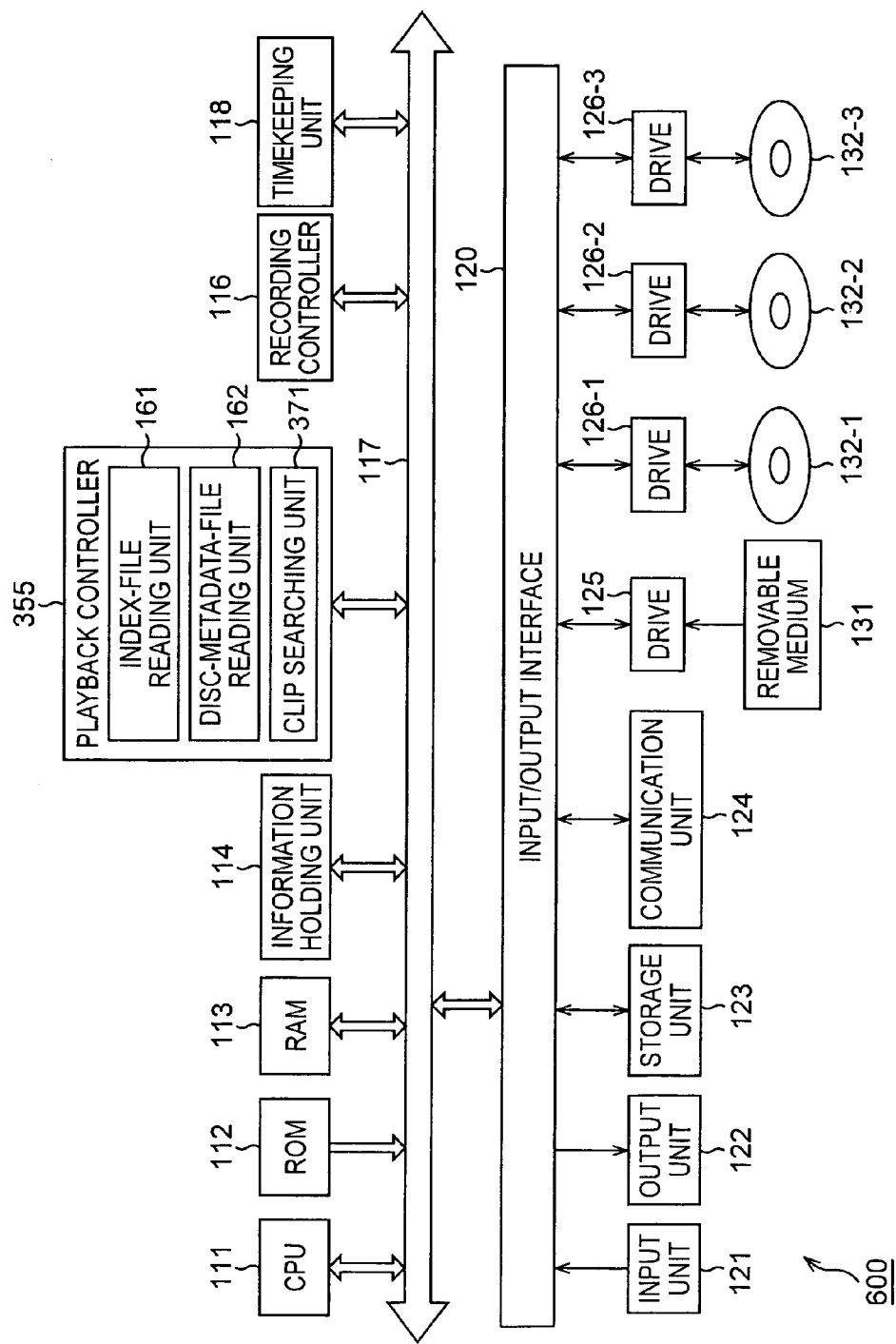
FIG. 41 is a block diagram showing an example construction of a recording and playback apparatus according to the present invention.

Although the above description has been given in the context of cases where disc-metadata files or PROAV IDs are used in playback apparatuses that play back clips or edit lists, without limitation thereto, for example, as shown in FIG. 41, disc-metadata files or PROAV IDs can be used in recording and playback apparatuses that record and play back clips or edit lists. In FIG. 41, parts corresponding to those of the playback apparatus 350 in FIG. 32 are designated by the same numerals, and descriptions thereof will be omitted as appropriate.

A recording and playback apparatus 600 shown in FIG. 41 is an apparatus that can record and play back clips and edit lists, and the construction thereof is such that the recording controller 116 and the timekeeping unit 118 of the editing apparatus 100 shown in FIG. 6 connected to the bus 117 are added to the construction of the playback apparatus 350 shown in FIG. 32.

According to the construction, the playback apparatus executes processes similarly to the playback apparatus 350 shown in FIG. 32 so that the user can refer to the disc-metadata file or to search for a clip or an edit list using the PROAV ID. Furthermore, the playback apparatus 600 can execute a disc-metadata file or the like including a PROAV ID or representative-image information or the like on the disc 132 by executing a process similarly to the case of the editing apparatus 100 shown in FIG. 6.

Thus, the playback apparatus 600 can improve the convenience of a recording medium so that information recorded on the recording medium can be identified more readily, and can more readily identify the information recorded on the recording medium.

As described above, an editing apparatus, a playback apparatus, or a recording and playback apparatus according to the present invention execute a process of recording on a recording medium a disc-metadata file that serves as label information of data recorded on the recording medium or index file that serves as management information, or of using the recorded disc-metadata file, index file, or the like, and may execute in any method a process similar to the process, and may further execute processes other than the process. Furthermore, the construction of an editing apparatus, a playback apparatus, or a recording and playback apparatus according to the present invention may be constructions other than those described above, as long as such a process can be executed.

Figure 42:
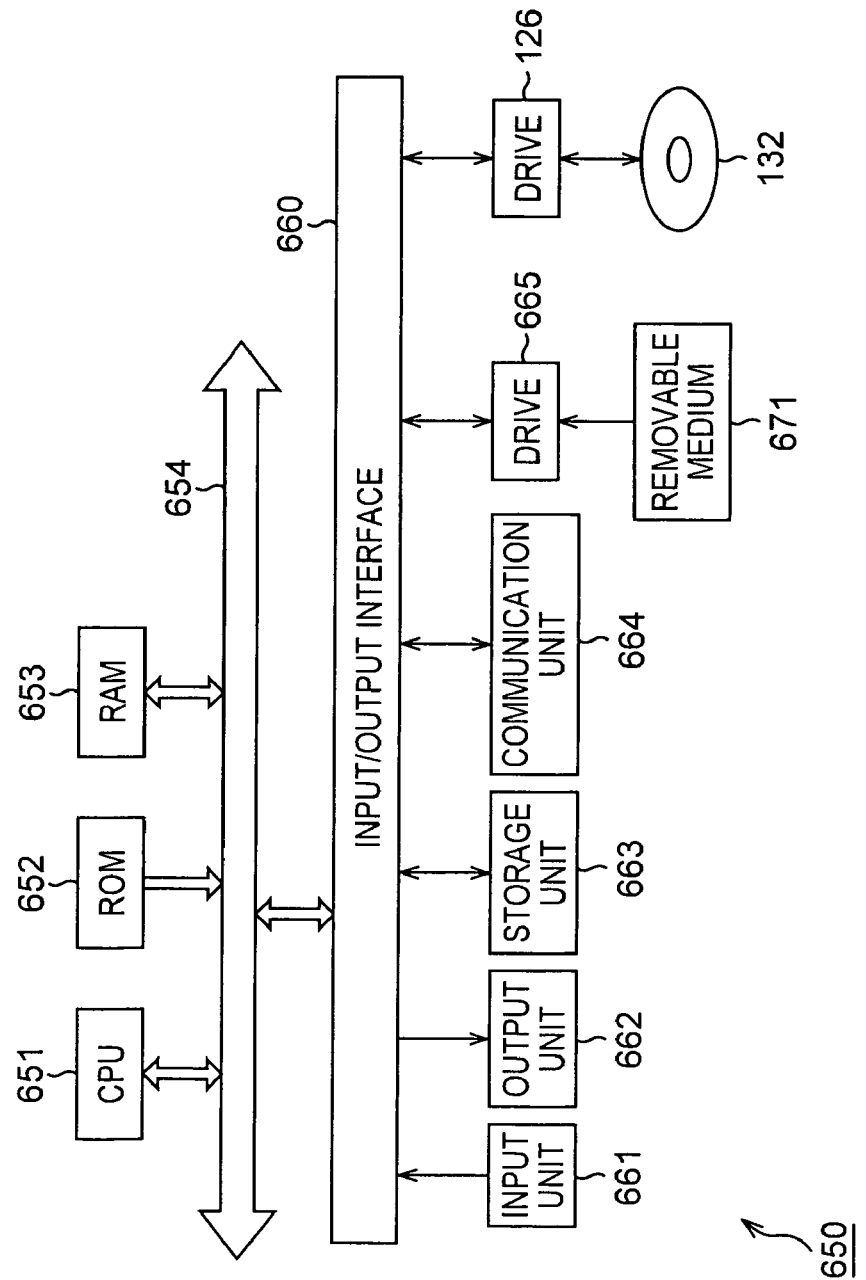
FIG. 42 is a block diagram showing an example construction of an embodiment of a computer according to the present invention.

The series of processes described above may be executed by hardware or by software. When the series of processes is executed by software, the editing apparatus, playback apparatus, or recording and playback apparatus described above is implemented by a personal computer shown in FIG. 42. In FIG. 42, parts corresponding to those shown in FIG. 6 are designated by the same numerals, and descriptions thereof will be omitted as appropriate.

Referring to FIG. 42, a CPU 651 of a personal computer 650 executes various processes according to programs stored in a ROM 652 or programs loaded from a storage unit 663 to a RAM 653. The RAM 653 also stores, as needed, data or the like needed for the execution of various processes by the CPU 651.

The CPU 651, the ROM 652, and the RAM 653 are connected to each other via a bus 654. The bus 654 is also connected to an input/output interface 660.

The input/output interface 660 is connected to an input unit 661 including a keyboard, a mouse, and so forth, an output unit including a display implemented by a CRT (Cathode Ray Tube) or an LCD (Liquid Crystal display), a speaker, and so forth, a storage unit 663 implemented by a hard disc or the like, a communication unit implemented by a modem or the like, and a drive 126 on which the disc 132 is mounted. The communication unit 664 carries out communications via networks including the Internet.

The input/output interface 660 is also connected to a drive 665 as needed, on which a removable medium 671 such as a magnetic disc, an optical disc, a magneto-optical disc, or a semiconductor memory is mounted as needed, and computer programs read therefrom are installed on the storage unit 663 as needed.

When the series of processes is executed by software, programs constituting the software are installed from a network or a recording medium.

The recording medium is the removable medium 131 or the removable medium 671 having recorded the programs thereon, provided separately from the main unit of the apparatus to provide the programs to the user, such as a magnetic disc (including a floppy disc), an optical disc (including a CD-ROM (Compact Disk-Read Only Memory) and a DVD (Digital Versatile Disk)), a magneto-optical disc (including an MD (Mini-Disk)), or a semiconductor memory, as shown in FIG. 6, FIG. 32, FIG. 35, FIG. 36, FIG. 38, FIG. 41, or FIG. 42. Alternatively, the recording medium is implemented, for example, by the ROM 112 or the ROM 652 having the programs recorded thereon or a hard disc included in the storage unit 123 or the storage unit 663, provided to the user as included in the main unit of an apparatus.

In this specification, steps defining programs provided via a medium include processes that are executed in parallel or individually and not necessarily executed sequentially, as well as processes that are executed sequentially in the orders described.

In this specification, a system refers to the entirety of apparatuses formed by a plurality of apparatuses.

INDUSTRIAL APPLICABILITY

As described above, according to the present invention, image data, audio data, or the like can be recorded on a recording medium. Particularly, the convenience of a recording medium can be improved; for example, information recorded on a recording medium can be more readily identified.

The invention claimed is:

1. An information processing apparatus for managing data that is recorded on a recording medium, the information processing apparatus comprising:
copying means for copying an identifier for identifying a format that is managed by a first file for managing information recorded on the recording medium, the identifier being included in the first file;
creating means for creating a second file including the identifier copied by the copying means and label information describing content of the data, further comprising a setting means for setting the label information,
wherein the creating means creates the second file including the identifier copied by the copying means and the label information set by the setting means, and
wherein said label information includes information regarding a representative frame image representing all the frame images of image data included in the recording medium;
recording means for recording the second file created by the creating means in the format identified by the identifier on the recording medium, as a file that is different from the first file; and
a comparing means for comparing an identifier included in the second file with an identifier included in the first file recorded onto the recording medium,
wherein the recording means records the second file in the format identified by the identifier on the recording medium only when it is determined as a result of comparison by the comparing means that the identifier included in the second file matches with the identifier included in the first file.

2. The information processing apparatus according to claim 1,
wherein the setting means selectively sets the representative frame image from representative frame images of respective clips recorded on the recording medium.

3. The information processing apparatus according to claim 1,
wherein the setting means sets a beginning frame image of a beginning clip as the representative frame image when no instruction for setting the representative frame image is given.

4. The information processing apparatus according to claim 1, further comprising:
reading means for reading the second file from the recording medium; and
updating means for updating the label information included in the second file read by the reading means;
wherein the comparing means compares an identifier included in the second file whose label information has been updated by the updating means with an identifier included in the first file recorded on the recording means, and
wherein the recording means records the second file in the format on the recording medium only when it is determined as a result of comparison by the comparing means that the identifier included in the second file coincides with the identifier included in the first file.

5. The information processing apparatus according to claim 1,
wherein the recording medium is an optical disc.

6. The information processing apparatus according to claim 1,
wherein the recording medium is a semiconductor memory.

7. The information processing apparatus according to claim 1,
wherein the first file includes both an identifier and a table including clip information and edit information.

8. An information processing method for an information processing apparatus that manages data that is recorded on a recording medium, the information processing method comprising:
copying an identifier for identifying a format that is managed by a first file for managing information recorded on the recording medium and a table including clip information and edit information;
creating a second file including said identifier copied for identifying a format, and label information describing content of the data, further comprising setting said label information,
wherein creating the second file includes the identifier copied for identifying a format and said label information, and
wherein said label information includes information regarding a representative frame image representing all the frame images of image data included in the recording medium; and
recording the second file so that the second file is recorded in the format identified by the identifier on the recording medium, as a file that is different from the first file; and
comparing an identifier included in the second file with an identifier included in the first file recorded onto the recording medium,
wherein recording the second file in the format identified by the identifier on the recording medium only when it is determined as a result of comparison by the comparing means that the identifier included in the second file matches with the identifier included in the first file.

9. The information processing method according to claim 8,
wherein the first file includes both an identifier and a table including clip information and edit information.

10. A computer program product comprising a non-transitory computer readable medium including program code stored thereon, for allowing a computer to execute processing for managing data that is recorded on a recording medium, the program code being executable to perform operations comprising:
copying an identifier for identifying a format that is managed by a first file for managing information recorded on the recording medium, the identifier being included in the first file;
creating a second file including said identified copied for identifying a format, and label information describing content of the data, further comprising setting said label information,
wherein creating the second file includes the identifier copied for identifying a format and said label information, and
wherein said label information includes information regarding a representative flame image representing all the frame images of image data included in the recording medium; and recording the second file so that the second file is recorded in the format identified by the identifier on the recording medium, as a file that is different from the first file; and comparing an identifier included in the second file with an identifier included in the first file recorded onto the recording medium, wherein recording the second file in the format identified by the identifier on the recording medium only when it is determined as a result of comparison by the comparing means that the identifier included in the second file matches with the identifier included in the first file.

11. The computer program product according to claim 10, wherein the first file includes both an identifier and a table including clip information and edit information.

* * * * *